(12) United States Patent
Eyal

(10) Patent No.: US 6,735,628 B2
(45) Date of Patent: May 11, 2004

(54) MEDIA SEARCH AND CONTINUOUS PLAYBACK OF MULTIPLE MEDIA RESOURCES DISTRIBUTED ON A NETWORK

(75) Inventor: Aviv Eyal, San Francisco, CA (US)

(73) Assignee: Friskit, Inc., San Francisco, CA (US)

( * ) Notice: Subject to any disclaimer, the term of this patent is extended or adjusted under 35 U.S.C. 154(b) by 70 days.

(21) Appl. No.: 10/251,307

(22) Filed: Sep. 20, 2002

(65) Prior Publication Data

US 2003/0033420 A1 Feb. 13, 2003

Related U.S. Application Data

(63) Continuation of application No. 10/104,792, filed on Mar. 22, 2002, now Pat. No. 6,484,199, which is a continuation of application No. 09/563,250, filed on May 2, 2000, now Pat. No. 6,389,467.
(60) Provisional application No. 60/177,786, filed on Jan. 24, 2000.

(51) Int. Cl.⁷ .......................................... G06F 15/173
(52) U.S. Cl. ..................... 709/223; 709/231; 709/245
(58) Field of Search ................................. 709/223, 231, 709/245; 707/10; 345/327

(56) References Cited

U.S. PATENT DOCUMENTS

| | | |
|---|---|---|
| 4,870,579 A | 9/1989 | Hey |
| 4,996,642 A | 2/1991 | Hey |
| 5,297,042 A | 3/1994 | Morita |
| 5,442,390 A | 8/1995 | Hooper et al. |
| 5,548,724 A | 8/1996 | Akizawa et al. |
| 5,583,868 A | 12/1996 | Rashid et al. |
| 5,659,732 A | 8/1997 | Kirsch |
| 5,668,948 A | 9/1997 | Balknap et al. |
| 5,778,367 A | 7/1998 | Wesinger, Jr. et al. |
| 5,864,863 A | 1/1999 | Burrows |
| 5,873,080 A | 2/1999 | Coden et al. |
| 5,884,282 A | 3/1999 | Robinson |
| 5,892,905 A | 4/1999 | Brandt et al. |
| 5,911,043 A | 6/1999 | Duffy et al. |
| 5,911,139 A | 6/1999 | Jain et al. |
| 5,915,094 A | 6/1999 | Kouloheris et al. |
| 5,920,856 A | 7/1999 | Syeda-Mahmood |
| 5,961,603 A | 10/1999 | Kunkel et al. |
| 5,983,176 A | 11/1999 | Hoffert |
| 5,987,454 A | 11/1999 | Hobbs |
| 5,991,374 A | 11/1999 | Hazenfield |
| 5,996,015 A | 11/1999 | Day et al. |
| 6,009,459 A | 12/1999 | Belfiore et al. |
| 6,011,537 A | 1/2000 | Slotznick |
| 6,016,504 A | 1/2000 | Arnold et al. |

(List continued on next page.)

OTHER PUBLICATIONS

"MP3.com Launches First Fully Interactive Radio Stations," Dec., 1999.
"Firefly: From the Media Lab to Microsoft," Scott Kirsner, Apr. 9, 1998.
"MP3.com and RealNetworks Team Up To Provide New Music JukeBox Users," Sep. 24, 1999.

(List continued on next page.)

*Primary Examiner*—Krisna Lim
(74) *Attorney, Agent, or Firm*—Shemwell Gregory & Courtney LLP

(57) ABSTRACT

A method is provided for playing back media from a network. The method includes receiving a search criteria from a network enabled device. The method further includes accessing a database comprising a plurality of network addresses, where the database associates each address with one or more classes of information. The addresses in the database each access a media network resource. The method further includes selecting at least one address in the database using the search criteria, and signaling the selected address to the network enabled device. The method also includes controlling the network enabled device so as to automatically access and play back the media resource of the selected address.

108 Claims, 22 Drawing Sheets

U.S. PATENT DOCUMENTS

| | | | |
|---|---|---|---|
| 6,021,409 | A | 2/2000 | Burrows |
| 6,026,439 | A | 2/2000 | Chowdhury |
| 6,035,055 | A | 3/2000 | Wang et al. |
| 6,041,318 | A | 3/2000 | Danford-Klein |
| 6,041,360 | A | 3/2000 | Himmel et al. |
| 6,049,829 | A | 4/2000 | Li |
| 6,058,423 | A | 5/2000 | Factor |
| 6,092,204 | A | 7/2000 | Baker |
| 6,101,510 | A | 8/2000 | Stone |
| 6,112,239 | A | 8/2000 | Kenner |
| 6,134,596 | A | 10/2000 | Bolosky et al. |
| 6,134,680 | A | 10/2000 | Yeomans |
| 6,151,624 | A | 11/2000 | Teare et al. |
| 6,192,340 | B1 | 2/2001 | Abecassis |
| 6,202,061 | B1 | 3/2001 | Khosla et al. |
| 6,240,423 | B1 | 5/2001 | Hirata |
| 6,247,069 | B1 | 6/2001 | Smyers |
| 6,317,740 | B1 | 11/2001 | Mukherjea et al. |
| 6,353,929 | B1 | 3/2002 | Houston |
| 6,363,434 | B1 | 3/2002 | Eytchison |
| 6,389,467 | B1 | 5/2002 | Eyal |
| 6,418,421 | B1 | 7/2002 | Hurtado et al. |
| 6,434,550 | B1 | 8/2002 | Warner |
| 6,484,199 | B2 | 11/2002 | Eyal |
| 6,519,648 | B1 | 2/2003 | Eyal |

OTHER PUBLICATIONS

"New MP3.com Service Lets Consumers Listen To Their Music Anywhere, Anytime," MP3.com Press Release, Jan. 12, 2000.

"MP3.com Announces Strategic Relationship With Portal-Player, Inc.," MP3.com Press Release, Jan. 6, 2000.

"MP3.com and Listen.com Form Strategic Alliance," MP3.com Press Release, Oct. 28, 1999.

"MP3.com and I–Drive.com Join Forces to Store and Manage MP3 Files," MP3.com Press Release, Oct. 6, 1999.

"MP3.com and MusicMatch Offer Exclusive Download of Custom MusicMatch Jukebox," MP3.com Press Release, Sep. 29, 1999.

"MP3.com, Inc. and PlayMedia Systems, Inc. Agree to Dismiss Lawsuit," MP3.com Press Release, Sep. 29, 1999, Jun. 3, 1999.

"MP3 Goes Mainstream, but Internet Music Has Yet To Find Its Perfect Form," Laura Goldstein, Dec. 1999.

"Top Ten MP3 Utilities," Max Green, FileWorld, Jun. 1, 1999.

"RealNetworks Launches Enhanced RealGuide Connecting Consumers To The Richest Streaming Media Content Available On The Web," RealNetworks Company Press Release, Mar. 17, 1999.

"Streaming Media Comes Of Age," Jesse Berst, ZDNet AnchorDesk, Mar. 1999.

"RealNetworks Launches RealJukebox, Turning Internet PC's Into The Best Way To Experience Music," RealNetworks Company Press Release, May 3, 1999.

"Shareware Music Machine News," May 4, 1999.

"RealNetworks Introduces RealJukebox Plus, The First Complete Digital Music System With CD–Quality Recording And Playback," RealNetworks Company Press Release, Aug. 9, 1999.

"RealNetworks Ships Gold Release Of RealJukebox And RealJukebox Plus, First Complete Digital Music Solution," RealNetworks Company Press Release, May 3, 1999.

"Managing Your Music," Manual For RealJukebox Gold.

"CNET Online To Feature Microsoft Streaming Media Technology," CNETNetworks Press Releases, Jul. 7, 1998.

"Sonic Foundry and Microsoft Provide First Music Jukebox Based Soley On Windows Media Audio," Microsoft Presspass, Aug. 17, 1999 http://www.microsoft.com/presspass/press/Aug99/SonicFMSpr.asp.

"Audio/Video Development Tools Servers–Windows Media Player," ServerWatch, Apr. 14, 1999. http://www.serverwatch.com/stypes/servers/article.php/16277__1298261.

Newsgroup Message Board, alt.music.ween, Subject: Re:Playlists in Windows Media Player, Nov. 17, 1999.

"RealPlayer vs. Windows Media: A Streaming Shootout," Cameron Crouch, Jan. 28, 2000.

"American Online Acquires Leading Internet Music Brands—Spinner.com, Winamp and SHOUTcast," Jun. 1, 1999 http://classic.winamp.com/community/press/060199.jhtml.

"15 Million Winamp Users Gain Access to Mjuice.com Artists and Labels," Aug. 30, 1999 http://classic.winamp.com/community/press/083099.jhtml.

"Winamp Unveils All New Winamp.com Web Site," Dec. 21, 1999 http://classic.winamp.com/community/press/122199.jhtml.

Newsgroup Message Board, alt.music.MP3, Subject: Making a Playlist??, Dec. 28, 1999.

"Digital Audio Software: Winamp 2.50e," The computer Shopper, Mar. 29, 2000.

MusicMatch JukeBox 6.0, Description History Review, "MusicMatch Jukebox 3.1 reviewed," Mitch Bechtel, Apr. 22, 1999.

"MusicMatch Unveils Free MusicMatch Jukebox 4.0–Most Powerful MP3 Software Available on the Internet," MusicMatch Press Release, Jun. 10, 1999.

"MusicMatch Jukebox First Digital Audio Software To Easily Integrate Playback Of Locally Stored And Streamed Mp3 Music Plus Windows Media Audio Recording," MusicMatch Press Release, Aug. 12, 1999.

"MusicMatch Jukebox First To Integrate Windows Media Video Into JukeBox, Delivers Most Complete Windows Media Experience," MusicMatch Press Release, Nov. 29, 1999.

"MusicMatch Jukebox First To Integrate Windows Media Video Into JukeBox, Delivers Most Complete Windows Media Experience–Latest Generation of MusicMatch Jukebox Adds Video Streaming, Delivers Richest MultiMedia Internet Music Experience in Jukebox Software," Nov. 29, 1999 http://www.creativepro.com/story/news/3673.html.

"MusicMatch taps Microsoft to challenge RealNetworks," Courtney Macavinta, Nov. 30, 1999.

"MusicMatch first jukebox software to integrate internet radio tuner, offering the most powerful music playback and streaming capabilities available," MusicMatch Press Release, Jan. 24, 2000.

"MusicMatch taps Microsoft to challenge RealNetworks," CNET News.com, Courtney Macavinta, Nov. 30 1999.

"MusicMatch Debuts Artist on Demand," MusicMatch press release, Dec. 11 2002.

"MusicMatch MX FAQ," User Guide.

Personalize the Music, Lycos Tutorial.

"99 Rewind: MP3.com Adds Features," MP3.com editorial, Dec. 28 1999.

"MP3 in Ways You've Never Heard Before," MP3.com, Michael Robertson, May 19 1999.

"MP3.com's New Features Get Mixed Reception," CNET News.com, Jim Hu, Jan. 12 2000.
"MP3.com Fights Fire with Fire," Wired News, Chris Oakes, Jan. 27 2000.
"MP3.com Lets Streams Flow," Wired News, Brad King, Dec. 5 2000.
"MP3.com Lets You Listen to Music You Already Own," The Industry Standard, Jan. 13 2000.
"Downloading a Plethora of Music from the Web is Easier Than Ever," The Argonaut at University of Idaho, Jan. 17 2000.
"Access Your Music Collection on the Net," Times Computing Online, Sandeep Ajgaonkar, Feb. 2 2000.
"How to—MP3," Times Computing Online, Sandeep Ajgaonkar, Jun. 30 1999.
"The Site Formerly Known as TheDJ.com," CNET News.com, Beth Lipton Krigel, Jul. 14 1998.
"The DJ.com Morphs Into Spinner.com," The Write News, Jul. 15 1998.
"Net Radio Gets Down to Business," The Industry Standard, Lessley Anderson, Jul. 27 1998.
"Spinner.com Turns to Sun to Transform into Online Music Powerhouse," Sun Microsystems press release, Oct. 27 1998.
"Net Radio Firm Spinner.com Adds Downloads," CNET News.com, Courtney Macavinta, Dec. 1 1999.
"Lycos Music Launches as the Ultimate Online Music Destination for Both Listeners," Lycos press release, Nov. 15 1999.
"Lycos and Fast Search & Transfer Introduce Free Web Music Hosting Service, The Listening Room," Fastsearch.com, Nov. 15 1999.
"Lycos Launch the Listening Room," Shareware Music Machine News, Nov. 17 1999.
"Lycos Music Launches as the Ultimate Online Music Destination," ProRec.com, Nov. 15 1999.
"J.River Inserts CD's in Jukebox," J. River press release, Sep. 17 1999.
"J. River's Media Jukebox Adds Video to MP3," J. River press release, Dec. 2 1999.
"Music Exchange Releases Media Jukebox," Shareware Music Machine News, Dec. 7 1999.
"Listen.com Launches the Internet's First Comprehensive Music Download Directory," Listen.com press release, Jun. 20 1999.
"Launch Offers Music Player," The Industry Standard, Reuters, Feb. 11 2003.
"Start–up Myplay tunes in to Music Downloads," CNET News.com, Jennifer Balderama and Jeff Pelline, Oct. 13 1999.
"Myplay Makes the Holidays Sing with a Donation of City of Hope Every Time you 'Share Music,'" Myplay press release, Dec. 15 1999.
"Bands and Fans Rub Elbows on Riffage.com," CNN.com, Christian McIntosh, Jun. 19 1999.
"New Web Radio Technology Aims for Masses," CNET News.com, Jim Hu, Dec. 31, 1998.
"Promising to Reinvent Radio, Kerbango Makes it Easy to Find and listen to the Vast Amount of Audio on the Web—Without a PC," Kerbango press release on New Radio Star News, Feb. 7 2000.
"New Audio/Video Search Service Launches," TechWeb News, Malcolm Maclachlan, Jun. 30 1999.
"Q&A with Robert Shambro, CEO, President and Founder of StreamSearch.com, Inc.," Streamingmedia.com, Jose Alvear, Sep. 7 1999.
"Searching the Stream," Streaming Media World, John Townley, Feb. 10 2000.
"Streamwaves Help," Streamwaves.com user guide.
"Virage Introduces Free MyLogger Video Publishing Application at Streaming Media West '99 Conference," Virage Inc. press release, Dec. 7 1999.
"Virage and Realnetworks to Bring Virage Technology to Realplayer and Real.com Network Users," Virage Inc. press release, Apr. 10 2000.
"Voquette Puts the Web on Cassette," MP3.com, Glenn Grant, Dec. 8 1999.
"ReQuest Multimedia Selects Quantum Corporation to Provide Audio Storage Technology for New MP3 Home Stereo Jukebox," ReQuest Multimedia press release, Dec. 20 1999.
"The VCR, Version 2.0," Red Herring, Rafe Needleman, Apr. 1999.
"Top 10 MP3 Utilities," CNN.com, Max Green, Jun. 7 1999.
"Top 10 MP3 Players and Applications," CNN.com, Max Green, Nov. 26 1999.
"Sound Utilities—32bit," NONAGS Sound Utilities compilation.
"Search for More Music," Lycos Tutorial.
"MusicMatch Jukebox Offers Fraunhofer MP3," Internetnews.com, Oct. 20 1999.
"Spinner.com Launches Spinner Plus 1.5", Jan. 8, 1999.
"America Online Inc.'s Spinner.com Unveils All New Spinner.com 3.0" Oct. 6, 1999.
"Spinner.com Signs Landmark Deal to Drive Millions of Downloads" Apr. 27, 1999.

MEDIA DATABASE TABLE

| Media URL | Number of Votes | Rating | Additional Info |
|---|---|---|---|
| URL | 0...N | 0...Max Rating | |
| | | | |

FIG. 15

MEDIA SEARCH AND CONTINUOUS PLAYBACK OF MULTIPLE MEDIA RESOURCES DISTRIBUTED ON A NETWORK

CROSS RELATED APPLICATIONS

This application is a continuation of U.S. patent application Ser. No. 10/104,792, filed on Mar. 22, 2002; entitled "Streaming Media Search And Playback System For Continuous Playback Of Media Resources Through A Network," (now U.S. Pat. No. 6,484,199 B2 issued Nov. 19, 2002); which is a continuation of U.S. patent application Ser. No. 09/563,250, filed May 2, 2000 (now U.S. Pat. No. 6,389,467, issued May 14, 2002), entitled "Streaming Media Search and Continuous Playback System of Media Resources Located by Multiple Network Addresses"; which claims priority to U.S. Provisional Patent Application Serial No. 60/177,786, filed Jan. 24, 2000, entitled "Streaming Media Search and Playback System". All of the aforementioned non-provisional priority applications are hereby incorporated by reference.

BACKGROUND OF THE INVENTION

1. Field of the Invention

This invention relates to the field of streaming media content search and playback over a network. In particular, the invention relates to a computer system that enables a continuous streaming media playback from a distribution of sites available over a network such as the Internet.

2. Description of the Related Art

Computers currently can access streaming media on the Internet. Streaming media available on the Internet include, for example, music, video clips such as movie trailers, home movies, and animation.

Users locate streaming media on the Internet by manually selecting links. Typically, users browse the media sites that contain numerous sub-links. Users sometimes select through a chain of links to locate a desired media on a media link. Once located, the desired media link may or may not contain the desired media.

Some services provide media search engine capabilities. Users may enter a search request for selected media creations by an artist. The media search engine then displays links to categories and/or sub-links of media that are determined to match one or more criteria in the search request set forth by the user. The determination of which links should be displayed in response to the search request is dependent on the algorithm used in by the search engine. Typically, links displayed to users of current search engines are not subject to a determination of the quality or availability of the media associated with the media links. Further, the search results are outputted to the user as a display of links for the user's selection.

Many Internet streaming media outlets provide a limited number of source nodes. The sites can be unreliable when the number of users accessing the site become congested.

SUMMARY OF THE INVENTION

An embodiment of the invention includes a method for playing back media from network. The method comprises receiving a search criteria from a network enabled device. The method further includes accessing a database comprising a plurality of network addresses, where the database associating each address with one or more classes of information. Each address accesses a media network resource. The method further includes selecting at least one address in the database using the search criteria, signaling the selected address to the network enabled device, and controlling the network enabled device so as to automatically access and play back the media resource of the selected address.

Another embodiment includes a method for playing back media from a network. The method includes receiving a request for media playback from a network enabled device. Further, accessing a database comprising a plurality of network addresses, where each address accessing a media network resource. The method also includes identifying at least two addresses from the database, signaling each identified address to the network enabled device, and controlling the network enabled device to access and automatically play back the media network resources of each of the signaled addresses.

In another embodiment, a computer system is provided for playing back media from a network. The computer system comprises a network enabled device comprising a media playback component. A database is included that comprises a plurality of addresses, where each address locates a media network resource on the network. The database includes one or more classes of information associated with each address in the plurality of addresses. The system also includes a network server module that is coupleable to the network enabled device and to the database. The network server module is able to receive a search request from the terminal that specifies one or more criterias. The network server module selects an address from the database that is associated with a class of information that matches the search criteria. The network server module signals the address to the network enabled device to cause the device to access the media network resource, and to signal media playback component to load the media network resource after the device accesses the media network resource.

In another embodiment, a computer system is provided for playing back media from a network. The computer system includes a network enabled platform comprising a media playback component. A database includes a plurality of addresses, where each address locates a media network resource on the network. Each address accesses a media network resource. The embodiment further includes a network server module coupleable to the network enabled device and to the database. The network server receives a request for media playback from the network enabled device, selects multiple addresses from the database, and signal the multiple addresses to the network enabled device. The network server module control a media playback component on the network enabled device to use the addresses to automatically access and play back the media network resource associated with the addresses.

In another embodiment, a network enabled device is configured to playback media from a network. The network enabled device is coupleable over the network to a database that includes a plurality of addresses. Each address locates a media network resource on the network. The network enabled device includes a user-interface to prompt for a search request. The network interface signals the request to a network server module that is communicatable with the database, and receives one or more addresses in the database that match the search request. The network enabled device includes a media playback component that is configured to be programmatically controlled by the network server module to automatically load the media network resources located by the addresses that match the search request.

In another embodiment, a network enabled device is configured to playback media from a network. The network enabled device is coupleable over the network to a database comprising a plurality of addresses. Each address locates a media network resource on the network. The network enabled device comprises a user-interface including a plurality of user-interactive features, including a first user-interactive feature that prompts to receive a search request for media playback. A network interface signals the request to a network server module upon the first user-interactive feature receiving the search request for media playback. The network interface is communicatable with the database to receive one or more addresses in the database that match the search request. A network playback component is configured to be programmatically controllable by the network server module to automatically load the media network resource associated with each address signaled to the network enabled device upon accessing the media network resource. A playback of the media playback component being controllable by one or more control user-interactive features.

An embodiment includes a system that provides media from a network to a terminal having a media playback component. The system includes a first network site and a second network site, where each network site locates one or more media network resources. Each media network resource is locatable on the network by a corresponding address that accesses the media network resource. A network server module is coupleable to the terminal through the network. The network server module identifies a first media network resource from the first network site and a second media network resource from the second network site. The network server module signals the corresponding address of the first media network resource to the terminal with control signals to cause the playback component to automatically load the first media network resource. The network server module automatically signals the corresponding address of the second media network resource to the terminal with control signals to cause the playback component to automatically load the second media network resource.

Another embodiment provides a media playback system for the Internet. The system includes an end terminal having a media playback component. A web server module is coupleable to the end terminal through the Internet. The web server module has access to one or more media web resources on a first web site, and to one or more media web resources on a second web site. The web server module signals a first link to a first media web resource on the first web site, and a second link to a second media web resource on the second web site. The web server module provides control signals to the end terminal to cause the end terminal to access and load the first media web resource and the second media web resource into the media playback component.

One or more of the embodiments may include a database that stores links to each of the plurality of media web resources, the web server module identifying the first link and the second link from the database.

Another embodiment includes a media playback system for the Internet. The system includes a terminal having a media playback component and a user-interface. A web server module is coupleable to the user terminal through the Internet. The web server module has access to a plurality of links, where each link locates a media web resource. The plurality of links are accessible on a plurality of web sites. The web server module signals the plurality of links to the user terminal in a designated order to cause the terminal to load the media web resource located by each of the plurality of links into the media playback component. The embodiment also includes a database that stores the plurality of links. The database is accessible to signal the plurality of links to the web server module in the designated order. The user-interface signals one or more inputs from a user to the web server module. The one or more inputs direct the web server to alter the designated order in which the database signals the plurality of links to the web server module.

Another embodiment includes a system that provides media play-back on a network. The system includes a terminal that is coupleable to the network. A play-list module is coupleable to the terminal. The play-list module stores a first play-list signaled from the terminal. The first play-list includes a plurality of network addresses. A first network address locates a first media network resource on a first network site, and a second network address locates a second media network resource on a second network site. A network server module is coupleable to the terminal and to the play-list module. The network server module signals the first play-list to the terminal. The network server module controls the terminal to cause the terminal to access the media network resource associated with each network address in the first play-list, and to automatically load each respective media network resources into the media playback component.

Another embodiment includes a method for providing media to a terminal coupled to a network, where the terminal includes a media playback component. A terminal is programmatically directed to access a first network site in the plurality of network sites. The media playback component on the terminal is caused to automatically load a first media web resource located at the first network site to playback a first media. The terminal is programmatically directed to access a second network site in the plurality of network sites. The media playback component on the terminal is caused to automatically load a second media web resource located at the second network site to playback a second media.

Another embodiment includes a method to provide media to a terminal coupled to the Internet. A database is accessed that stores a plurality of links, where each link opening a corresponding media web resource. A first link is selected from the database, the first link being located on a first network site. Next, a second link is selected from the database, the second link being located in a second network site. The second network site is external to the first network site. Then, the selected links are signaled to a media playback component on the terminal to sequentially access the media web resources associated with the selected links. The media playback component on the terminal is automatically signaled to load each of the media web resource accessed from the selected links so as to playback a media corresponding to each media web resource.

Another embodiment includes a system to share media playback from a network between a plurality of terminals. The plurality of terminals include a first terminal and a second terminal. The system includes a play-list component locatable on the network by a selectable link. The play-list component identifies a plurality of links to form a play-list, where each link in the play-list locating a media file on the network. The system includes a network server module that signals the plurality of links that form the play-list to the first terminal. The network server module receives a signal to transmit the selectable link to a second terminal to enable the second terminal to locate the play-list module.

In another embodiment, a method is provided to locate web resources on the Internet. A web site is accessed to identify a plurality of links using a web browser component. The web site can be automatically or programmatically accessed. Each of the plurality of links are selectable to open a corresponding web resource of a specified data type on the web site. The plurality of links are made available to a plurality of Internet enabled devices that select one or more of the links.

Another embodiment includes a system to locating web resources on the Internet. The system includes a web browser component, and a database. A search module controls the web browser component to access at least one web site. The search module controls the web browser component to identify a plurality of links to media web resources at the web site. Each of the plurality of links are selectable to open a media web resource. The search module stores the plurality of links in the database.

Another embodiment includes a method to locate web resources on the Internet. A database that stores a plurality of links is accessed, the plurality of links being selectable to open a corresponding web media resources. Metadata information is programmatically identified about the web media resource corresponding to each of the plurality of links. The plurality of links are made accessible to a plurality of Internet enabled devices. The plurality of Internet enabled devices elect one or more of the links to open the corresponding media web resource.

Another embodiment includes a method to locate web resources on the Internet. A database is accessed that includes a plurality of links to media web resources. Each of the plurality of links are programmatically verified to open a corresponding web media resource. Each verified link is accessible to a plurality of Internet enabled devices that select one or more of the links to open the corresponding media web resource.

Another embodiment includes a system to locate web resources on the Internet. The system includes a first indexed data structure comprising a plurality of links. A media playback component is coupleable to the database. The media playback component loads each of the plurality of links to verify whether the link is selectable to open a media web resource. A second indexed data structure stores each verified link in the plurality of links. The second indexed data structure is available to the plurality of Internet enabled devices.

Another embodiment includes a method to providing links for use in a media search engine. A plurality of internal links on a network site are identified. The network site makes a network resource of a specific data type accessible for a network enabled device. The internal links that are selectable to open the network resource of the specific data type are extracted. The external link is stored in a database. One or more of the links are automatically signaled to a media playback component in response to receiving a search requests from the network enabled device.

Another embodiment includes a method to provide links for use in a media search engine. The method includes a) receiving from a first indexed data structure a first external link to a first network site; b) initializing a second data structure to be empty; c) determining if the first network site contains at least one internal link; d) storing the at least one internal link contained on the first network site that is not in the first indexed data structure and not in the second indexed data structure as another external link in the first indexed data structure; e) identifying the internal links contained on the first network site that are selectable to open a network resource of a specific data type or types; f) moving the first external link from the first indexed data structure to the second indexed data structure; and g) repeating steps a) through f) until the first indexed data structure is empty.

Another embodiment includes a computer system to search for links to streaming media playback on a network, the network being accessible to a network enabled device. The system includes a metacrawler to locate one or more media sites in directories containing streaming media. A media search module coupled to be signaled the one or more directories from the metacrawler. The media search module identifies a plurality of media links for the media sites. Each of the plurality of media links are selectable to open streaming media network resource. A metadata extraction module accesses each media link identified by the media search engine to extract metadata about the identified media link. A database comprising the plurality of media links identified by the media search engine, and the metadata is extracted about each identified media link. The database enables the network enabled device to access the plurality of media links.

An embodiment includes a rating system for rating media network resources on a network that is coupleable to a plurality of terminals. The rating system includes a database having a plurality of addresses. Each address locates a corresponding media network resource on the network. A network server module is coupleable to the plurality of terminals. The network server module accesses the database to signal one or more addresses from the database to the plurality of terminals. A rating module is coupleable to the plurality of terminals. The rating module receives a rating input from each of the plurality of terminals. The rating module associates the rating input with a selected address in the database.

In another embodiment, a rating system is provided to rate media network resources on a network. The rating system includes a database comprising a plurality of addresses that each locate a corresponding media network resource on the network. The database includes one or more classes of information associated with each of the plurality of addresses. A network server module is coupleable to the plurality of terminals. The network server module communicates with each of the plurality of terminals to receive a search request. The network server module signals the database to retrieve one or more addresses from the database in response to the search request. The retrieved addresses are associated with a class of information matching the search request. A rating module is coupleable to the plurality of terminals. The rating module receives a rating input from each of the plurality of terminals. The rating module associates the rating input with a selected address in the database.

Another embodiment includes a rating system for rating media network resources available over a network. The media network resources are located on the network by a plurality of terminals. The rating system includes a database that stores a plurality of addresses. Each address locates a corresponding media network resource on the network. The database includes a rating associated with each of the plurality of addresses. A network server module is coupleable to each of the plurality of terminals. The network server module accesses the database to signal one or more addresses from the database to the plurality of terminals. A rating module is coupleable to each of the plurality of terminals. The rating module receives a rating input from one of the terminals for each of the plurality of addresses in the database. In response to receiving the rating input from one of the plurality of terminals for a selected address in the database, the rating module accesses the database and reconfigures the rating associated with the selected address. A play-list module accesses the addresses to select one or more combinations of addresses. The play-list module signals the play-list to the network server module as addresses to be signaled to one or more of the plurality of terminals.

In a variation, the address may be selected by the play-list module based on a criteria stored with the address in the database. Examples of criterias include rankings, reflecting preferences of users on terminals after playing back media located by the respective addresses. Other criterias that can be used to select addresses include metadata information, such as artist name and media title. For example, the search request may specify a ranking as one of the criterias. The play-list module then sorts the database for the ranking in selecting the addresses.

Another embodiment includes a method for ranking media sources on a network. The method includes accessing a database that stores a plurality of addresses. Each address locates a media resource on the network and each address is associated with a rating. A selected address from the database is signaled to a terminal coupled to the network. A rating input is received from the terminal after signaling the selected address to the terminal. The rating is associated for the selected address is adjusted in response to receiving the rating input.

Another embodiment includes a method for ranking media sources on a network. A database is accessed that stores a plurality of addresses. Each address locates a media resource on the network and each address is associated with a rating. A combination of addresses are selected to form a play-list. The play-list is signaled to a terminal coupled to the network. A ranking is received from the terminal after signaling the addresses in the play-list to the terminal. The rating is adjusted for each address signaled to the terminal from the play-list in response to receiving the ranking.

Another embodiment includes a method that ranks media sources on a network. A database that stores a plurality of addresses is accessed. Each address locates a media resource on the network, and each address is associated with a rating. A selected address is signaled from the database to a terminal coupled to the network. A ranking is received from the terminal after the selected address is signaled to the terminal. The rating associated for the selected address is adjusted in response to receiving the ranking.

Another embodiment includes a network enabled device that comprises a media playback component. The media playback component is configured to communicate with a network-side module to receive a first plurality of links. Each of the first plurality of links locate a media file on a network. A web browser component is configured to receive a second plurality of links. Each of the second plurality of links hosts a media file located by one of the first plurality of links. The web browser component displays the web site for each of the second plurality of links when the media playback component plays back media from the media file being hosted by web site being displayed.

BRIEF DESCRIPTION OF THE DRAWINGS

FIG. 15 illustrates an exemplary structure for a database to maintain updated records on ratings for addresses containing media resources, under an embodiment of the invention.

DETAILED DESCRIPTION

A. System Overview

Figure 1:
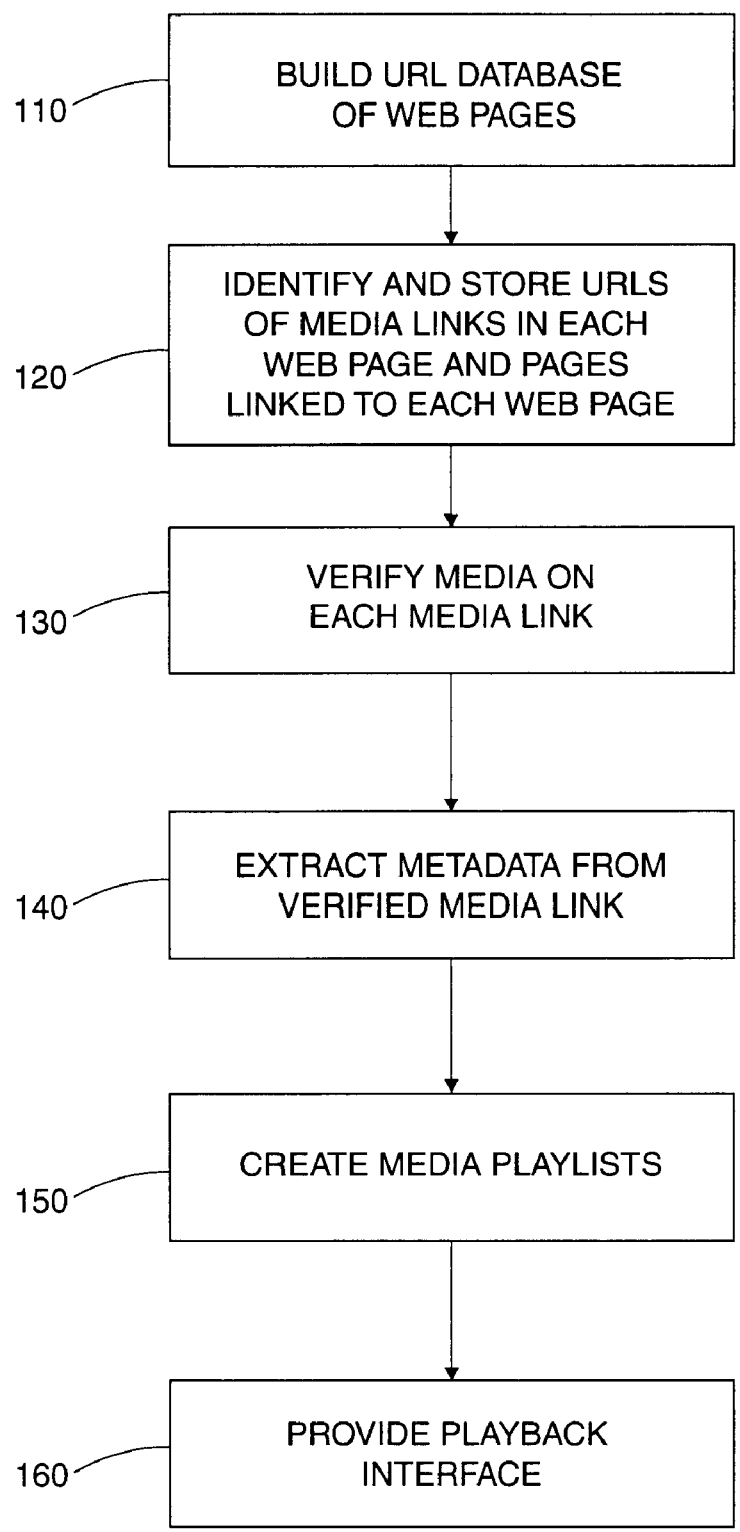
FIG. 1 is a flow process describing an embodiment of the invention.

According to an embodiment, a system is provided comprising a media search engine. The media search engine may be used to create a database of links to media files. The links may be structured according to predefined categories and/or user-defined search criteria. A client terminal includes a media player to automatically access one or more media files using the corresponding links. The media player then plays back media contained on the media files.

Among other advantages of the invention, the user terminal accesses media files at various sites on a network, without requiring users to manually select media links. For example, user-terminals may output music to a user by automatically accessing one or more Internet sites containing media files. The music is outputted without requiring users' to view and select links to sites containing the media.

In contrast to embodiments of the invention, using other systems to search for Internet files containing media can be a distracting and time-consuming experience for an end user. In many instances, such a search will yield a series of links on a directory or web search page. A user may have to click on each individual link, one at a time, to play each individual media file. The selected media file may be broken and unavailable to deliver media content. Even if the number of broken links is not high, the user must still click on the links one at a time to activate each media file, providing at best a stop-and-go experience.

In one embodiment of the invention, a user terminal is able to receive continuous media streaming from multiple sites on the Internet. Multiple sites may be accessible to enable the user terminal to receive streaming media without any interaction required from an end user other than signaling a request to receive streaming media. The user terminal automatically accesses media links containing media using a media playback component.

The media playback component may be controlled by one or more server-side modules. In one embodiment, the media playback component on the user terminal interacts with one or more play-lists generated by server side modules. The play-lists contain media links for the media playback application. The media links may be structured or ordered in the play-lists. The play-lists may be generated automatically by back-end modules and/or manually by editors. The play-lists may also be generated by end users.

The media playback component may also interact with one or more server side search modules to access media links on the network. The media links may be automatically selected based on, for example, a search criteria from the end user.

Embodiments of the invention provide a system to search and playback media accessible over a network. In one embodiment, a media search engine is provided to enable users to request media output based on a criteria set forth in a search request. The media search engine is able to efficiently locate streaming media on the network that matches criteria set forth in a search request. The system provides continuous playback of media found on multiple sites of the network. For example, a user may specify a search based on a specified artist. The system locates one or more sites on the Internet containing media files from the specified artist. The system enables the user terminal to automatically and continuously play back media creations available on the Internet sites.

Further, a backend system under an embodiment of the invention minimizes possibilities of broken links and mismatched search results. The backend system may also be used to perform manual and/or programmatic quality check of the media associated with each link.

Further, a search engine under an embodiment of the invention employs an Internet web browser software component on the back-end to perform searches and indexing of web resources. The Internet web browser component may be a configured or modified commercially available web browser component. Server-side modules may combine to control the browser in locating media links and media sites containing media content. As a result, the media search engine under this embodiment is efficiently implemented, using existing resources on the back-end system.

Among other advantages, embodiments of the invention enable streaming media from multiple media links to be automatically played to users. Embodiments of the invention also employ a scalable and distributed architecture. Scalability in this sense means that the service is available to a large (thousands or more) audience of simultaneous listeners or viewers while minimizing bottlenecks caused by congestion. Another advantage of a distributed architecture is that the unavailability of one media site, or of one or more media on the media site, does not preclude the user terminal from receiving media from another site. As a result, users are ensured a continuous listening or viewing experience.

Further, streaming media may be continuously outputted to users from multiple sites on the Internet based on personalized criteria set forth by users. The criteria may be set forth in one or more requests by an end user. The end user may experience media continuously outputted from multiple sites, based on only one request from the end user. This allows a user to request media through actions such as clicking requests through a user-interface.

An embodiment of the invention enables users to share streaming media experiences with other end users. For example, users may share play-lists containing links to multiple Internet sites. This enables individuals to create media programs of streaming media using multiple sites on the Internet. For example, play-lists may be shared among end users using a host web site, or e-mails.

B. Search and Playback System

A user terminal may transmit a search request from an end user to one or more modules on a server. A client side playback module, one or more server-side modules, or a combination of client and server side modules combine to access the user terminal to a site on the Internet that contains media content immediately available for loading and playback. The response to the search request is media output through the user terminal. The media content is outputted from the user terminal without any additional action on the part of the end user after the initial search request. Once media from one site is completed, the playback module automatically enables the user terminal to access and playback media located on another Internet site. As a result, an embodiment enables the user terminal to output continuous streaming media to an end user, where the media outputted is accessed from multiple Internet sites.

Embodiments of the invention may be implemented on the Internet. Other embodiments may be implemented on any network that carries digital information, such as local-area networks (LANs), Wide Area Networks (WAN), Extranets, Intranets, Internet, and wireless networks, or networks utilizing wireless transmissions. An example of a network for use with an embodiment of the invention includes a network operating under a transmission control protocol/Internet protocol (TCP/IP). Embodiments of the invention may also be employed on proprietary WANs, such as America Online™. Thus, discussion of embodiments employed on the Internet are exemplary, and equally applicable to other types of networks described above.

A system for use with an embodiment includes a network enabled device, a network server module and a database. The network enabled device includes a device having components to couple to a network such as the Internet. The network enabled device includes a communication port and processor, and may also include memory and a display. The communication port may be a physical port, such as a connector extending a modem connection. The communication port may also be a wireless port, such as those configured to transmit and receive radio frequency data communications. Examples of network enabled devices include personal computers, handheld devices such as those operating Windows CE™ or Palm™ operating systems, and cellular phones with Internet capabilities such as Sprint PCS™ systems. Other examples of network enabled devices include smart appliances, such as systems including speakers and a processor to receive communications from the network.

The network enabled device may include a media playback component. The media playback component includes an application that plays back streaming media files. Examples of commercially available media playback components include Real Network Player™, Apple Quicktime Player™, and Microsoft Windows Media Player™.

In an embodiment, network server module includes server-side modules that communicate to the network enabled device through the communication port. The network modules may be coupleable to the network enabled device through a network such as the Internet. Alternatively, the network server module may exist on the terminal. The network server module may, for example, access a database on the network from the terminal. Still further, the network server module may exist on both the terminal and on a server on the network. Specifically, the network server module may comprise network-side code, executed on the terminal through a client application. For example, the network server module may includes applets or Java script delivered to the user terminal for execution of processes and functions, as disclosed herein.

The database stores a plurality of addresses. Each address locates a media network resource. The media network resource includes files that can be loaded into the media playback component to output media. As used herein, media refers to a combination of audio and/or video. Video media may include a collection of images assembled together in an animated fashion to resemble motion or action. Examples of video media include movie clips, recordings from video recorders, and animation such as cartoons. Still further, media may include a collection of still images and graphic presentations that are combined with audio media. Other examples of media include dynamic or animated pictures or text on a web page.

In one implementation, the media files may be loaded and played back to output music or music videos. As another example, media files may include video or animation with story-lines, plots, characters and resemble conventional television or radio programming. Other examples include movie clips, home movies, movie trailers, or highlights from sporting events.

As used herein, a module includes a program, a subroutine, a portion of a program, a software component or a hardware component capable of performing a stated task or function. A module can exist on a hardware component such as a server independently of other modules, or a module can exist with other modules on the same server or client terminal, or within the same program.

The network server module is coupleable to the network enabled device to exchange communications, and to access the database. The network enabled device provides a search request, including a search criteria. The search criteria includes any condition specified by the user to identify some of media files from other media files in the database. Examples of search criterias include titles, artist names, data types, user preferential ratings, quality, and duration.

The network server module selects at least one address from the database based on the search criteria. The identified addresses are signaled to the network enabled device. The network server module may communicate with the media playback component to cause the media playback component to playback the media resource located by the address.

FIG. 1 illustrates a process for use with a system to search for and playback Internet streaming media, under an embodiment of the invention. In one application, the process is performed on architectures described and illustrated with FIGS. 2 and 3. While the process is described with reference to an integral system, one or more steps described with FIG. 1 may be performed independently of other steps. Similarly, components and modules used to perform steps in FIG. 1 may also be implemented in different systems and architectures. Further, steps mentioned with FIG. 1 may be performed concurrently with one other, or in an order different than shown in FIG. 1.

In step 110, a system builds a database of addresses. An address may include a Universal Resource Locations (URL) for network and Internet sites. A media site include, for example, a web site that allows web users to access streaming media. In other embodiments, the media site may locate network media resources on other types of networks. The media sites may be located through a media search engine, as described elsewhere in this application. An exemplary process for identifying media sites under an embodiment of the invention is provided with FIG. 4.

Each media site may provide access to media through one or more media links available at the site or through other means. The media links identify web resources having media content. These web resources may include a file of arbitrary type. Examples of file types include Multipurpose Internet Mail Extension (MIME) types such as MOV, JPEG, or RAM. The file is available for loading, browsing or playback on the World Wide web. Each media link may be either an internal or external link relatively to that particular media sites. An internal media link on a web-site may correspond to a URL that identifies a web resource located on the web domain, host, property or server of that site. An external media link on a media site identifies a web resource that is not located on web domain, host, property or server of that media site.

In step 120, the system identifies and stores in a database media links (URLs) for each media site. An exemplary process for identifying and storing media links on individual media site stored in a database of media site is provided with FIG. 5.

In step 130, each media link is verified. The media link is verified to contain media that is available for playback for users. Thus, broken links, inoperational or unavailable media are precluded from being verified.

In step 140, metadata information is extracted from each media link. Preferably, metadata information is extracted from each verified media link. In an embodiment, metadata may also be added to a list or database of extracted metadata. Additional metadata may be added using, for example, manual interactive editing and an editor interface (see for example, editor interface module 275 in FIG. 2). Examples of metadata information include (with an exemplary data structure type associated with each media link in parenthetical): identification (Integer), author (String), duration (String), media URL (URL), source web site (URL), media type (Integer), rating (Real number), number of votes (Integer), verification status (Boolean), edited status (Boolean), genre type (Index into a genre database table), play-list genre status (Boolean), mix (index into mixes database table), play-list mix status (Boolean), mood (index into moods database table), description (String), clip broadcast quality (integer), image size for videos (integer, integer), and play-list mood status (Boolean). One or more of these types of metadata may be extracted from the media links or from the actual media file. For example, a media link to a web resource may be extracted for identification, duration, author, and source web site. Similarly, one or more of these types of metadata may be added to the extracted metadata information. For example, genre type and description information may be added to the extracted metadata information.

In step 150, the system creates media play-lists using media database for predefined categories. In an embodiment, verified media links are structured into play-lists, such as described with FIG. 10.

In some embodiments, links to streaming media commercials may be inserted into the play-lists in various locations between media clips. These commercials are targeted to the audience likely to listen to the media available on the play-list. The commercial may be produced and broadcast from distributed sources, or from web server module. Other examples of streaming media that can be included with play-lists includes news items and weather reports.

In step 160, a playback interface is provided. The playback interface causes the media player component on the user terminal to play media associated with media links in each play-list. The playback interface may include features to manipulate play-lists, or to switch between play-lists. For example, the playback interface may allow for a user to skip media or web resources until a preferred media or web resource is located. The playback interface is a software or hardware application that is executed on the user terminal. The playback interface may be packaged as a web application, dynamically accessible through a web server module, or be packaged as a desktop software application.

In an embodiment, a playback interface module includes a streaming media clips rating system that allows users to rate each clip as it is played back. The back-end module rating system uses these votes to generate rated play-lists that are available through the playback Interface for playback.

Further, the playback interface module may include a system to allow users to send Internet e-mail notifications to one or more e-mail addressees regarding a media clip, or to send continuous streaming media programs containing multiple media clips from multiple network sources. Recipients may initiate the playback module by selecting one or more links contained in the e-mail. Selecting a link from the e-mail initiates the play back module on that recipient's terminal, causing the play back module to play back the media clip or the programming referred to by the sender.

The playback interface includes user interface elements that allow users to define and execute search criteria for media playback.

Figure 2:
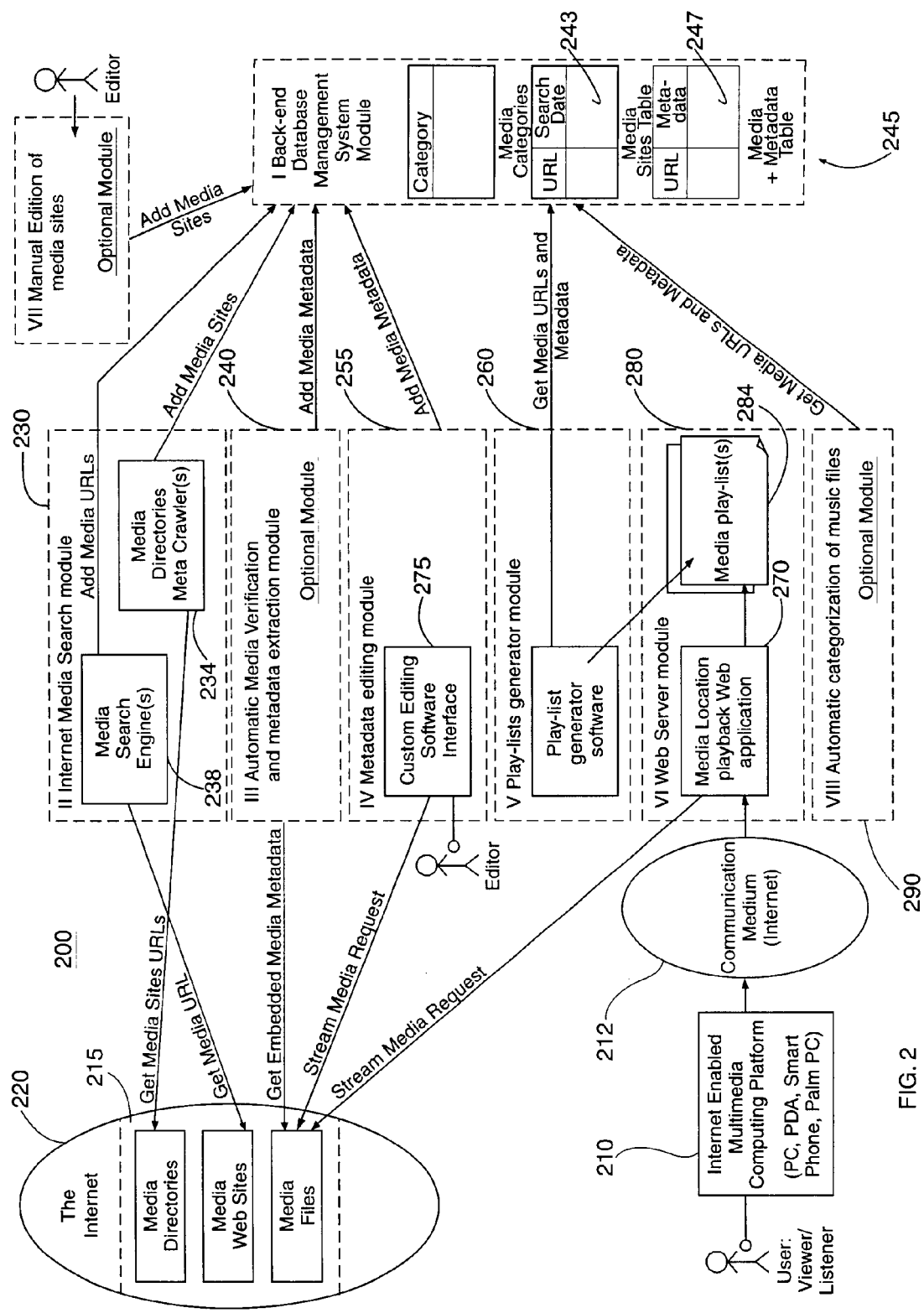
FIG. 2 is a block diagram illustrating an architecture for use with an embodiment of the invention.

FIG. 2 is a block diagram illustrating an architecture of a system 200, under an embodiment of the invention. The system is shown to link a user terminal 210 with media that is accessible on the Internet 220, including the World Wide web 215. Other embodiments of the invention may operate with different types of networks.

The user terminal 210 includes any network enabled multimedia computing platform. In particular, user terminal 210 includes any Internet enabled multimedia computing platform. Examples of computing systems for user terminal 210 include personal computers (PC), personal digital assistants (PDA), smart phones, and Internet enabled televisions and radios, and other devices. The multimedia capability is manifested in the availability of a steaming multimedia playback software and or hardware component. Internet enabling means that the platform can access information over the Internet. In an embodiment, user terminal 210 runs the media location and playback interface module 270 that is accessible over the Internet. A communication channel 212, such as a phone line, wireless medium, or DSL line, is used to couple the user terminal 210 to the Internet. Alternatively, the playback module may be preinstalled on the client terminal. Under both configurations the playback module access media play-lists that are stored on an Internet web server.

A back-end database management system 245 is provided to maintain information used in providing media searching and playback to user terminal 210. The database management system 245 receives information from modules, including server-side modules that communicate with user terminal 210. In an embodiment, modules used to provide media search and playback capabilities to user terminal 210 include a media search module 230, an automatic verification and extraction module 255, an editor module 250, a play-list generator module 260, and a web server module 270. The modules may communicate with an interface of user terminal 210.

Under an embodiment, this communication is implemented using media play-lists on the web server module 270.

The modules may also communicate with software applications or components on the user terminal, such as a web browser application or a Streaming Media player component in a manner that will be described below.

In an embodiment, media search module 230 includes a media directories metacrawler module 234 and a media search engine 238. The meta-crawler module 234 and the media search engine 238 may be operated independently and concurrently of one another. The meta-crawler module 234 conducts a general search of the Internet 220 to locate media sites. Media sites may include web pages that are likely to contain web resources, media links to web resources, or links to other web pages that have such media links and/or web resources. The meta-crawler module 234 adds the address or location of each found media site to a media site table 243 maintained by database management system 245. The media site table 243 may list media sites that identify a URL for each web page located by meta-crawler 234.

In one embodiment, the entire media site table 243 is programmatically generated by meta-crawler module 234, without any manual or interactive human input. In other embodiments, an editor module 232 may interface with database management system 245 to manually input a URL for one or more of the media sites into the media site table 243. Another embodiment may substitute editor module 232 for meta-crawler 234, so that the media subdirectory manually receives a URL for each media site.

The media search engine 238 accesses the media site table 243 maintained by database management system 245. The media search engine 238 identifies media links to web resources on each media site provided in the media site table 243. In an embodiment, media search engine 238 contacts each site in the media site table 243 to locate media links. The media search engine 238 then stores the addresses of each media link in the database management system 245. In an embodiment, a URL of each media link is stored in a portion of a media and metadata table 247.

An automatic media verification and metadata extraction (AMVME) module 240 accesses the portion of media and metadata table 247 that contains URLs to the media or media links. The AMVME module 240 verifies each media link in media and metadata table 247. The media links are verified to contain web resources matching a criteria defining media. For example, each media link may be verified to contain a combination of audio or video, rather than be only a text document. In addition, the media links are verified as available for playback by users, to avoid broken or old links being maintained by database management system 245.

The AMVME module 240 also extracts metadata from the web resource associated with each media link in the media and metadata table 247. Preferably, AMVME module 240 extracts metadata from verified media links. The AMVME module 240 may automatically visit each media link on the Internet to extract metadata information, as well as verification information. The metadata extracted pertains to information available from the web resource or about the web resource on the media link. Examples of metadata that may be extracted by media extraction module 255 include information such as the author, duration, name, description text, broadcasting and playback quality of the media content and frame size and display resolution for images, video and home movie clips. For example, a media link may be associated with a web resource that is an audio media. Metadata that may be extracted from the media creation may include the artist name, the name of the media creation, length and audio/video quality. In an embodiment, media extraction module 255 also verifies that the media is available for playback from the media site. The AMVME module 240 may accesses database management system 245 to store verification and metadata information in media and metadata table 247.

In an embodiment, a metadata editor interface 275 is included in the system 200. The metadata interface 275 accepts manual entry from an editor pertaining to metadata of the web resource associated with each media link. The metadata interface module 275 may access one or more media links in the media and metadata table 247 to allow manual inspection of each web resource for metadata information. An editor operating metadata interface module 275 transmits a media streaming request to have the media of the web resource replayed for inspection on a terminal. The metadata editor interface 275 then allows for additional metadata to be stored in media and metadata table 247. Preferably, the additional metadata information includes metadata that is not programmatically available from the media link containing the web resource. For example, metadata editor interface 275 may be used to add information to media and metadata table 247 information such as genre of the web resource, description of the web resource, and system predefined information, such as mood and mix, that are found applicable by the editor to the web resource.

A play-list generator module 260 generates a plurality of play-lists based on information in the database management system 245. In an embodiment, play-list generator 260 accesses media and metadata list 247 for URLs to media contained on stored media links. The play-list generator module 260 may create play-lists 284 from predefined categories characterized by information stored in the database system for media links and metadata stored in table 247. Play-lists 284 are stored on web server module 270.

Under one embodiment, the web server module 270 includes a media location and playback application. The user terminal 210 interfaces with the media location and playback application through the Internet. For example, web server module 270 makes the media location and playback application available on a web site. The user can launch the media location and playback application by clicking a link on the web site. Under another embodiment, the playback application is pre-installed on the user terminal.

The playback application accesses the web server module 270 to load media play-lists that are stored on it. In an embodiment, the playback application reads Media URLs and Metadata stored in one or more play-lists. This information is used to playback continuous media from the play-lists to the user. A web page or network site hosting the media file being played back may also be displayed as an instance of a web browser on the network enabled device. For example, audio media may be played back while the user is presented with a web page hosting the audio playback (see FIG. 22 and accompanying disclosure).

The media location and playback application may output or playback media processed by the back-end system and stored in the media and metadata table 247 upon receiving a request from user terminal 210. For example, under an embodiment, music may be outputted from user terminal 210 continuously in a manner that resembles a jukebox, Disk Jockey Mix or a radio station.

An interface of the user terminal 210 enables users to skip playback of media clips, or to switch categories. For example, a user on user terminal 210 may select to hear Jazz programming, and then switch to a genre of classical music. One or more features of a user-interface may be used to enable users to make selections (see FIG. 21 and accompanying text). The user may also control playback settings such as volume, pause, seek and retrieve additional media clip information, skip songs, or replay certain songs being automatically played. The user may also control and/or customize the creation of play-lists using the interface. For example, one musical play-list may include a combination of genres, such jazz and classical songs.

In an embodiment, the media location and playback application programmatically controls a streaming media multimedia software or hardware component to perform the actual streaming of the media digital bits to the user terminal's multimedia output device (such as video display and speakers hardware). The media location and playback application contains functionality that responds to software events generated by the streaming media component. For example, a playback error generated by the streaming component may result in the application instructing the component to play another media file. In another example, the application determines and initiates playback of a media clip in response to the component reporting that the currently playing media has finished. The application may contain user interface elements that allow users to issue media playback commands. These commands are dispatched by the application to the component that implements the playback command for the currently played media.

In an embodiment, the media location and playback application works in combination with functional commands provided to the user via a web based software application. A user-interface may be provided to enable the user to select the function commands at the software application. An example of a user-interface is provided below, with FIG. 21 and accompanying text.

In an embodiment, a categorization module 290 accesses media and metadata table 247 to add metadata and to categorize media associated with media links in media and metadata table 247. The automatic process generates metadata such as music genre by consulting with information stored in other records in media and metadata table 247. For example, the module can automatically set the genre metadata information for all media creations available in the table, for a given artists, according to genre metadata entered for one or more media creations by the same artists. This process greatly contributes the efficiency and scalability of the back-end system.

Figure 3:
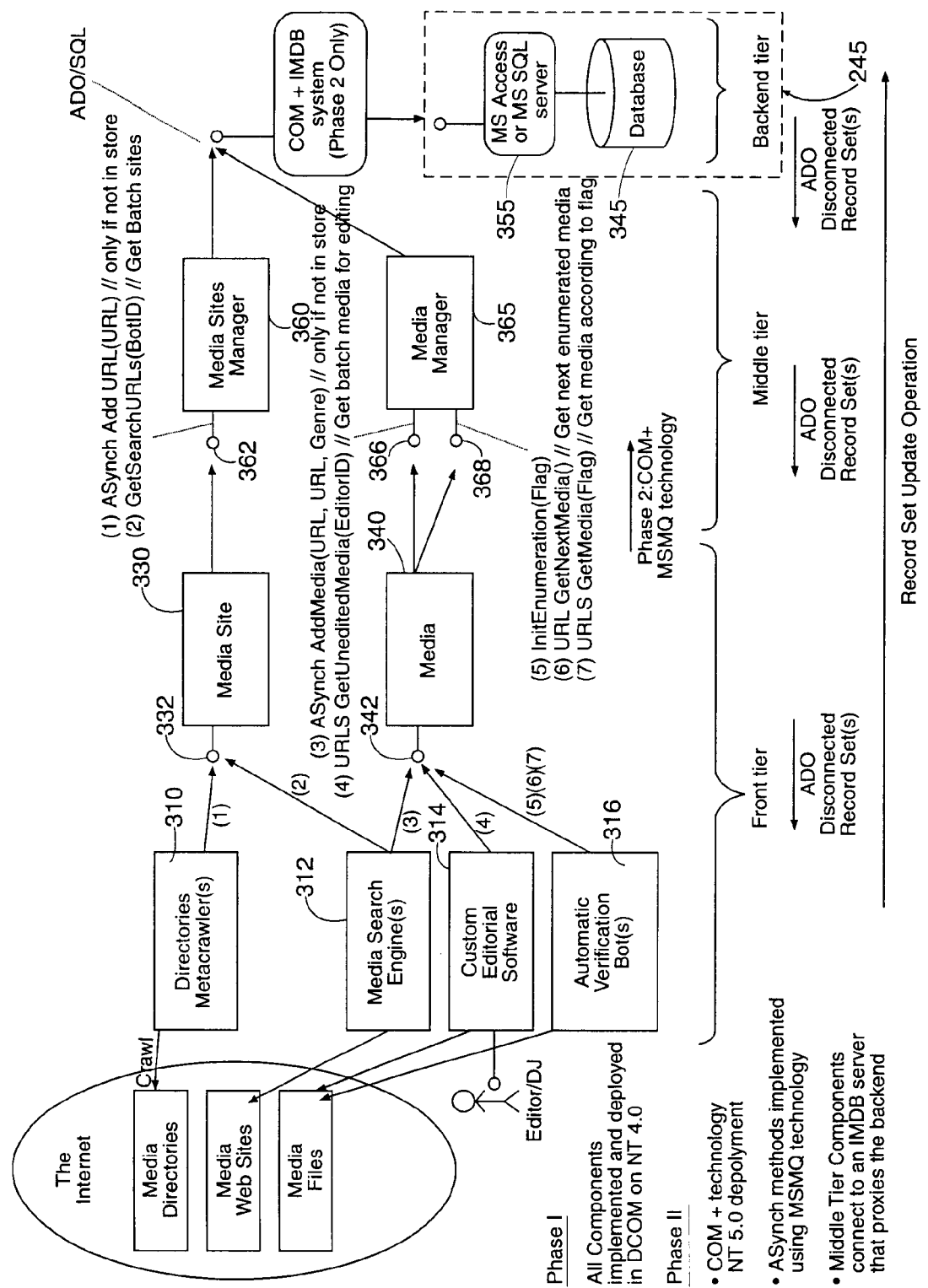
FIG. 3 is a block diagram illustrating a back end architecture, under an embodiment of the invention.

FIG. 3 is high-level system software components diagram for the system 300, under an embodiment of the invention. The diagram shows how software components may be written, deployed and interact to provide the functionality described by system 200. The components of system 200 may be described as a three-tier architecture. Components are written to spec and deployed to a backend tier, a middle tier, and a front tier. The backend tier includes the database management system 245. The database management system 245 includes a database 345 and a backend interface module 355. The backend interface module 355 may be provided with, for example, a Microsoft SQL Server system (MS SQL).

The middle tier includes modules that communicate with backend interface module 355. The middle tier may include a media sites manager 360 and a media manager 365 software components. The media sites manager 360 and the media manager 365 each independently communicate with backend interface module 355. The media sites manager 360 components exposes a programmatic interface 362 to communicate with modules and components in the front tier. The media manager 365 includes a first media manager interface 366 and a second media manager interface 368.

The front tier includes a media site module 330 and a media module 340. The media site module 330 communicates with site interface 362. The media site module 340 communicates with the first and second media manager interfaces 366 and 368. The first and second media manager interfaces 366 and 368 communicate with the media module 340. The media site module 330 includes a front-end interface 332 to a directory metacrawler 310 and a media search engine 312 modules. The media site module 340 includes a front-end interface 342 to the media search engine 312, an editor interface module 314, and an automatic verification module 316. The directory meta-crawler 310 crawls Internet media directories web sites. The links to media web sites are handed over to the MediaSite module 330 for storage in the database. The media search engine 312 searches for media links on web sites provided by the MediaSite module 330, these links are transferred through Interface 342 on the Media module 340 for storage in the database module 345.

The editor interface module 314 obtains media link for editing from the Media module 340, using Interface 342 and loads the media for editorial playback from the Internet. The editors provide metadata for media that are added to the database by the Media module 340.

The verification module 316 examines media files or web resources accessed through each media link and updates metadata regarding media availability in the database using Media module 340. This module also extracts metadata from Internet media and updates this in the database using Media module 340. The module queries the database for a batch of media records using the Media module 340 and automatically verifies and extracts metadata for the Internet media represented by these records.

With respect to communications from the backend tier to the front-end tier, database management system 345 of the backend tier provides records to the system 300. Each record or record set is disconnected from tables or databases of record(s). Disconnected records are transmitted from the backend tier to the front-end tier as active database objects (ADO) Disconnected record sets.

With respect to communications from the front-end tier to the backend tier, each disconnected record can be updated in the database by any components on any tier. Updated records are transmitted to the database management system 345 in the form of record set update operations. In an embodiment, directory meta-crawler 310 sends URLs to be added to records in database 345 to media site module 330 using an asynchronous method calls. The media search engine 312 transmits to media site module 330 using a get search method call for batch sites of URLs. The media search engine 312 uses an asynchronous method call to add media links and metadata associated with media links.

The components and all tiers expose programmatic interfaces that contain callable methods using the MS DCOM (distributed component object model) software component technology. Communication between the tiers is also implemented using method calls on these components. The components are deployed in front, middle and back tier hardware systems. Alternatively, The components may be developed and deployed using the MS COM+ components technology. Using this technology, a COM+ In Memory Database system (IMDB) proxies and caches tables of the back-end database module 245. This process speeds up the search and editorial process. COM+ services such Queued Components may used to implement asynchronous method calls exposed on Interfaces 362 and 366.

C. Media Search Engine

Embodiments of the invention locate web resources on a network such as the Internet. In one embodiment, a network browser identifies a plurality of links to one or more network sites. The links are each selectable to open a network resource of a specified data type. The identified links are then made available to network enabled devices that can select one or more of the links.

As used herein, a network browser is software that performs core functions that include (i) loading network resources; (ii) parsing, translating and laying out network resources, and (iii) displaying the network resources. The network browser includes an application programmable interface (API). An embodiment of the invention employs the network browser on a back end to locate the network resources of the specified data type. One advantage of this embodiment is that the web browser is employed on the back end programmatically, rather than through manual interaction with an editor or other user.

A network browser may include a shell, an API, and a processing module. A component of the network browser includes the API and the processing module. For Internet applications, the processing module may include, for example, a MSHTM or DLL module. The network browser component performs functions that include loading a network resource, as well as parsing, translating, and laying out the network resource.

In an Internet application, a web browser component may be used to locate resources of a specified data type. The web browser component may be a portion of a commercially available browser. For example, the web browser component for use with an embodiment of the invention may be a reconfigured Netscape Navigator™ or Internet Explorer™ browser.

In an embodiment, the web browser component is programmatically controlled through the API of the web browser to access the web resource for the plurality of links. The web browser may be programmatically controlled to bypass the shell of the web browser. For example, the API may be used to instruct the web browser to ignore the shell, or to detach the functionality of the shell. The remaining web browser component then identifies the links to the specified data types. The result is that the web browser component accesses the web resources of the plurality of links to identify the data types of the resources on the links while ignoring data such as images and sound.

In another embodiment, a search module controls the web browser component to access a web site. The search module controls the web browser component to identify a plurality of links to media web resources at the web site. Each of the plurality of links identified by the web browser component are selectable to open a media web resource. The search module stores the plurality of links in the database.

In another embodiment, a database includes a plurality of links to media web resources. The plurality of links are programmatically verified to determine whether each link opens a corresponding media web resource. The verified link are made available to a plurality of Internet enabled devices that select one or more of the links to open the corresponding media web resource.

The links may be verified on the back end using a media player, including a commercially available media player. For example, each link that needs to be verified may be programmatically loaded through an API of the media player. The response provided by the media player to the link determines whether the links are verified.

In another embodiment, the media player may be programmed to identify metadata from the media web resource of each link. The metadata may then be stored in a database associated with the link.

Among other advantages, embodiments enable network links to files of a particular data type to be rapidly accumulated and stored in a database. Each of the links are selectable to open a file on the network. The files may enable a terminal to play back media. In an embodiment, the addresses access media files that can be loaded into the media playback component of the user terminal. The files can be stored in the database with information that characterizes the files associated with the links. Thus, the links may be characterized by, for example, metadata information, and one or more classes of information.

In addition, embodiments enable each link in the database to be programmatically verified, so that there are no broken or unavailable links in the database. Still further, some metadata information may be programmatically identified from each media file. In contrast, existing systems verify links manually, employing interactive users to perform the manual functions. Existing systems also extract metadata information manually.

Figure 4:
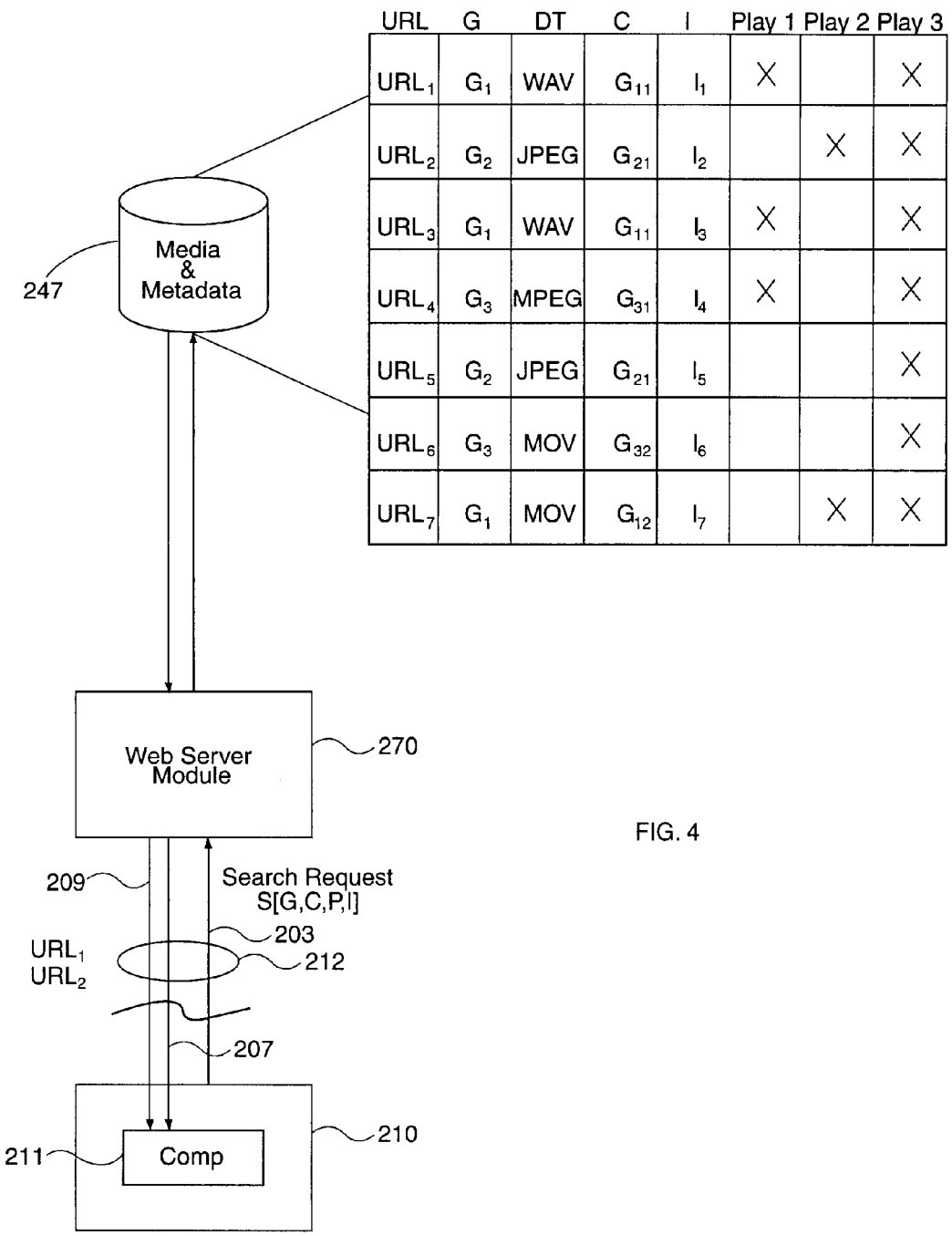
FIG. 4 is a block diagram illustrating a media search and playback system, under an embodiment of the invention.

FIG. 4 illustrates a block diagram in which system 200 receives a search request 203 and provides a response 209. In an embodiment, system 200 processes the search request 203 using the web server module 270 and the media and metadata database 247. The end terminal 210 signals the search request 203 to web server module 270. The web server module 270 accesses the media and metadata database 247 to retrieve one or more URLs matching the search request. The web server module 270 signals the response containing the retrieved URLs to the media playback component 211 of end terminal 210.

In an embodiment, the search request 203 includes one or more criterias that specify a selection of URLs from media and metadata database 247. The criterias may correspond to parameters in media and metadata database 247. The table 249 illustrates a data structure of media and metadata database 247. The table 249 includes a URL list comprising a plurality of URLs. Each URL provides direct access to a web resource containing media. Each URL is characterized by one or more parameters that correspond to metadata information about the web resource associated with the URL. As an example, table 249 provides parameters as being genre (G), data type (DT), category (C), web resource identity, and one or more play-lists (PLAY1, PLAY2, PLAY3).

The genre data is a broad class identifier of the media creation comprising the web resource of the respective URL. For music, the genre may include rock, classical, and jazz. For movies, the genre may correspond to romance, comedy, horror etc. The genre may be identified either programmatically, or through an editor interface. One genre may be associated with one or more URLs in table 249. In the example provided, URL1–URL7 are in either one of three genres, G1, G2, and G3. Alternatively, several genres may be associated with one URL.

The data type parameter corresponds to the MIME characteristic of the web resource associated with the URL. The category parameter may correspond to a sub-class of a genre. For example, in music, a category may correspond to soft rock. In movies, a category may correspond to the time-period of the movie. The table 249 illustrates an example in which the category is unique to the genre. Thus, a web resource of one genre is not in the same category as a web resource of another genre. As an example, URL1 and URL3 are in the same category, as are URL2 and URL5. However, no other URLs are in the same category.

Other metadata information that may be included in media and metadata database 247 include identifier information. The identifier information identifies the web-resource. The identifier may provide name of a specific media creation, as well as an artist or author of the media creation.

In an embodiment, media and metadata database 247 includes play-list information as parameters of metadata information. The play-lists may be identified in any one of several ways. For example, the play-lists may be identified by a unique name or other identifier. The play-lists may be identified by another parameters, such as genre or category type. A Boolean data type may be associated between each URL and each play-lists.

The criterias of the search request 203 specify one or more parameters to media and metadata database 247. For example, search request 203 may include criterias corresponding to one or more of a genre, category, play-list, or identifier. In an embodiment, web server module 270 accesses media and metadata database 247 for URLs that have all of the parameters set forth in the search criteria.

The web server module 270 retrieves the URLs matching the criterias of the search request. The response 209 is signaled to the media play-back component 211. The response includes one or more URLs. It is noted that when play-lists are requested, additional URLs multiple play-lists are provided. The response 209 may also include metadata information. For example, the response 209 may signal to end terminal 210 the duration of the web resource for each URL, the artist, the history, etc.

The web server module 270 further signals control information 207 to access the URL provided in the response 209. The control information 207 causes end terminal 210 to load the web resource for the media playback component 211. Thus, the media playback component automatically loads the web resources associated with each URL included in response 209. The experience provided to end user 210 is that media is outputted in response to inputting a search request. This is in contrast to other systems in which the user is provided links to media sites containing web resources matching the search criteria.

As an example, a user may specify a media creation from a specific category. For example, the user may input a search request for "nature sounds". The web server module 210 accesses media and metadata database 247 for parameters that match "nature sounds". In one application, a play-list is located that is pre-programmed to provide URLs to web resources containing nature sounds. The response 209 then comprises one or more play-lists, each containing multiple URLs to web resources containing nature sounds. In another application, a category parameter or sub-parameter is searched for "nature sounds". The response 209 may include one or more URLs that are not pre-programmed into play-lists. The response 209 may provide URLs to media playback component 211 one at a time, in groups (such as in play-lists), or all at once.

In an embodiment, categorization module 280 may be used to programmatically create one or more parameters such as illustrated by table 249. The parameters may be determined, by for example, identifying metadata information on the media site hosting the URL.

Figure 5:
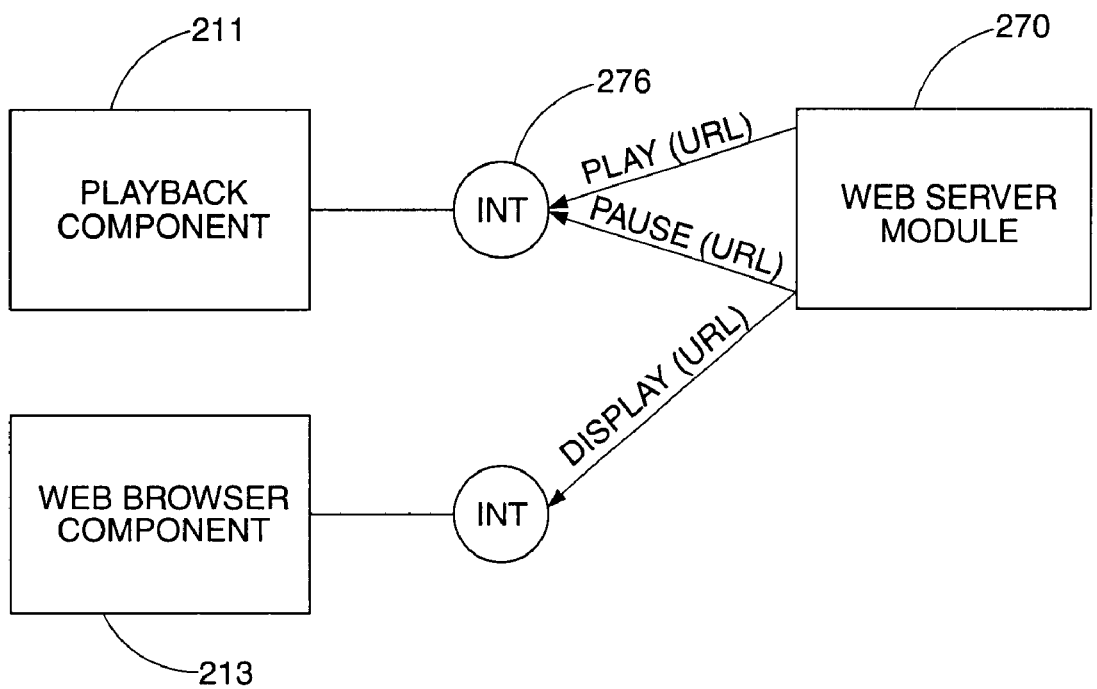
FIG. 5 is a block diagram illustrating components on an end terminal receiving control information from a server-side module, under an embodiment of the invention.

FIG. 5 is a block diagram illustrating the media playback component 211 being controlled by one or more modules of system 200, under an embodiment of the invention. The web server module 270 signals control information to an application program interface 276 of the media playback component 211. The control information may be provided by the media locator and playback application of the web server module 270. The web server module 270 signals commands, with one or more URLs corresponding to media resources selected to be signaled to the user terminal 210. As an example, commands from web server module 270 may be instructions that use each URL as an arguments. Examples of commands that control the media playback component include play (URL) and pause (URL).

As an optional feature, web server module 270 may also signal control information to a web browser component 213 of user terminal 210. The control information may be in the form of commands to access and display a web site associated with the media resource. The commands may be provided to an application program interface 279 of the web browser component 213. This allows the system 200 to display the web site associated with the media resource selected to be played back on user terminal 210. Thus, user terminal 210 may play back media from the media resource while displaying the web site where the media resource is located. One advantage of this embodiment is that it allows users to receive media playback from the media resource in one medium, such as audio, while providing images, audio text, or media not associated with the media resource. Thus, users can listen to songs from media resources signaled to user terminal 210, while viewing banner ads on the web site where the media resource is located.

Each URL signaled from web server module 270 has a network protocol. For media resources, and specifically audio files, types of protocols include "HTTP" protocol, "PNM" protocol (RealNetworks, having .RM extensions), or "RTSP" protocol (having .RAM extensions). The URLs signaled by web server module 270 include the protocol at an initial portion of the string forming the URL. Preferably, for HTTP protocol files, the string portion corresponding to "HTTP" is replaced with "PNM". This adjustment prevents playback component 211 from failing as a result of a bug in the media playback component, particularly if the playback component 211 is a RealNetworks Player™.

The web server module 270 may be either a network-side module, client side module, or a combination of both. In either embodiment, web server module 270 may access the database directly or indirectly.

Figure 6:
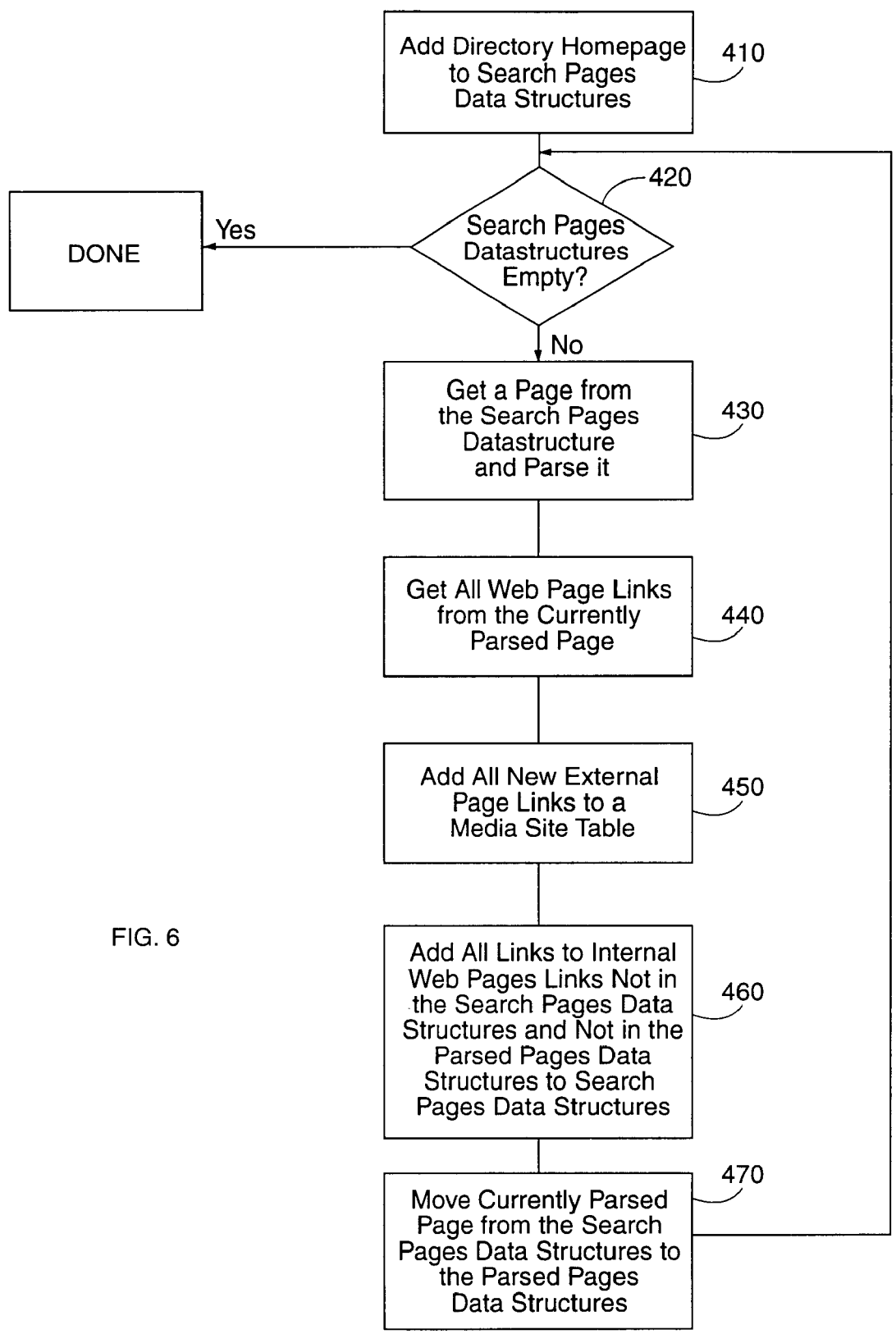
FIG. 6 is a flow chart illustrating a system for forming a search database of media resources accessible on a network, under an embodiment of the invention.

FIG. 6 illustrates a process for a component of an Internet media search module, under an embodiment of the invention. A process such as described with FIG. 6 may be used to build a database of media sites, where each media site includes media links and/or links to other media sites. In an embodiment, the process of FIG. 6 is applicable to metacrawler module 234 in system 200 (FIG. 2).

The process of FIG. 6 is a backend operation that is unobservable to a user of the user terminal. Preferably, the flow process of FIG. 6 is an automatic or programmatically controlled process, conducted periodically. For example, media links may be identified and stored under a flow process such as shown by FIG. 6 every few days or weeks. The duration between executions of the flow process of FIG. 6 maybe referred to as an idle period.

The process of FIG. 6 provides for extracting URLs of media sites from a web pages directory. Examples of a web directory for use with an embodiment of the invention includes directories on web sites such as Yahoo.com® and Lycos.com®. The flow process of FIG. 6 is a backend operation that is unobservable to a user of user terminal 210. Preferably, the flow process of FIG. 6 is an automatic or programmatically controlled process that does not require human interaction.

In step 410, a directory home page is added to a searched-pages data structure. The searched-pages data structure maintains. A similarly structured parsed-pages data structure is also maintained to hold URL of pages already processed by the module. The parsed-pages data structure indicates whether a home page web directory was previously parsed by the process. The searched-pages and parsed-pages data structures are keyed or indexed by URL and they support querying for existence of a given URL in them. Examples of keyed or indexed data structures include database tables and hashtables.

In step 410, the parsed-pages data structure is empty, indicating that the directory home pages in the searched-page data structure have not been parsed.

In step 420, a determination is made as to whether the searched-pages data structure is empty. If the determination is affirmative, the flow process is done. This occurs when the process has parsed all the Internal web pages in the directory. If the determination is negative, a current page link is called from the searched-pages data structure in step 430. The current page is then loaded into memory and parsed. Parsing means loading and reading the HTML source (or equivalent) code of the web page so its content is accessible and in a machine-readable format.

In an embodiment, the page is parsed using an HTML parser component. An example of an HTML parser is a web browser. Thus, the current page may be parsed using a web Browser component. Specifically, step 440 of the process may be implemented using an application program interface (API) that is exposed by the web Browser component. In this context, the web Browser component is configured and used in a back-end server process with no visible presentation area or end user. It is configured not to load or render media at the web page so that the loading is more efficient. The configuration may occur through the API.

In an embodiment, the web browser is configured to parse web pages efficiently by, for example, automatically excluding a presentation layer from being displayed. Further, the web browser may be programmatically configured to not load or parse information that is not critical to the search function. For example, the web browser component can be configured to not load media data found on web pages.

In step 440, all links to media sites on the currently parsed-page are determined using the parser. The HTML parser API allows access to the page document object model. In step 450, all new external page links are added to the media sites database. An example of a web-page data structure is provided with media site database table 243 (FIG. 2). The database stores the URL of the media sites and not the sites themselves. New external page links implies media sites that are not already indexed or present in the media site database.

In step 460, all URLs also link to internal links found on the currently parsed page are added to the web pages data structure, provided that the URL in question is (i) not already existing in the searched pages data structure and (ii) not already existing in the parsed pages data structure. In step 470, the currently parsed page is moved to the parsed pages data structure, and the flow process returns to step 420. This process adds the URL of all the media sites indexed by the directory to the media sites database.

Figure 7:
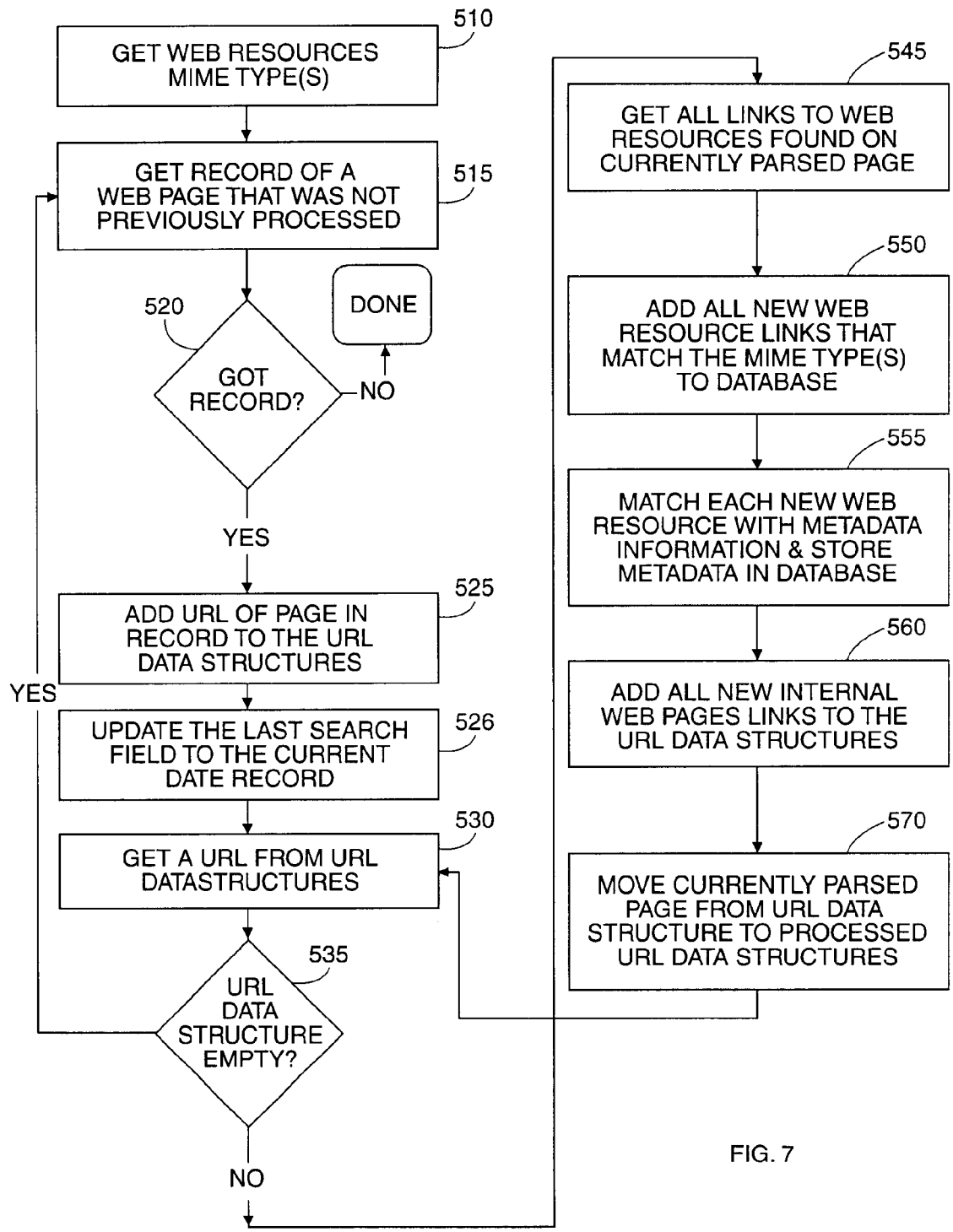
FIG. 7 is a flow chart illustrating a system for forming a search database of media resources accessible on a network, under an embodiment of the invention.

FIG. 7 illustrates another component of an Internet media search module, under an embodiment of the invention. A process such as described with FIG. 7 may be used to identify and store media links to web resources that are accessible from one or more web site. The process of FIG. 7 may be used in conjunction with a process such as described with FIG. 4. In an embodiment, the process of FIG. 7 is applicable to media search engine 238 in system 200 (FIG. 2).

In an embodiment, the flow process of FIG. 7 is a backend operation that is unobservable to a user of the user terminal. Preferably, the flow process of FIG. 7 is an automatic or programmatically controlled process, conducted periodically. For example, media links may be identified and stored under a flow process such as shown by FIG. 7 every few days or weeks. The duration between executions of the flow process of FIG. 7 maybe referred to as an idle period.

The flow process of FIG. 7 assumes access to a media sites database store. The database includes URLs to each media site. An exemplary database of media sites includes media sites and metadata table 243, described with FIG. 2. Each record contains a URL field for media site and a field indicating the last date, if any that the process described in FIG. 5 lastly processed the web site at the URL in the URL field. Reference to a media site that is parsed implies that the media site was programmatically examined for media links to web resources, and for links to other media sites using a process such as the one described in FIG. 5.

In step 510, MIME types are determined for web resources. Examples of MIME types that can be selected for step 510 include JPEG, MOV, RAM and WAVE.

In step 515, a record for a media site is fetched or received from the database. A condition of the media site received is that the media site was not parsed by the process described here during the idle period. This condition may be specified by checking, for example, the date field associated with the record. For example, a date field may indicate when the media site was previously parsed.

A determination is made in step 520 as to whether a record and a URL was received in step 515. If no URL was received, the system interprets that all media sites in the database have already been parsed during the idle period. If a URL is received, the system in step 525 adds the URL of the media site to a URLs data structure of media sites to be processed. The URL data structure of unparsed media sites may be indexed or keyed. For example, the URL data structure may be a list, or a hashtable software data-structure.

In step 526, the last search field of the record fetched in step 515 is updated with the current date to indicate that the media site is parsed. In an embodiment, the field corresponds to a date in which the last parsing occurred.

In step 530, a URL in the date structure of unparsed media sites is fetched or received. If in step 535, a determination is made that the URL data structure is empty, the system returns to step 515. As will be further described, the flow process returns to step 515 only when step 570 is completed. If a determination is made that the URL data structure is not empty. Thus, steps 510–545 allow the flow process to distinguish between when a media site is being parsed for the first time, or has been previously parsed by the process during the idle period.

In step 545, media links on the media site fetched in step 530 are extracted from the HTML code of the page fetched in step 530. The media links are associated with web resources on that media site. In step 545, the media resources may be in any MIME format recognizable as media. In an embodiment, the currently parsed page is parsed using an HTML parser. An example of an HTML parser is a web browser. Thus, the media links may be extracted using a web browser. Specifically, the media links may be extracted using an application program interface (API) provided by a web browser software or hardware component. The web browser may be configured to perform this task efficiently by, for example, excluding a presentation layer. Further, the web browser may be programmatically configured to not load or parse information that is not critical to the search function. For example, the browser component may be configured to not load media data found on web pages.

In step 550, new media links on each media site that match the MIME format specified in step 510 are added to a database. New media links refers to media links that do not already existing in the database from, for example, a previous execution of the flow process. In step 555, metadata is extracted from each new media link found in step 550. The metadata may also be stored in the database, with a reference to the URL the media that the metadata refers to. An exemplary database is provided with media and metadata table 247 (FIG. 2). An example of metadata is the URL of the web Page that provided a link for each media URL.

In step 560, the URLs of all new internal media site links on the media site currently being parsed are added to the URL data structure. New internal media site links refers to URLs of media sites that do not already exit in the URL data structure and that are not in the parsed URL data structure.

In step 570, the currently parsed page is removed from the URL data structure and added to the parsed URL data structure. The flow process returns to step 530.

D. Verification and Extraction Flow Processes

Figure 8:
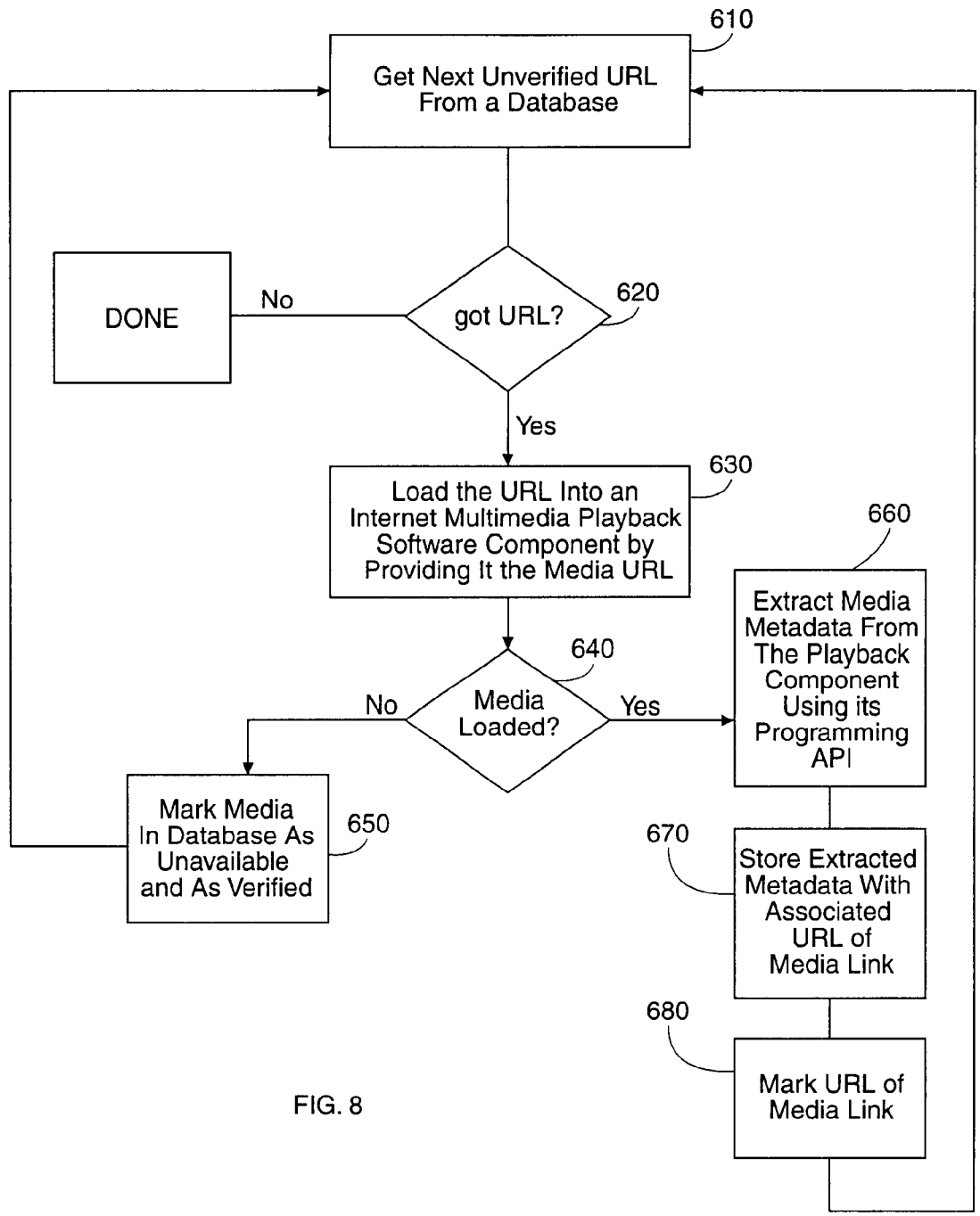
FIG. 8 is a flow chart for verifying records in a search database of media resources, under an embodiment of the invention.

FIG. 8 illustrates a flow process that verifies and extracts metadata from Internet streaming media files. While media links are specified, other embodiments of the invention may employ the flow process of FIG. 8 within a system that incorporates verification and extraction of any content or resource associated with links stored in a database. A specific application employs a process such as described with FIG. 4 in the system 200. In the system 200, flow process of FIG. 8 may be performed by the AMVME module 240.

In step 610, a module operating the flow process of FIG. 8 fetches or receives an unverified URL from a database. An example of such a database is provided by media and metadata table 247 (FIG. 2). The unverified URL corresponds to a media link on a media site stored in a database such as the media site database 243 (FIG. 2).

In step 620, a determination is made as to whether a URL for a media link is present. If the URL to the media link is not present, the module assumes all media links have been determined as being verified, and the process is done.

If a URL exists, the module in step 630 loads the URL into an Internet multimedia playback software component and programmatically control the component to provide metadata embedded in the media file. In response to this request, the component loads some or the entire file over the Internet and provides the process with this information. In step 640, a determination is made as to whether the media or web resource associated with the URL was successfully loaded over the Internet by the module. If the determination is that media was not loaded, then in step 650 the URL associated with the media link is marked as unavailable and verified. The media is marked as verified to prevent the process from revisiting it once it already extracted metadata for it and verified it. The availability mark assists the flow processes described in FIG. 9 and FIG. 10. The determination may be in the negative if, for example, the media link is old and no longer contains a media file that is available for playback through its URL, or if the media link contains content other than what is designated as media.

In an embodiment, the process may use an availability rating for each media. Under such schema, each media is assumed to have the maximum availability score. For media that are currently not available for playback, step 650 may lower the score by one. The system may consider the media as unavailable if its score is below a predefined threshold. This process is useful since Internet streaming media availability may vary according to factors such as web server load and the time of day or year.

If the media is loaded, then in step 660 the media metadata is extracted from the playback component. Examples of metadata that can be extracted in this step include artist name, playback duration, playback quality, frame size etc.

In step 670, extracted metadata is stored in a database with the associated URL of the media link that was presently verified. In step 680, the URL of the media link presently verified is marked as verified in the database. The flow process then returns to step 610.

Figure 9:
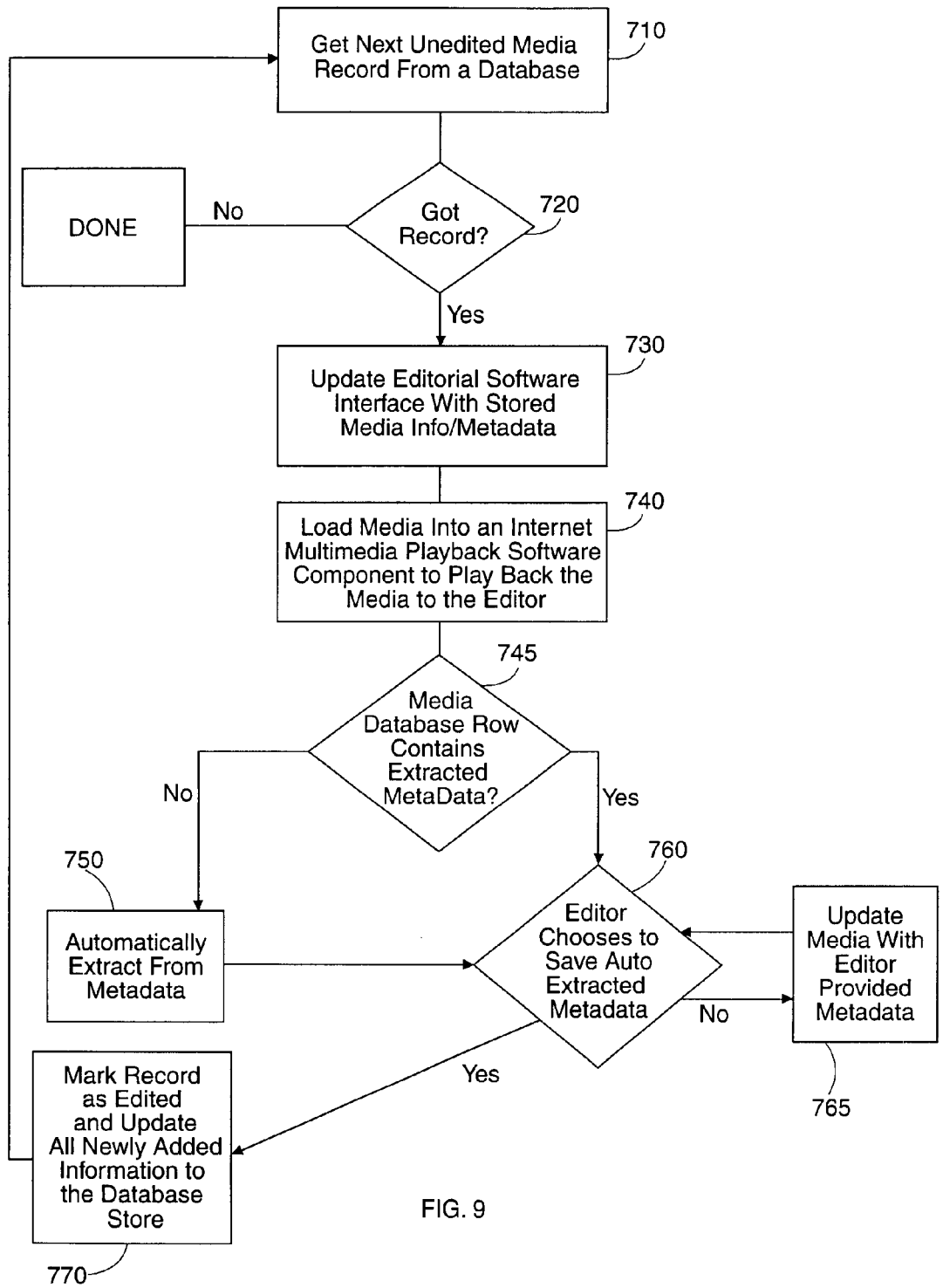
FIG. 9 is a flow chart for extracting metadata about a media resource associated with a site on a network, under an embodiment of the invention.

FIG. 9 illustrates a process for interactively adding metadata to URLs of media stored in a database. In an embodiment, the database may correspond to verified URLs of media links determined in FIG. 8. For example, a process such as shown by FIG. 9 may be performed on information stored by AMVME module 240 in media and metadata table 243. The process of FIG. 9 may be performed by a module interface, such as editor interface 275 (FIG. 2).

In step 710, an unedited media record is fetched or received by an interface module from a database. The unedited record may be one or more categories of metadata and other information about a media link, media site, or web resource. In an embodiment, the unedited media information includes a URL to a media link, as well as metadata extracted programmatically, such as described with FIG. 8. In step 720, a determination is made as to whether a record was received. If no record is received in step 720, the flow process assumes there are no unedited records remaining in the database, and the process is done. If a record is received, the in step 730 the interface module is updated with the record received. This may correspond to displaying the record fields to the editor operating the editor interface.

In step 740, the web resource associated with the record received is loaded into an Internet multimedia playback software component. Preferably, the software component is programmatically constructed and controlled by the module interface. The software component plays back the media to the editor. The editor is able to experience the media played back from the web resource associated with the media link. The editor is able to determine metadata information regarding the web resource. For example, the editor may determine mood, genre, quality, appropriate mix name, and description of a web resource such as an audio media creation or a home movie clip. In an embodiment, the editor controls playback of media located by the search engine on the network side, such as by pausing and playing media back through an editor interface.

In step 745, a determination is made as to whether the record received also includes previously determined metadata. The previously determined metadata may be extracted programmatically in another process, such as described with FIG. 8. If the determination is made that the record received does not contain extracted metadata information, then in step 750 the editor interface automatically extract metadata from the web resource associated with the URL of the record. To accomplish this step, the editor interface may access another module that automatically extracts certain types of metadata information. For example, the editor interface may forward the record to AMVME module 240 (FIG. 3) that performs a flow process such as shown by FIG. 8.

Once metadata is included with the record, then a determination is made in step 760 that the editor operating the interface module may choose to save the auto-extracted metadata already included with the record in the database. If the determination to step 760 is negative, then in step 765 the editor updates media information with editor provided metadata using input elements on the editorial software user interface. Once the determination in step 760 is positive, the record is marked as edited and updated in step 770. Then, all the newly added metadata for the media record is updated to the database. The process then continues from step 710 for the next unedited media. The media is marked as edited so it won't be included for editing in the process.

Figure 10:
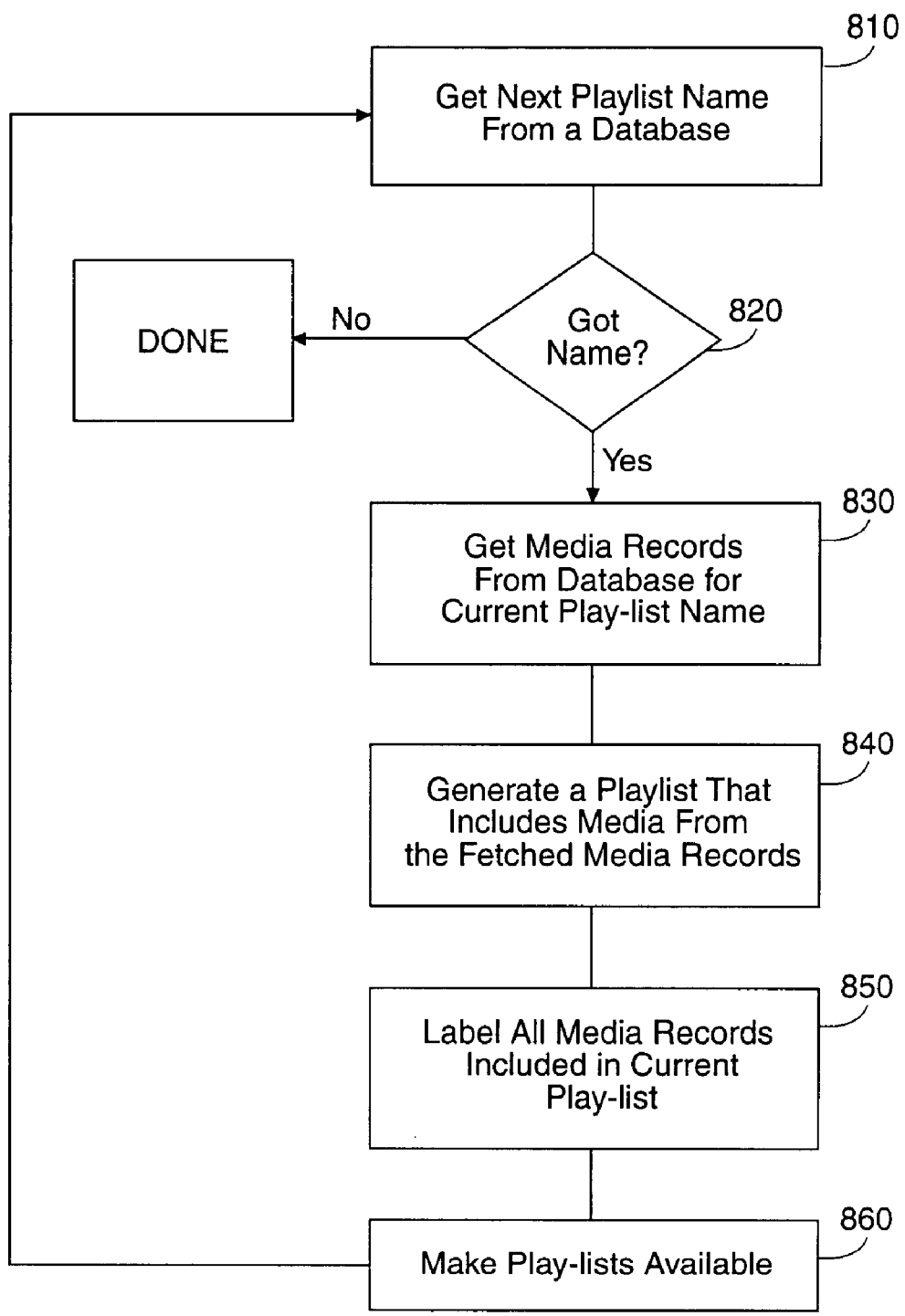
FIG. 10 is a flow chart for forming play-lists for end users of a system under an embodiment of the invention.

FIG. 10 illustrates a process for generating a play-list. The flow process of FIG. 10 assumes that play-lists names are predetermined and stored in a database. Each play-list is identifiable by its name. For example, classic music, jazz and rock. The play-lists include records of media links. In an embodiment, a record includes at least a URL to a streaming media that is categorized in a database as belonging to the play-list name. In step 810, a play-list name is received from the-play-lists database. In step 820, a determination is made as to whether a play-list name was received. If the determination is negative, the system assumes it produced play-lists for all play-lists names, and the flow process is done. This process is routinely executed to add all newly added media to the appropriate play-lists.

In step 830, media records that match search criteria are fetched from the media database. The criteria is that each record play-list record field must match the current play list name obtained in step 810 and that the 'in-play-list' record field for the play list name has False value. In step 840, a play-list is generated to include all media stored at the records fetched is step 830. The new play-list contains one record entry for each fetched media record. Preferably, each play list record includes media URL and metadata information that is obtained from the media database record.

In step 850, the media records called in step 840 are labeled as being in the "in-play-list" for the current play-list name. This is achieved by setting the "in-play-list" value for the media database record to true for the appropriate play-list name.

In step 860, the generated play-list is made available to a server-side module, such as web server module 270 (FIG. 2). As an example, the play-lists may be stored, copied or appended to be made available on the web server module. Once the play-lists are available on a server-side module, media URLs and metadata stored in the play-lists is made available to the user terminal so that the user terminal may customize media output available from the play-list. Specifically, one or more playback applications that run on the user terminal may read the play-lists, access media links on the play-lists, continually play-back streaming media from media URLs in the play-list and present media metadata to users for further interaction. The play-list may also be configured to provide access to a client-side media player component that uses a URL of a media link to load and play the media associated through it. Additionally, users may further modify and edit play-lists to create personalized media programming. Further, play-lists may be dynamically generated by a web application in response to a request for media playback made on the user terminal.

Figure 11:
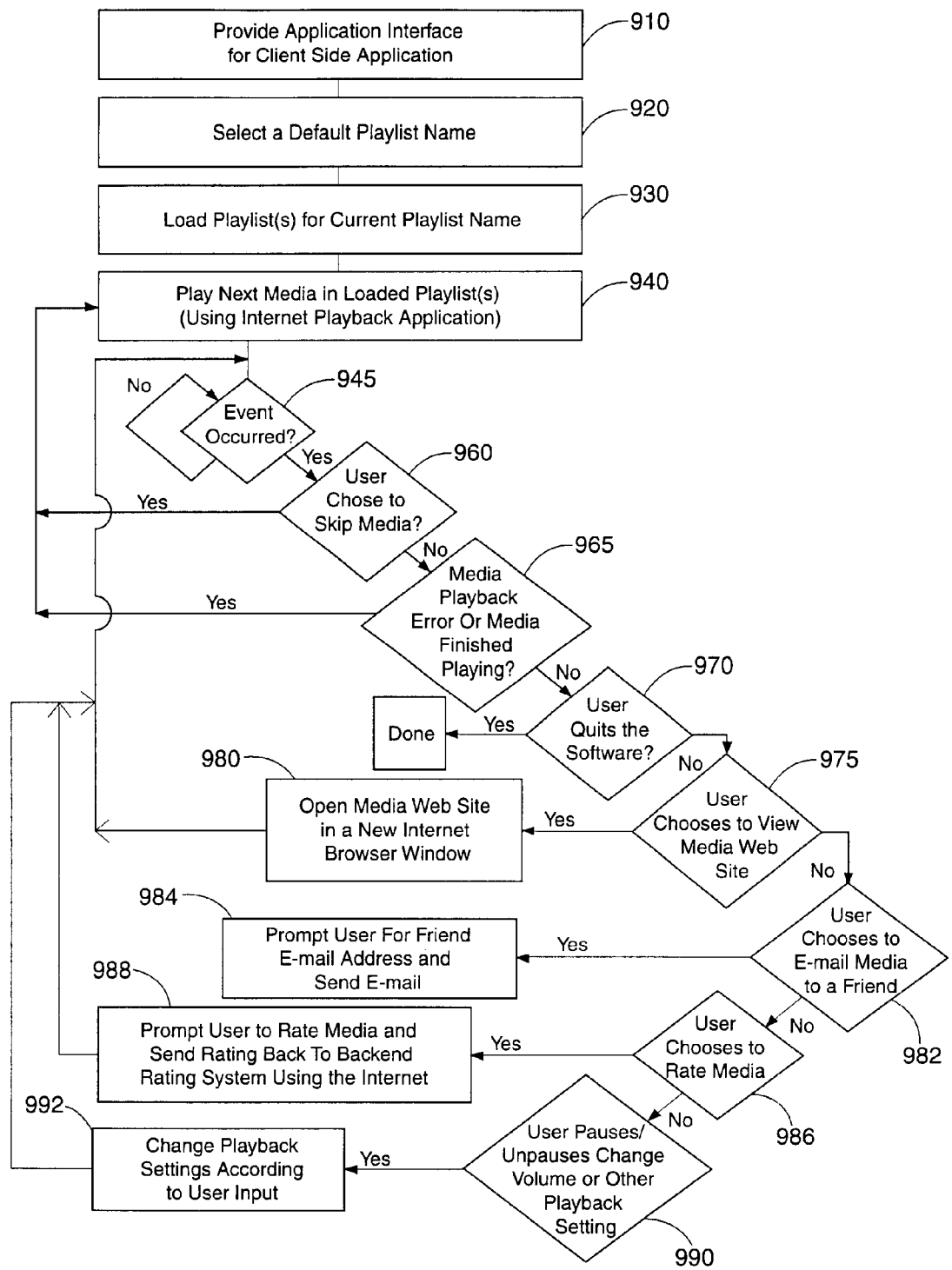
FIG. 11 is a flow chart for receiving user input in response to playing back media resources from a search database, under an embodiment of the invention.

FIG. 11 is a flow process for software or hardware application that enables a user terminal to playback streaming media programming determined by play-lists. An embodiment described below assumes that play-lists are available for the process, and that play-lists are identifiable by play-list names. For example, the play-lists may be dynamically generated by the play-list module, in response to a search criteria signaled from a user terminal. The play-lists may also be manually generated by editors on the network side. The play-lists may be predetermined by, for example, a process described with FIG. 10. The playback component can access the play-list without any direct interaction with server side modules.

In an embodiment, the flow process employs a streaming media player component installed on the user terminal. The media player may be preexisting on the user terminal. Examples of media players for use with an embodiment include RealNetwork Player™, Microsoft Windows Media Player™, and Apple QuickTime™. The application described in the process may be web based or installed on the user terminal.

In step 910, an application interface for a media player on the user terminal is provided.

In step 920, a default play-list name is selected from a list of play-lists. In an embodiment, a database of play-lists is stored on or accessible through the web server module 270. The play-list generator module creates and stores play-list on the web server module to provide the interface with the user terminal 210 and media player stored thereon. Each play-list may store two or more media links, and preferably a plurality of media links.

In step 930, one or more play-lists for the current play-list name are loaded. In step 940, media is presented and played-back on the user terminal. To playback media, server-side modules may provide the media player with URLs to media links that are stored in each play-list. Each play-list may include one or more media link URLs and media metadata. The user terminal then accesses the URL and loads the web resource associated with that media link into a streaming media playback component on the user terminal. Media playback on the user terminal includes outputting, for example, audio and/or video stored in digital format on web resources associated with a media link. In embodiments where the web resources include video media, the step described may dynamically adjust the interface size and the playback component that will handle the actual playback according to the media clip metadata.

Under an embodiment of the invention, the media playback component continuously plays back media by (i) accessing a first site on the network and playing back media from the first site, (ii) then automatically accessing a second site and playing back media from the second site. The media sites may be provided by play-lists which that are made accessible to the media playback component. The sequence for automatically and continuously playing back media may be repeated for each media link included in the play-list. The play-lists may include hundreds of media links, thus allowing the media play back component to automatically and continuously play back media using numerous sites on a network. As a result, a user is able to experience continuous media play back for hours at a time.

The user terminal also includes an interactive interface to affect the media being played back. An end user on the user terminal may choose to manipulate media playback through one or more commands that may be inputted through the application interactive interface or presentation layer.

In step 945, a determination is made as to whether an event occurred. If an event occurred, the flow process determines the event. The flow process may determine the event that occurred sequentially or concurrently. Preferably, the flow process is configured to receive media playback event from the streaming media playback component. If the event is to skip the currently played media, then a determination in step 960 causes a corresponding action of the media being skipped, and the process step returning to step 940. If the process received a playback error event, or an playback error event, then a determination in step 965 causes the flow process to return to step 940 to playback media from the next web resource of the play-list or play-list name.

If a user quits the application, or signals to quit, then a determination in step 970 causes the flow process to be done. In step 975, a user may choose to view a new media web site while media is being played back on the user terminal. Then in step 980, the media web site is opened in a new Internet window, preferably using the client side web browser.

In step 982, a determination is made as to whether the action selected by the user on the user terminal is to send an e-mail message to one or more e-mail addresses that allow the receiver(s) to playback the current media and the current play-list played by the sender at the time of the event. A user may send either an e-mail containing the URL, the play-list, the play-list name or a URL link. When the message receiver clicks on the link, his terminal will execute the media playback application and will start playing back the media and the play-lists played at the time of the message-sending event. If the determination is positive, then in step 984 the user terminal prompts the user for an one or more e-mail addresses, and then prompts the user to transmit the e-mail. The user need not have an e-mail client software application for the operation to succeed. The e-mail may be directed to terminals having a streaming media playback component and Internet access.

Preferably, the e-mail message is directed to a user having a user terminal that communicates with server-side modules so that the recipient user terminal is automatically plays back media from the transmitted media link received upon the e-mail being opened. Thus, server side modules may receive addresses from the terminal and act as the source of the email addressed to one or more recipients.

In step 986, a determination is made as to whether a user wishes to rate a media played back from the media links. If the determination is positive, then the user is prompted to rate the media in step 988. A rating value is transmitted to a backend web rating system application using the Internet. This operation is part of the service rating system that includes server side modules that produce, in combination with this operation, top and bottom rating media in each media category.

Step 990 illustrates other exemplary actions that may be received from a user on the user terminal interfacing with the playback application. For example, user actions may correspond to pausing media playback, adjusting volume, picture controls, size, seeking within the media, etc. In step 992, playback settings are changed according to user input. In an embodiment, the flow process returns to step 945 to check for another event if any of the determinations in step 982–992 are negative.

E. Rating System for Media Play Back

An embodiment of the invention includes a rating system with a media search and playback system. The rating system allows users to listen or view media segments available over the Internet according to a rating. In addition, users participate in determining rating media segments by providing a rating input after listening or viewing a media clip. The ratings may be used as a category, similar to other categories such as genres or categories.

Figure 12:
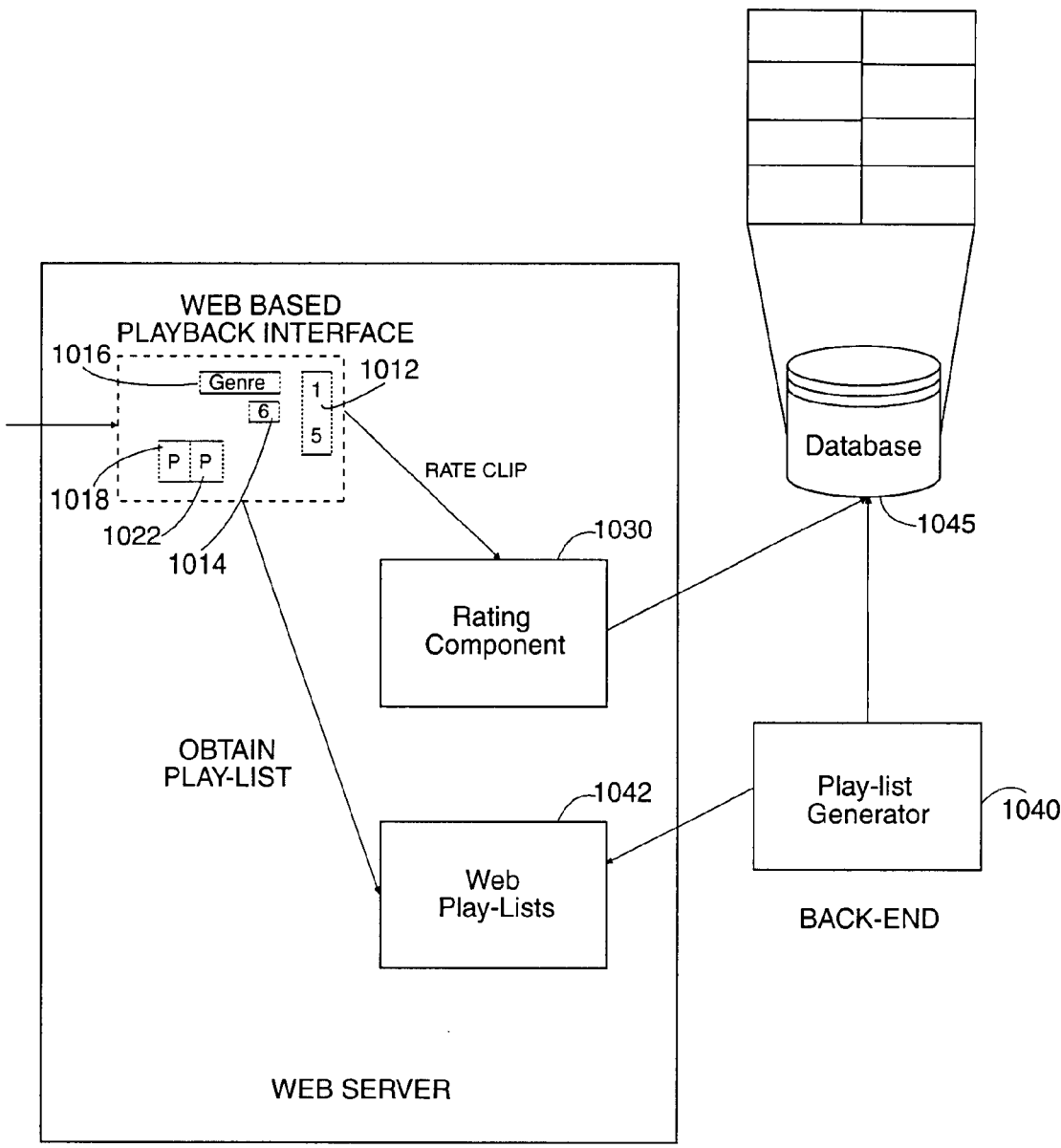
FIG. 12 is a block diagram of a media playback system including a rating feature, under an embodiment of the invention.

FIG. 12 illustrates an architecture for use with the rating system, under an embodiment of the invention. The rating system 1000 may be employed with, for example, the system 200 (FIG. 2). The rating system 1000 may include or cooperate with components of a system such as described with FIG. 2 to enable the user view and/or select media clips from play-lists. The generated play-lists may contain a list of links to media on the Internet. Selection of media clips by the user causes media to be played back to the user over the user terminal.

The rating system 1000 includes a backend database management component 1045. The database management component 1045 maintains organizational data structures such as tables that describe rating information for media clips. The media clips include Internet streaming audio or video. The rating information may be in the form of values such as, for example, total votes counted. In an embodiment, database management component 1045 maintains records that comprise meta information on each media clip including the URL to the media clip, the current rating of the media clip, and the total votes for that media clip.

A user 1010 on a user terminal interacts with a web-based playback interface 1020. As an example, play-back interface 1020 outputs play-lists 1018, 1022 to the user. The media clips in each play-lists may be outputted automatically, or displayed for the selection of the user. The play-back interface 1020 may also display to the user genre field 1016 or category field 1014 of the selected media clip, or play-list 1018, 1022. The playback interface 1020 includes features to enable a user on the user terminal to make entries or selections regarding preferences and opinions, as well as other types of information. The user may also view ratings stored on backend database 1045. The user may enter selections by, for example, using icons or other display features. The user may make entries by, for example, inputting text or voice. FIG. 12 illustrates a rating selection component 1012 as a feature of play-back interface 1020. As an example, the rating selection component 1012 allows users to rate a media output between a scale of 1 to 5.

A user 1010 may input a rating to play-back interface 1020. The rating is signaled from play-back module 1020 to a rating module 1030. In an embodiment, rating module 1030 maintains a tally for each media clip. The tally compiles ratings received from playback module 1020. The ratings may be received from more than one user and/or user terminal. The tally may be implemented through a protocol that enables the rating module 1030 to organize media clips according to an order. The organization of the media clips may correspond to a user preferential list, where preferred media clips are, for example, listed together or listed before less preferred clips. The rating module 1030 may also determine a genre, category, or other organization information through selections or entries received from the playback module 1020. The selections may be tallied through any protocol, such as summation, averages, weighted averages and moving averages. In another embodiment, the rating module 1030 may maintain a text field to store user comments regarding each media clip.

In an embodiment, the rating component 1030 updates the rating information maintained in the database management component 1045. For example, the rating component 1030 may update values of the current rating and total votes for each media link.

A play-list generator 1040 generates play-lists based on rating information maintained in the database management component 1045. The play-list generator 1040 may signal to retrieve or receive records for each media clip. The play-list generator 1040 then automatically generates one or more play-list 1042. As previously discussed, each play-list is a list of media links. In an embodiment, the play-lists 1042 are generated according to the current rating and/or rating for each media clip. The generated play-lists are provided by the play-list generator 1040 for the play-back interface 1030.

The user 1010 may choose to listen to play-lists containing media clips rated according to one or more criteria. The play-lists may also be organized according to other factors, such as genre and category.

Figure 13:
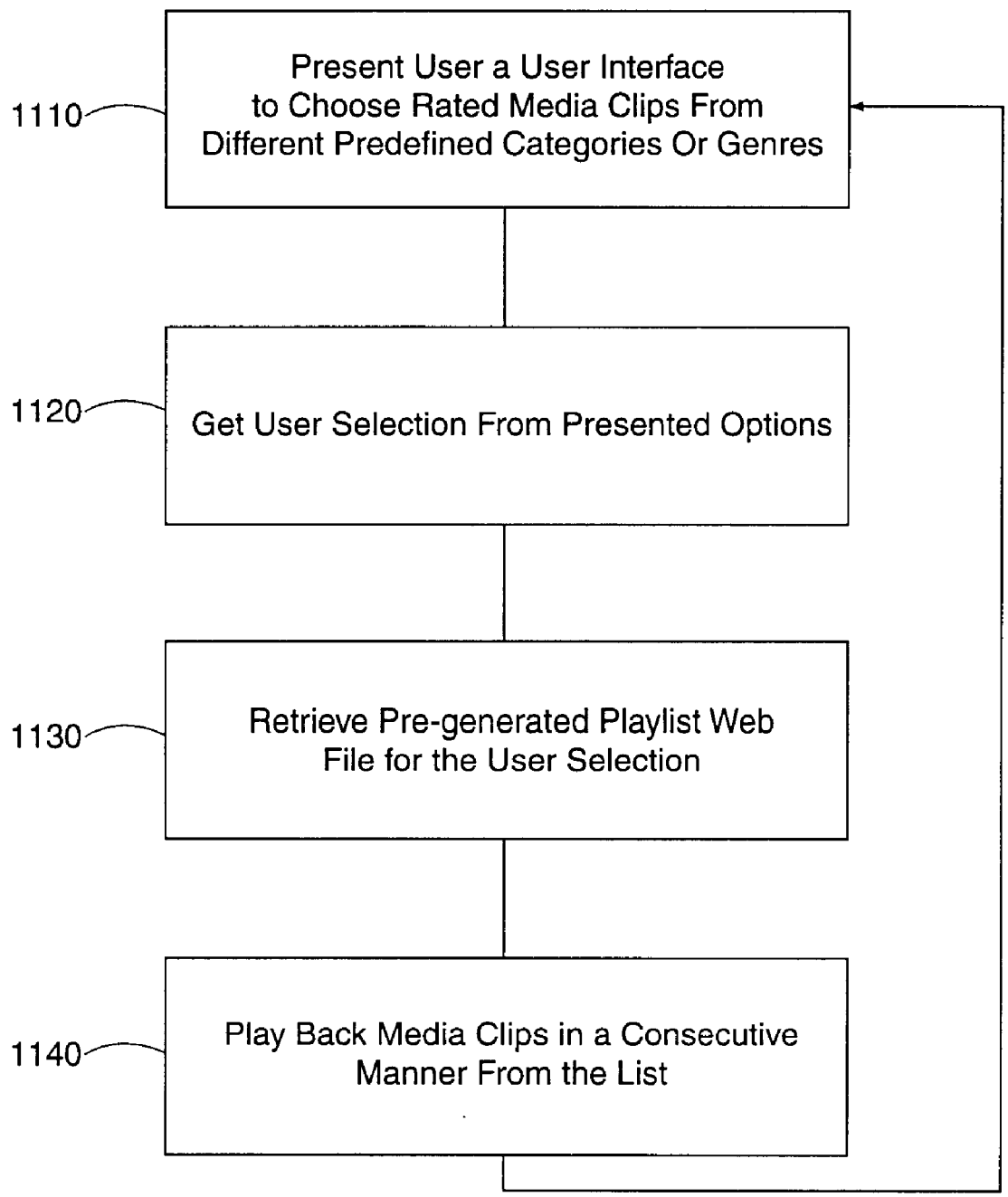
FIG. 13 is a flow chart describing user input to a user interface for a media playback system, under an embodiment of the invention.

FIG. 13 is a flow chart that allows a user to listen to media clips that are rated according to one or more criteria. In step 1110, the user is provided a user-interface that allows users to receive media sorted according to one or more categories. The categories correspond to genres, such as type of music etc.

In step 1120, the user selects a category from the options presented by the user-interface. In response to the selection, the user terminal is provided one or more play-list in step 1130. The play-list received by the user-terminal matches the category or genre selected by the user. Further, play-lists contain predetermined media links to media clips. The media clips in each of the play-lists are determined according to a rating system, using a system such as described by FIG. 12. The predetermined play-list may correspond to a play-list generated by play-list generator 1040 (FIG. 12). Once the play-list is received by the user terminal, the flow process returns to step 1120.

In step 1140, media clips are played back on the user terminal. The media clips are played back consecutively and automatically, so that the user experiences continuous media playback. For example, the play-lists may contain numerous media creations from a selected genre. The media creations may be determined for the play-list according to a rating formula. The user is provided the media creations of the selected genre continuously, so that the user's media experience resembles listening to an album.

Figure 14:
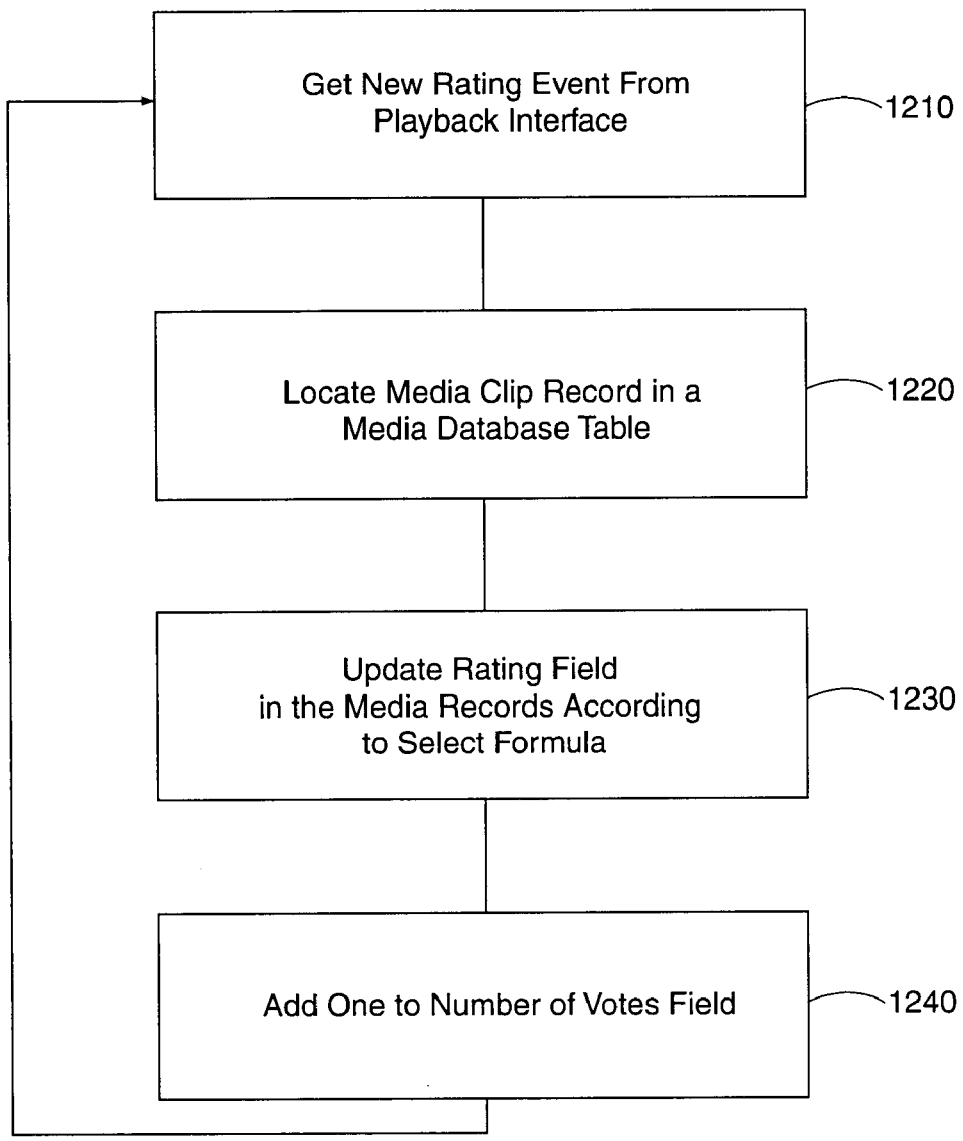
FIG. 14 is a flow chart describing a rating system, under an embodiment of the invention.

FIG. 14 illustrates a flow process for updating a rating of a media clip, under an embodiment of the invention. In step 1210, a module is provided a rating event. The rating event is a rating for a particular media clip, having an associated URL. The rating from the user is predefined from a closed set. For example, the user may provide a rating from 1 to 5.

In step 1220, a record is located for the media clip that was currently rated. The record may be stored in a database, and include the media link for the media clip, the current rating of the media clip, and the votes received for that media clip. In an embodiment, the record may include more than one URL associated with the media clip that was rated. In an embodiment, the record is maintained in database management component 1045 (FIG. 12).

In step 1230, a rating field for the media record is updated. The rating field may correspond to the current rating of a media clip. A module such as the rating module 1030 may update the rating field in database management component 1045 (FIG. 12). The media record is updated to determine a new rating. In one embodiment, the new rating is an averaged based formula. The formula may also be weighted. An example of a formula to determine a rating, under an embodiment of the invention is:

Newrating=1/(*n*+1)(*N**(old rating)+user provided rating)

N is the total number of votes received, and newrating ranges between 0 and a maximum value.

In step 1240, record for the media clip rated is further updated to add an additional vote to the field for votes received. The flow process then returns to step 1210.

FIG. 15 illustrates an exemplary structure for a database to maintain updated records on ratings and votes tallied. The table may associate values corresponding number of votes, rating, and other information to a media link containing a media clip.

Figure 16:
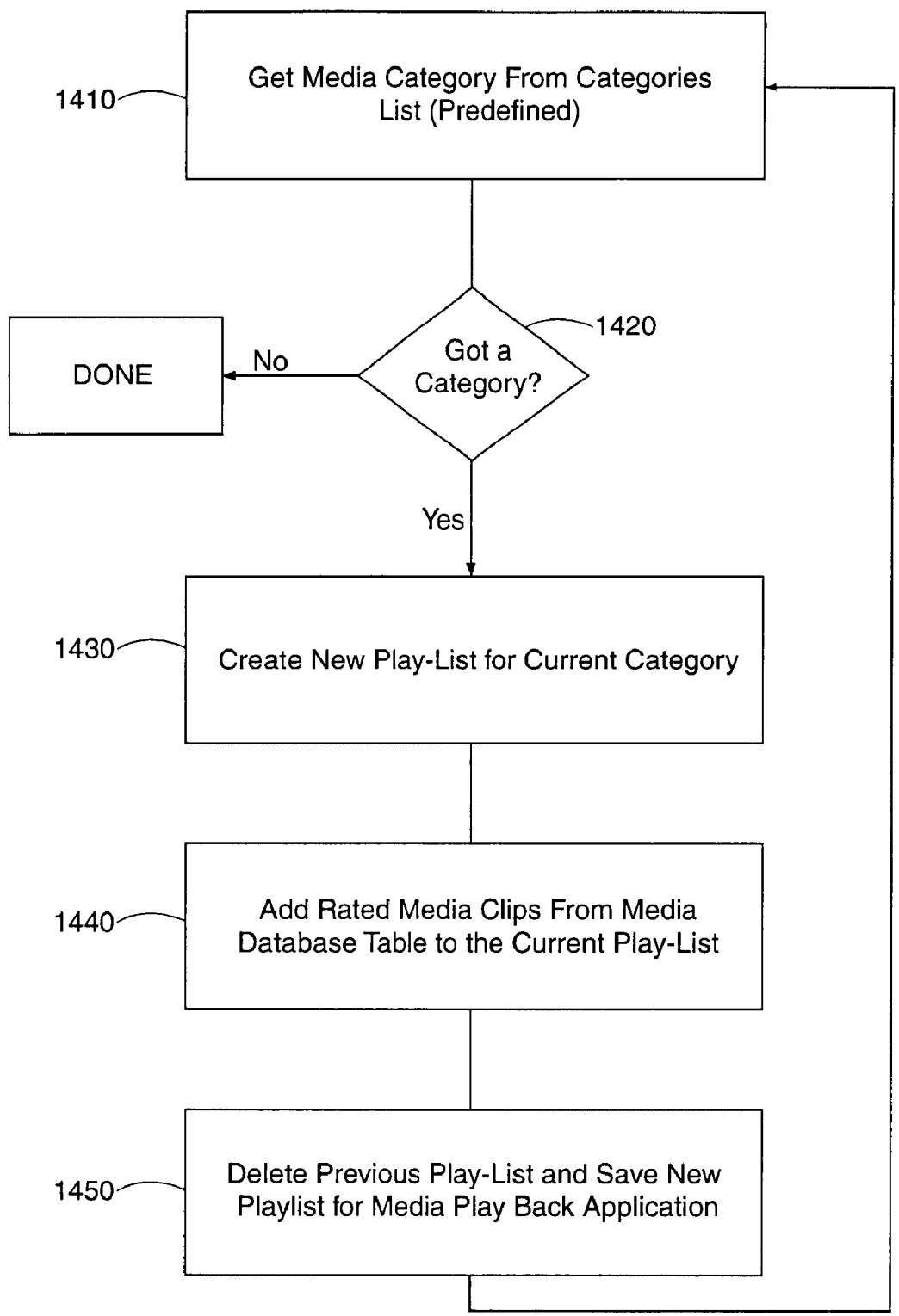
FIG. 16 is a flow chart for creating play-lists using rating information, under an embodiment of the invention.

FIG. 16 illustrates a flow process for generating media clips into play-lists according to a rating criteria. Play-lists including a rating criteria are referred to as rated play-lists. The flow process assumes known categories for media clips. The flow process also assumes a rating for rated media clips, and the number of media clips in a rated play-list. The flow process may be used with any of the aforementioned embodiments.

In step 1410, a next category may be fetched from a database containing the different categories of media clips. In step 1420, the system makes a determination as to whether a category was received. If no category is received, the system assumes that there are no more media categories to be rated.

In step 1430, a new play-list is created for a current category. In step 1440, up to N rated media clips from a database of rated media clips are added to the play-list. Preferably, N is a constant in the flow process. Then in step 1450, an old play-list is deleted, and the new play-list is saved. The new play-list may be saved in a format that follows predefined protocol so that the play-list and its contents are accessible to a streaming media play back interface. The flow process then returns to step 1410.

Figure 17:
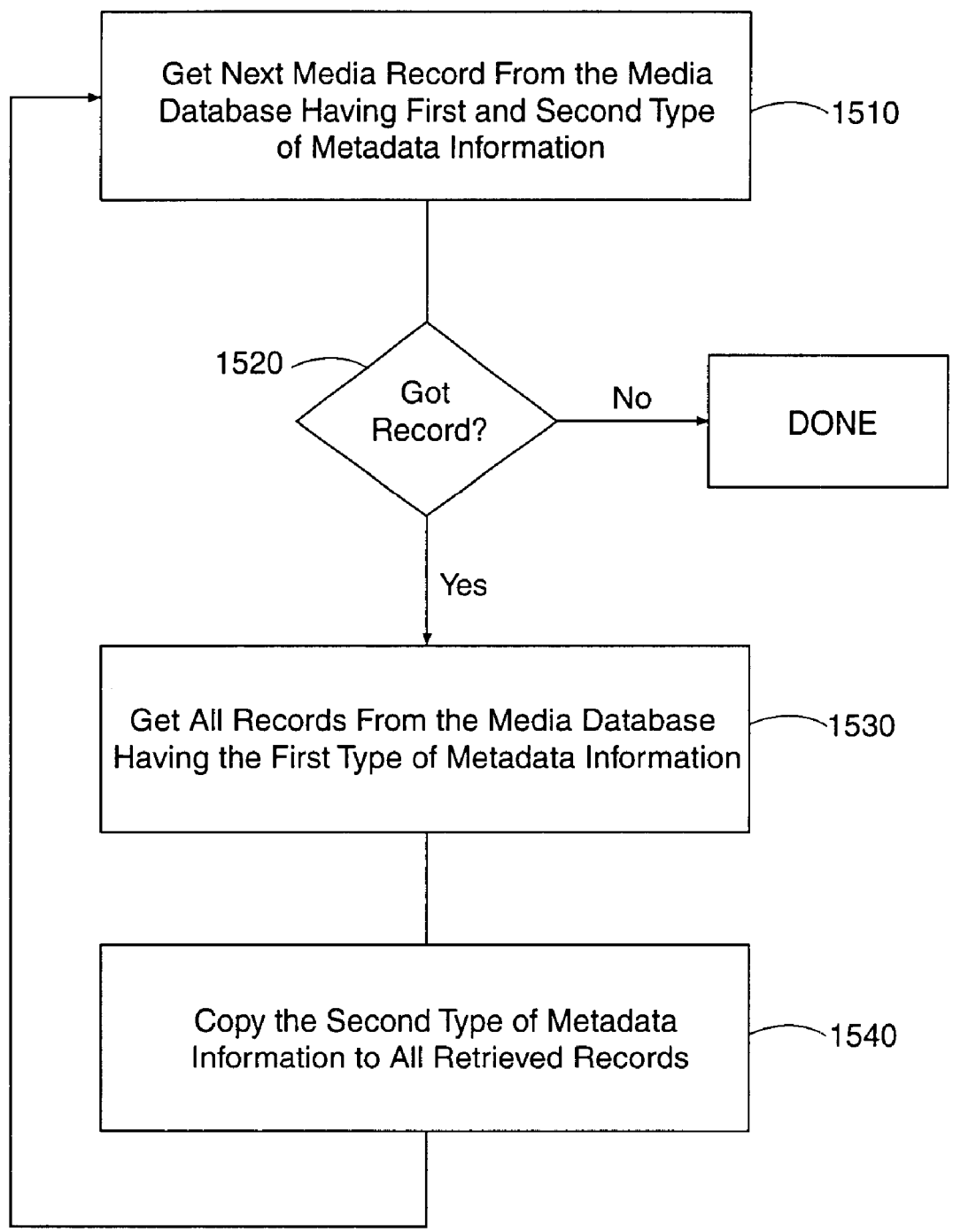
FIG. 17 is a flow chart for programmatically categorizing media files, under an embodiment of the invention.

FIG. 17 illustrates a flow process for programmatically categorizing media files. The process assumes a database containing metadata associated with media clips. The metadata includes metadata provided by a human editor. For example, the metadata may pertain to categories such as genre, mood and atmosphere.

In step 1510, a record is retrieved from the database. The record is retrieved with metadata information containing a first type of metadata information and a second type of metadata information. As an example, the first type of metadata information may correspond to a genre of music, and the second type of metadata information may correspond to an artist. In step 1520, a determination is made as to whether a record was received. If the determination is negative, then the process assumes that all media clips have been categorized.

If the determination in step 1520 is positive, then all records in the database having the first type of metadata information are retrieved in step 1530. In step 1540, all records retrieved in step 1530 are updated to include the second type of metadata information. As an example, all records belonging to a particular artist (first type of metadata information) or given additional metadata information of a particular genre (second type of metadata information). The process then returns to step 1510 to retrieve another record.

In one embodiment, the second type of metadata information is a genus category, and the first type of metadata information is a species of the first type of metadata information. Once the first record is known to have the a particular species and genus, the genus may be determined and stored for all records having the same species.

F. Personalized Media Playback

Figure 18:
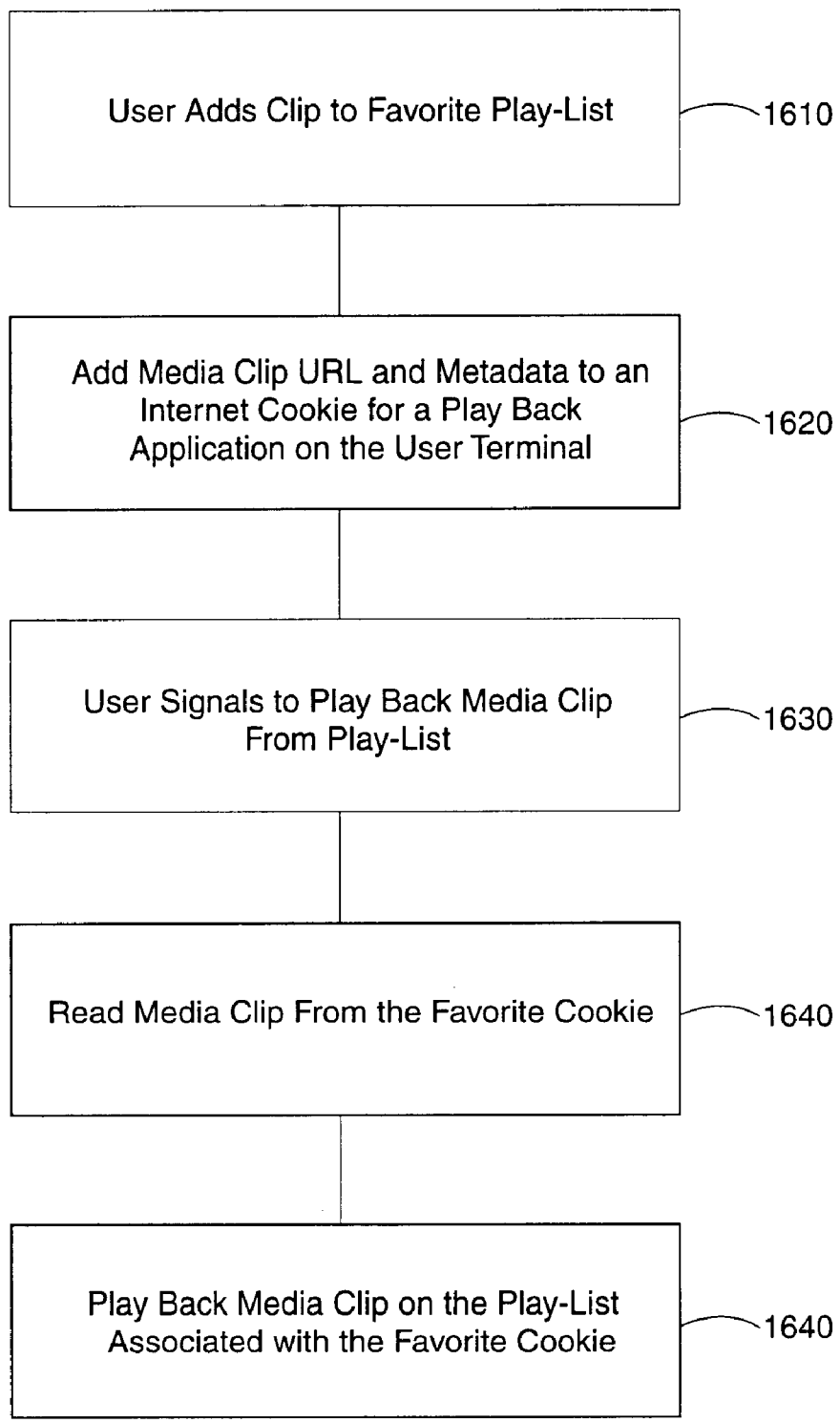
FIG. 18 is a flow chart for creating personalized play-lists of streaming media files available in a network, under an embodiment of the invention.

FIG. 18 is a flow process to create personalized play-lists of streaming media files available on the Internet (or other networks). The play-lists may be personalized by users on user-terminals.

In step 1610, a user chooses to add a URL of a selected media clip to a personal favorite play-list. In step 1620, the flow process adds the URL (and metadata) of the selected media clip to a user terminal store for user persistent information, such as an Internet cookie. The persistent data store is then accessible for the web-based play back application on the user terminal.

In step 1630, the user selects to play back media clips from that user's favorite play-list. In step 1640, the system reads back the media clips from the persisted data store. In step 1650, the system plays media clips using a URL associated with each media clip. The cookie may also provide additional URLs. Thus, multiple media clips may be played continuously from different sites on the Internet.

The user may edit the play-list, change an order of the play-list, or delete selections from the play-list. The user may designate certain play-lists as personal, so as to identify the play-list with that user's terminal. Alternatively, the play-list may be stored on a network server and accessed using the media location and playback module. Users may access their personal play-lists from any one of a plurality of terminals that have access to the system.

G. Distributed Architecture

An implementation under an embodiment provides a distributed architecture in which a user terminal accesses media resources from a plurality of network sites. In a network such as the Internet, the user terminal accesses multiple web sites to playback media locates as files on those web sites.

A network site includes any network location having internal links. Embodiments of the invention access network sites providing links to media files and/or other network sites. A web site refers to a network site on the Internet. Examples of web sites include web pages, including web pages with HTML links to other web sites, to media files, and to other types of files.

The distributed architecture inverts conventional media distribution paradigms. Numerous streaming media files can be streamed to an individual user terminal continuously from throughout the Internet using the embodiment of the distributed playback architecture. The distribution architecture is scalable to provide thousands or millions of streaming media files to user terminals. The users can then play media files located throughout the Internet in a continuous manner from the numerous Internet sites.

Figure 19:
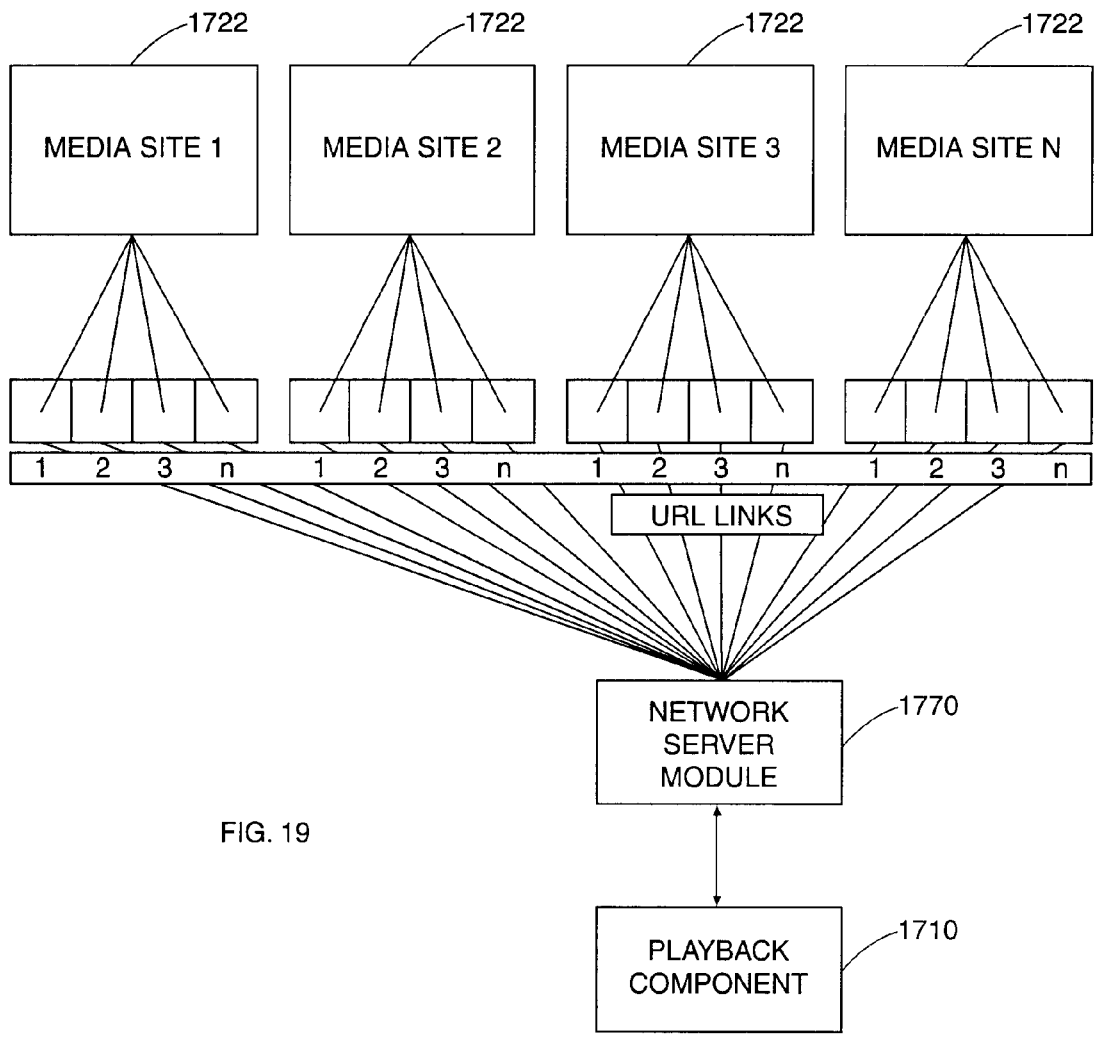
FIG. 19 illustrates a distributed playback architecture, under an embodiment of the invention.

FIG. 19 illustrates a distributed playback architecture, under an embodiment of the invention. A user terminal 1710 has access to N network sites that provide access to media, also referred to here as media sites. The N media sites 1722 via web server module 1770. The media sites 1722 each have one or more links to media web resources. The links are represented by URLs 1-N. The web server module 1770 can load the media resources onto a media playback component of user terminal 1710. Once loaded, the media resources are played back by a media playback component on user terminal 1710.

In an embodiment, the media sites 1722 correspond to different locations on a network such as the Internet. For example, media sites may have different Internet addresses, including different domains. Each media site provides direct access to a media network resource. This implies that a URL (or link) to one of the media sites accesses the media network resource for playback without accessing another internal URL (or link).

In an embodiment, web server module 1770 signals multiple URL links to user terminal 1710. The media playback component of user terminal 1710 accesses each link to playback the media resource. The URLs are selected for media playback so as to output media from user terminal 1710 according to a predetermined program.

In an embodiment, the program is selected or defined from a search request of user. For example, a search request may designate a category for media output, such as a genre and artist. All URLs containing media from that artist and genre may be gathered and signaled from web server module 1770 to user terminal 1710. The URLs may be provided in any order, such as random, etc. or a chronological order of the artist.

In another embodiment, a program may be provided by one or more play-lists. Each play-list in the program may be generated by, for example, a play-list generator 1040 (FIG. 12). The play-lists may be personalized for the user of the end terminal 1710. For example, play-lists may be generated for preferences and profiles specified by the user of user terminal 1710. As another example, a user may couple to the Internet, prompting web server module 1770 to automatically signal one or more play-lists containing the URLs to user terminal 1710. Still, other embodiments provide for URLs to web resources, or play-lists containing the URLs to be randomly provided to user terminal 1710.

Among other advantages, the distributed architecture permits simultaneous playback of, for example, thousands or millions of multiple streams which do not congregate on a single point. This avoids congestion arising under examples of the current media paradigms. This ensures that the embodiment of our distributed architecture may "scale," or permit the simultaneous playback of, for example, thousands or millions of simultaneous streams. Further, the quality of the user experience is not affected by scaling a system under the distributed architecture embodiment.

In contrast, conventional broadcasting employs one radio or television signal to broadcast to listeners or viewers. Media files disseminated over the Internet today may be distributed in a manner which is somewhat similar in that the media file is located on a single server (or small group of servers) which is accessed by potentially large number of Internet users. As a result, the experience of the users may diminish due to the limited ability of current systems to scale.

This distributed playback architecture, the delivery of streaming media through this playback architecture, in combination with the search functionality performed by the backend module, and the rating and personalization features of the playback client terminal module permits the creation of a broadcasting system that is personalized by an end user. A personal broadcasting system permits each individual user to create media programs which can be sent to, for example, thousands or millions or other users who can simultaneously play different programming combinations using a distribution of Internet (or other network) sites.

An example of a distributed architecture playback system includes wireless devices that are communicatable to a network containing media resources. For example, media playback component 1710 may be loaded onto a wireless access protocol (WAP) enabled device. Examples of WAP enabled devices include handheld computes and cell phones.

The WAP enabled device may use a wireless communication network to access network server module 1770. The WAP enabled device may also include output features, such as speakers or a display screen. The WAP enabled device accesses media sites 1722 by control of network server module 1770. The WAP enabled device then plays back media from the media sites 1722. The WAP enabled device may then be used to simulate a portable radio.

As another example, an automobile may be equipped with a wireless device. The wireless device accesses multiple media sites on a network such as the Internet to and provide playback of media clips. For example, the user may select to hear music from a favorite play-list using the WAP enabled device in the automobile.

H. Messaging Applications

Figure 20:
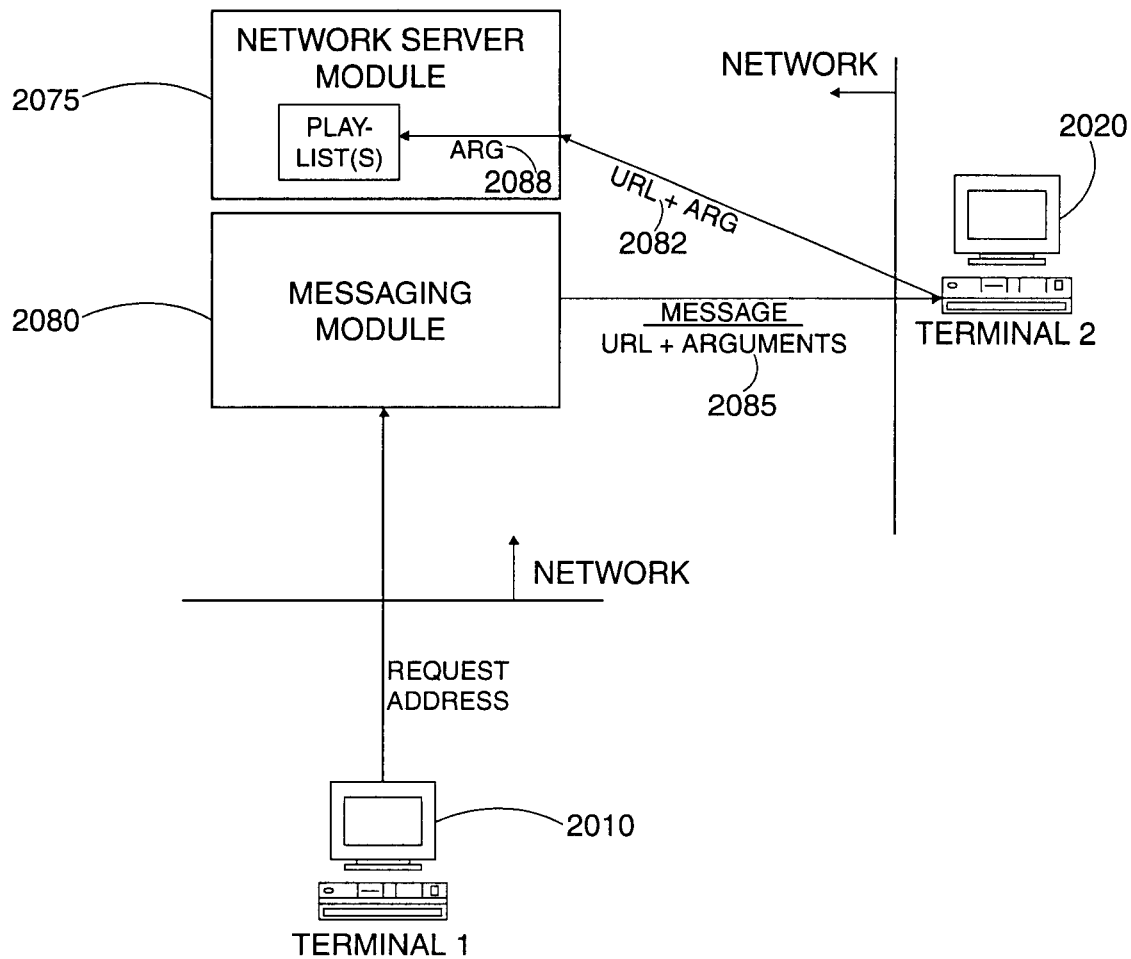
FIG. 20 illustrates a block diagram of a messaging application, under an embodiment of the invention.

FIG. 20 is a diagram illustrating a messaging application, under an embodiment of the invention. The messaging application enables the user to share a media playback experience with other users having access to the network.

FIG. 20 assumes the messaging application is operated on a network such as the Internet. In the embodiment, a network interface or network-side module is used to enable messaging, rather than a client messaging applications. Examples of messaging applications for use with embodiments include e-mails, which are delivered to a folder on a recipient's terminal. Other types of electronic messages include instant messages, which can be displayed or heard on the recipients terminal automatically upon arrival.

A messaging module 2080 receives a messaging request from a first user terminal (sender) 2010. The messaging module 2080 may be an application or portion of network server module 2070. The messaging request is entered by the user through the user-interface 1900, using for example, an e-mail selection field 1990.

The messaging module 2080 receives addresses to deliver messages to recipient terminals (recipient) 2020. The sender 2010 may manually signal the recipients address using entry methods such as keyboards, graphic user selection features, or audio commands. Alternatively, messaging module 2080 has access to network stored addresses for the specific user. The network stored messages are then selectable from a terminal by the user on the sender terminal 2010.

In response to a request from sender 2010, messaging module 2080 generates a message 2085 for the recipient. The request may also include the address of the intended recipient(s). The message 2085 is sent to all recipients 2020 specified by sender 2010. The contents of the message 2085 include a URL to the network server module 2070. In an embodiment, the URL in the message is packaged with arguments or other coding to identify a play-list maintained on the network server module 2070. The URL may also be packaged with arguments to identify the specific song being played when the sender causes the message to be transmitted to the recipient. Alternatively, the URL may identify to the recipient the search request or criteria used by the sender.

The recipient may choose to return a message 2082 to signal messaging module 2080. In one embodiment, the content of the message is constructed so that once the message is opened, the user can select a link to a module that stores or maintains the play-list 2075. For Internet applications, the link is HTML formatted to include the URL of network server module 2070, and arguments to identify the play-list selected by sender 2010. Once network server module 2070 is accessed by the recipient 2020, arguments 2088 contained with the link identify the specific play-list 2075 experienced by sender 2010 when the request to send the message was made.

If the message is instant, the recipient 2020 can respond immediately to simultaneously share the experience of sender 2010. Alternatively, the recipient 2020 can be made to respond automatically upon the recipient 2020 receiving the message 2085, so as to enable sender 2010 and 2020 to simultaneously or concurrently share the same media playback.

The argument 2088 that is packaged with the link may also identify individual media clips, and/or an entire play-lists. The recipient 2020 is able to experience media playback from individual media clips selected by sender 2010.

In another embodiment, message 2085 is constructed so that once the message is opened, the user is automatically connected to network server module 2070. The message may be an e-mail, stored in a designated folder of recipient 2020. The e-mail may include an HTML formatted URL to cause the recipient's terminal to access and communicate with network server module 2070. The HTML formatted URL may also include code that causes the user terminal to automatically access network server module 2070 upon the email being opened. The HTML formatted link may also include arguments to specify the play-list 2088 and/or media clip identified by the sender, as well as other parameters of the URL. Once the play-list or media clip is identified by network server module 2070, the recipient 2020 is able to share the media playback experience of the sender 2010. The sender 2010 can experience the media playback at the time sender 2010 requests the message to be sent.

In the embodiments shown, sender 2010 can select a media program that is signaled transmitted to recipient 2020 by messaging module 2080. The program may correspond to one or more play-lists, playing back multiple media resources. While sender 2010 is being played back the program, the sender 2010 can specify the address of recipient 2020 to messaging module 2080. The messaging module 2080 generate a message that includes a selectable link to enable the recipient to access the network server module 2070. Arguments or scripting contained with the URL identify the particular play-list being signaled to the sender 2010. Since the play-list is updated after every media resource is played back to sender 2010, recipient 2020 accesses the play-list at the selection being played back to the sender 2010. The play-list is then signaled to the sender 2010 and recipient 2020 simultaneously, or approximately thereabout. Alternatively, recipient 2020 accesses the play-list beginning with the media clip played back to sender 2010 when the sender 2010 selected to transmit the message to recipient 2020.

As an example, sender 2010 transmits a search request causing media, based on search criterias of a specific artist and a ranking. The network server module 2070 identifies URLs matching the search request and forms play-list 2075 for sender 2010. After reviewing the play-list 2075, the sender 2010 decides to share the media playback with a friend, recipient 2020, whom the sender believes would appreciate play-list 2075. The sender 2010 requests messaging module 2080 to transmit message 2085 to recipient 2020 by submitting the recipient's e-mail address to the messaging module 2080. The message 2085 sits on the recipient's terminal until accessed. The recipient 2020 selects message 2085 to access play-list 2075. Unless the messaging is nearly instantaneous, the recipient experiences media playback from the play-list 2075 when sender 2010 request message 2085 to be sent. Alternatively, sender 2010 may request the entire play-list 2075 to be transmitted to recipient 2020. In this way, sender 2010 and recipient 2020 may share a common interest in certain genres, category, artists etc. of media playback.

I. User-Interface

Figure 21:
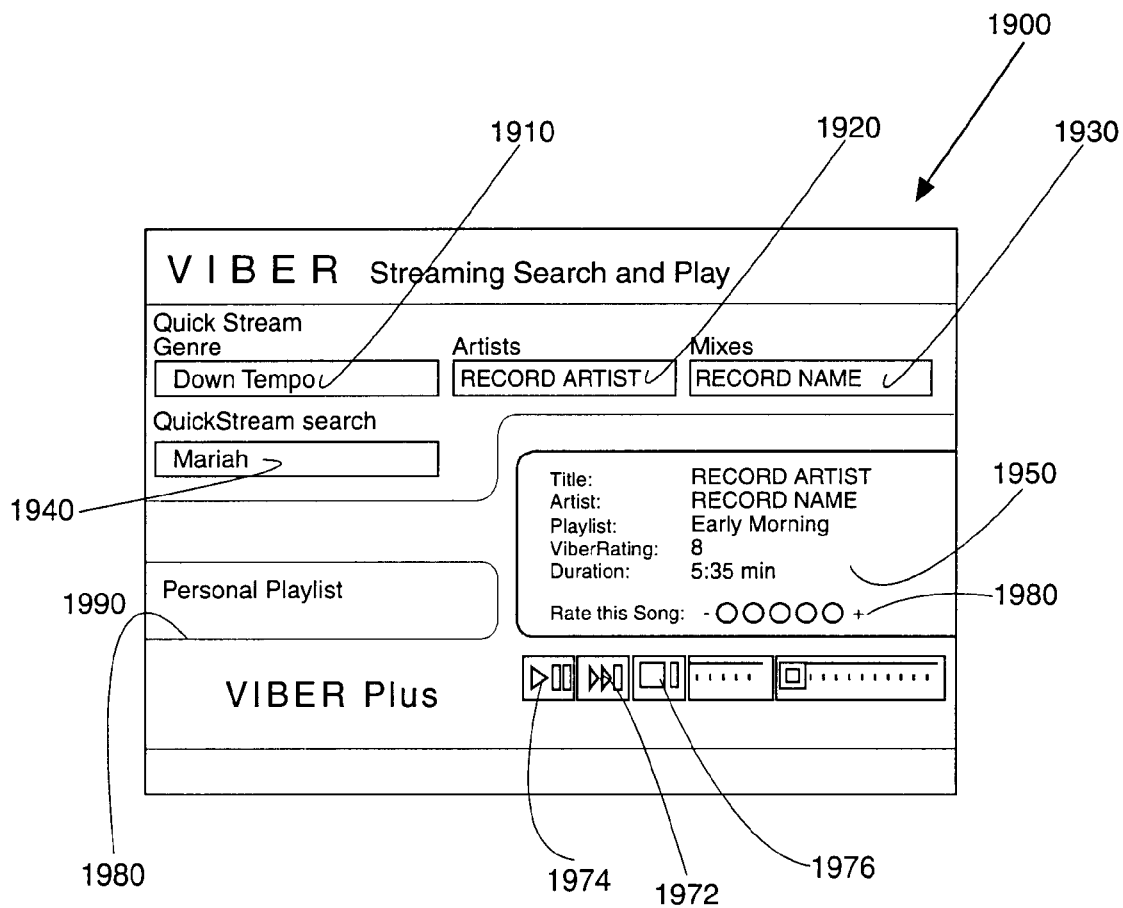
FIG. 21 illustrates a user-interface for use with a media search and playback system, under an embodiment of the invention.

FIG. 21 illustrates a user-interface 1900, under an embodiment of the invention. The user-interface 1900 may correspond to the play-back interface 1020, described with FIG. 10. Alternatively, the user-interface may be a terminal side component in communication with one or more server-side modules, such as for example web server module 1070 (FIG. 12).

In an embodiment such as shown by FIG. 12, user-interface 1900 includes a plurality of user-interactive features. The user-interactive features enable users to interact with the system 200 from the user terminal 210. Some of the plurality of user-interactive features allow users to submit search requests and other media requests for playback. Other control user-interactive features allow users to affect the play back of the media resources.

The user-interface 1900 may output to the user information, images, and/or audio that is different than the media resource being played back. For example, user-interface 1900 displays metadata information to the users about the media resource being played back. In addition, the user-interface 1900 enables users to, for example, view advertisement, receive electronic messages, and create and manage play-lists.

In an embodiment such as shown by FIG. 21, the user-interface 1900 includes a first menu field 1910, a second menu field 1920, and a third menu field 1930. The first menu field 1910 allows the user to select a first criteria for media resources that are to be played back. The second menu field 1920 allows the user to select a second criteria from a set of media resources matching the first criteria. The third menu field 1930 allows the user to select a third criteria from the a set of media resources matching both the first and second criteria. Each of the menu fields 1910–1930 may be in the form of click and drag-down menus.

The user-interface 1900 may also include a text field 1940. The text field 1940 allows users to enter a search criteria. The search criteria entered in text field 1940 may be combined with the search criterias of one or more menu fields 1910–1930 using a Boolean operation. Preferably, all search criterias are AND together into a single search criteria. For example, the search criteria entered in text field 1940 may correspond to an artist name, or a title of a media creation.

In an embodiment, the user-interface 1900 provides features that prompt a user for input, such as for one more search criterias. The web server module 270 receives the search criteria(s) signaled from user terminal 210, and access media and metadata table 247. Each of the menu field 1910–1930 may also allow users to enter text field as the search criterias. The search criteria(s) are matched to URLs containing metadata having the same (or equivalent) criterias. For example, the search request may specify a genre, and a first name of an artist. Then, web access server 270 locates URLs to media resources having associated metadata information that identifies the media resource as being of the same genre, and as containing the same first name in the artist name metadata indexed data structure.

The web server module includes a feedback display portion 1950. The feedback display portion 1950 may signal information, messages, advertisement etc. to the end user. In an embodiment, feedback display portion 1950 displays metadata information about the media resource being played back. For example, a song of a particular genre and category may be played back. The display screen portion 1950 may display the title of the song, the artist name, a play-list associated with the song, a rating component of the song, and the song's duration. Information is read when the media playback component loads the media resource.

Other user-interactive features may also be included in user-interface 1900. In an embodiment, user-interface 1900 includes a play-list feature 1960. The play-list feature 1960 enables users to add a media creation to a play-list. The play-list feature 1960 may, as an example, be a selectable icon. Upon selecting the play-list feature 1960, a pop-up window (not shown) may be displayed allowing a user to name or select the play-list that will include the media resource being played. In this way, a user of user terminal 210 can provide input to create and manage play-lists, using systems such as described with FIGS. 12 and 19.

The user-interface 1900 may include one or more control user-interactive features. The control user-interactive features may be in the form of selectable icons. A skip feature 1972 causes, for example, web server module 270 to signal a URL of another media creation to the media playback component. This causes the media playback component to start playing back a new media creation. A pause feature 1974 enables users to pause the media playback component from playing back the media resource. The pause feature 1974 may signal the media playback component directly, or cause the web server module to signal the command to the media playback component. Reselecting the pause feature 1974 then causes the media creation to be played back from the portion where playback was paused. Similarly, a seek feature 1976 may signal to seek or move to a specific instance of playback on the media resource. A volume feature 1978 signals the application program interface 276 (FIG. 5) to raise the volume of the media resource being played back.

The user-interface 1900 may also include a rating feature 1980. The rating feature 1980 may be in the form of multiple selectable icons, where the icons are arranged to correspond to a rating. For example, five icons may be provided to represent best to worst ratings. In an embodiment, the rating feature 1980 enables a user to rate a media resource during or after it is played back on the user terminal 210. With reference to an embodiment such as described with FIG. 12, the rating feature 1980 is used to prompt a user to signal a rating to rating component 1030 (FIG. 12). The rating feature 1980 may be a user response to a media clip played back on user terminal 210. The rating component 1030 receives the rating and modifies rating information associated with the URL that is stored in 1045. The rating information may then be provided to other users or user terminals. For example, the rating information may then be signaled to display portions 1950 of other user terminals 210 who select that media clip for playback.

The user-interface 1900 also includes a personal play-list feature 1985. The personal play-list feature includes iconic selection features, including an add icon 1987 to add a URL to a play-list, and a play icon 1989 to play a personal play-list. The add icon 1987 enables a user to signal play-list generator 1040 (FIG. 12) to add a URL to the personal play-list. The URL being added to the play-list may correspond to a media resource being played back on user terminal 210. The play icon 1989 may be selected to cause web server module 1070 (FIG. 12) to signal URLs from the personal play-list to the media playback component of user terminal 210. In this way, user terminal 210 may select to have continuous media output from resources previously selected to be on a play-list.

The user-interface 1900 may also include an e-mail selection feature 1990. The email selection feature 1990 may be iconic, to allow selection by the user upon the media playback. Once selected, an e-mail program on user terminal 210 may be launched. The e-mail program may be directed to open a new message, and attach the URL of the selected media resource.

Figure 22:
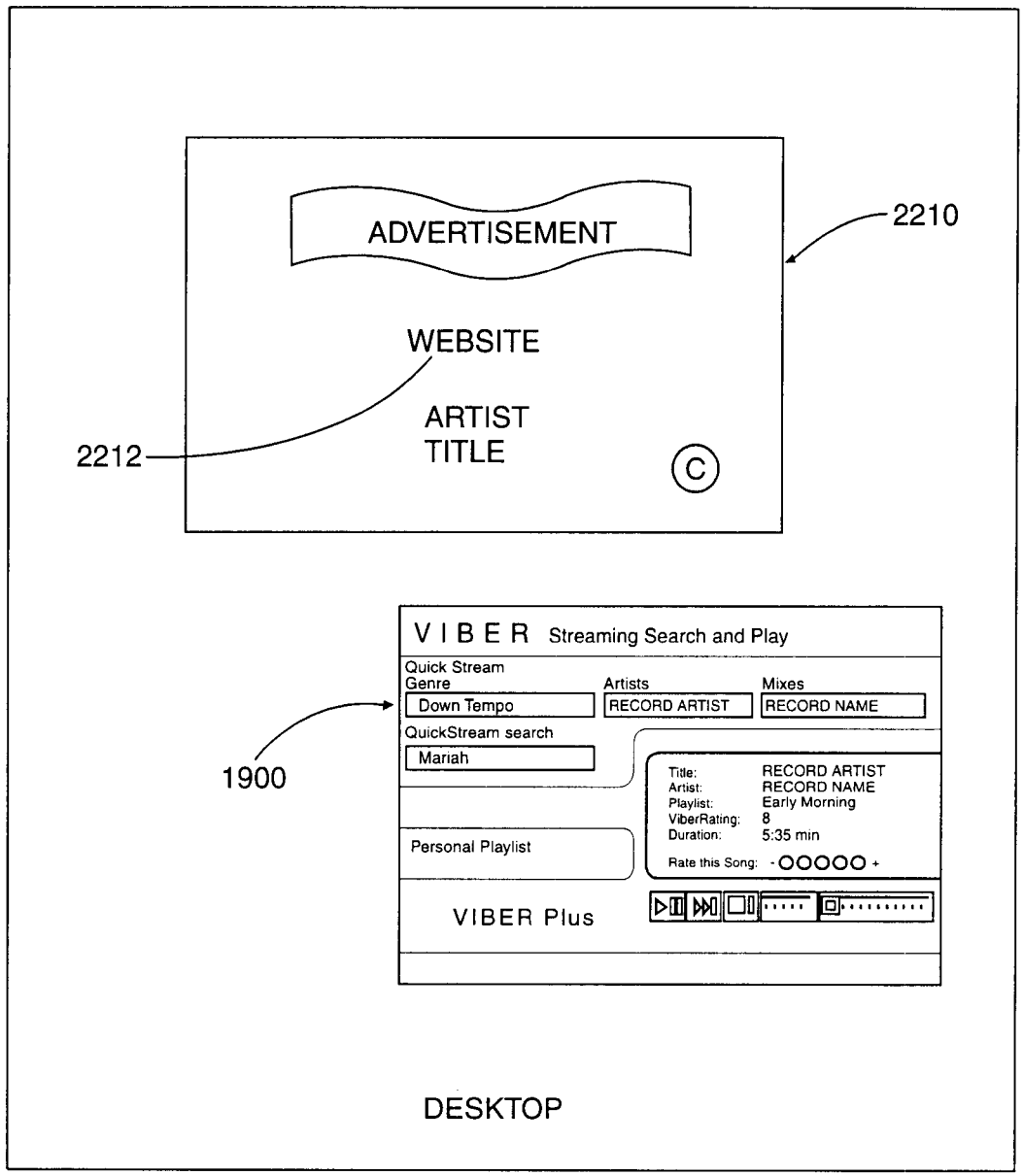
FIG. 22 includes another user-interface displaying an instance of the web browser while media is being played back, under an embodiment of the invention.

FIG. 22 illustrates an embodiment in which user-interface 1900 is displayed on the desktop along a second window 2210 showing a web site 2212. The web site 2212 hosts the media file being played back. In this embodiment, web server module 1070 signals a media file URL to the media player component of the terminal. The web server module 1070 concurrently signals the web browser component 213 on the terminal another URL to the hosting web site. The web browser 213 opens the second window 2210 to display the web site while the media from the media file is being played back on the terminal. In this way, users are displayed the web site hosting the media file while media from the media file is played back. This allows the user to view, for example, banner ads, artist name and titles, and copyright information while media from the web site is being played back.

After the playback is complete for one media file, a URL to a next media file is signaled to the media player component on the terminal. The next URL may be determined by a sequence of a play-list, or by a result to a search term inputted from the user. If the URL of the next media file is hosted on a web site that is different than the preceding web site, then web server module 270 signals the URL of the next hosting web site to the web browser. The second window 2210 then displays a second web site 2212' that hosts the media file being played back. In this way, the second window 2210 displays only web sites hosting the media files being played back.

J. Conclusion

The foregoing description of various embodiments of the invention has been presented for purposes of illustration and description. It is not intended to limit the invention to the precise forms disclosed. Many modifications and equivalent arrangements will be apparent.

What is claimed is:

1. A method for playing media, the method comprising:
 receiving a search request from a network enabled device, the search request specifying one or more search criteria;
 accessing a memory medium that comprises one or more memory components, wherein the memory medium stores data corresponding to a plurality of media resource identifiers, wherein each media resource identifier identifies a media resource located in a corresponding network location, and wherein the one or more memory components stores data that corresponds to a set of information items that are associated with each media resource identifier;
 selecting one or more information items from the set of information items using the one or more search criteria;
 communicating the one or more information items to the network enabled device, wherein the one or more information items are used to at least partially configure one or more programmatically displayed interfaces on the network enabled device;
 receiving selection data based on a user interaction with the one or more displayed interfaces;
 identifying a set of media resource identifiers from the plurality of media resource identifiers based on the selection data and the one or more information items;
 causing a media player on the network enabled device to sequentially play back media resources identified by media resource identifiers in the set of media resource identifiers, wherein each of the media resources that is played back is retrieved from a corresponding network location;

wherein in response to termination of a first playback of a first media resource having a first network location and identified by one of the media resource identifiers in the set of media resource identifiers, automatically initiating a second playback of a second media resource from a second network location that is different from the first network location, wherein the second media resource is identified by another one of the media resource identifiers in the set of media resource identifiers.

2. The method of claim 1, wherein the corresponding network location of the media resource identified by each media resource identifier in the set of media resource identifiers corresponds to a network address.

3. The method of claim 2, wherein the network address that identifies each media resource identifier in the set of media resource identifiers corresponds to a uniform resource locator.

4. The method of claim 1, wherein the corresponding network location of the media resource identified by each media resource identifier in the set of media resource identifiers corresponds to a location on an internal network site of a common network domain.

5. The method of claim 1, wherein two or more of the media resource identifiers in the set of media resource identifiers are for media resources having corresponding network locations on separate machines.

6. The method of claim 1, wherein the step of causing a media player on the network enabled device to sequentially play back media resources includes programmatically controlling the media player.

7. The method of claim 6, wherein the step of programmatically controlling the media player includes using a software application that interfaces with the media player.

8. The method of claim 7, wherein the step of programmatically controlling the media player includes controlling the media player through an application program interface of the media player.

9. The method of claim 1, wherein the step of accessing a memory medium includes accessing the memory medium where at least some of the information items associated with individual media resource identifiers in the set of media resource identifiers correspond to an album name.

10. The method of claim 1, wherein the step of accessing a memory medium includes accessing the memory medium where at least some of the information items associated with individual media resource identifiers in the set of media resource identifiers corresponds to an artist name or song title.

11. The method of claim 1, wherein the step of accessing a memory medium includes accessing the memory medium where at least some of the information items associated with individual media resource identifiers in the set of media resource identifiers corresponds to a genre category for a corresponding media resource.

12. A computer system for playing media from a network on a network enabled device, the computer system comprising:

a client module residing on the network enabled device, the client module being executable to (i) provide one or more interfaces, the one or more interfaces including a first interface to receive a search request; and (ii) control a media player on the network enabled device;

a network server module that communicates with one or more memory components and with the client module, wherein the one or more memory components store data corresponding to a plurality of media resource identifiers, wherein each media resource identifier identifies a media resource having a corresponding network location, and wherein the one or more memory components store a set of information items that are associated with each media resource identifier;

wherein the network server module is configured to:
select a plurality of media resource identifiers by comparing the one or more search criteria with the one or more information items in the memory;
communicate data representing the selected plurality of media resource identifiers, and the one or more information items associated with each media resource identifier in the selected plurality of media resource identifiers, to the network enabled device;

wherein the client module is configured to display at least some of the one or more information items on the one or more interfaces, and to receive user-selection information a user interaction with the one or more interfaces;

wherein after the client module receives the user-selection information, at least one of the client module and the network server module is configured to:
identify a set of media resource identifiers from the selected plurality of media resource identifiers based on the user-selection information
programmatically control the media player through an application program interface of the media player in order to cause the media player to sequentially play back media resources identified by media resource identifiers in the set of media resource identifiers, wherein each of the media resources that are played back are retrieved from a corresponding network location;
in response to termination of a first playback of a first media resource having a first network location and identified by one of the media resource identifiers in the set of media resource identifiers, the media player is instructed to automatically initiate a second playback of a second media resource from a second network location that is different from the first network location, wherein the second media resource is identified by another one of the media resource identifiers in the set of media resource identifiers.

13. The computer system of claim 12, wherein the corresponding network location of the media resource identified by each media resource identifier in the set of media resource identifiers corresponds to a network address.

14. The computer system of claim 12, wherein the corresponding network location of the media resource identified by each media resource identifier in the set of media resource identifiers corresponds to a uniform resource locator.

15. The computer system of claim 12, wherein the corresponding network location of the media resource identified by each media resource identifier in the set of media resource identifiers corresponds to an internal network site of a common network domain.

16. The computer system of claim 12, wherein two or more of the media resource identifiers in the set of media resource identifiers are for media resources having corresponding network locations at separate physical locations.

17. The computer system of claim 12, wherein at least one of the client module and the network server module is configured to programmatically control the media player by sending to the application program interface of the media player a set of instructions that include an identifier to the network location of each media resource that is to be played back by the media player.

18. The computer system of claim 17, wherein the set of instructions include at least portions of one or more uniform resource locators, wherein the one or more uniform resource locators correspond to the network locations of the media resources that are to be played back by the media player.

19. The computer system of claim 17, wherein the network server module programmatically controls the media player using another application on the client module that communicates with the media player.

20. The computer system of claim 12, wherein the network server module communicates with a memory medium to access at least some information items that correspond to sound recording compilation names.

21. The computer system of claim 12, wherein the network server module communicates with a memory medium to access at least some information items that correspond to a song title.

22. The computer system of claim 12, wherein the network server module communicates with a memory medium to access at least some information items that correspond to a recording artist name.

23. The computer system of claim 12, wherein the network server module communicates with a memory medium to access at least some information items that correspond to a genre category for a playback.

24. The computer system of claim 12, wherein the memory medium is part of the computer system.

25. The computer system of claim 12, wherein the client module and the network server module are part of a platform.

26. A method for playing media from a network, the method comprising:

receiving a search request from a network enabled device;

identifying from the search request at least one criteria that corresponds to a mix identifier for a designated set of media resources;

accessing a memory medium that comprises one or more memory components, wherein the memory medium stores a plurality of media resource identifiers, and associates each media resource identifier in the plurality of media resource identifiers with a media resource that is provided at a corresponding network location on the network, and wherein the memory medium associates individual mix identifiers with one or more of the media resource identifiers;

selecting a set of two or more media resource identifiers using the at least one criteria and the memory medium;

communicating the set of two or more media resource identifiers to the network enabled device;

programmatically controlling a media player through an application program interface of the media player to sequentially play back two or more media resources identified by media resource identifiers in the set of two or more media resource identifiers, wherein in response to termination of a first playback of a first media resource having a first network location and identified by one of the media resource identifiers in the plurality of media resource identifiers, the media player is instructed to automatically initiate a second playback of a second media resource from a second network, wherein the second media resource is identified by another one of the media resource identifiers in the plurality of media resource identifiers.

27. The method of claim 26, wherein the first network location corresponds to a first network address, and the second network location corresponds to a second network address that is different than the first network address.

28. The method of claim 26, wherein the first network location corresponds to a first uniform resource locator, and the second network location corresponds to a second uniform resource locator that is different than the first uniform resource locator.

29. The method of claim 26, wherein the first network location and the second network location each correspond to an internal network site of a common network domain.

30. The method of claim 26, wherein the first network location has a first physical location and the second network location has a second physical location that is different than the first physical location.

31. The method of claim 26, wherein the step of programmatically controlling a media player includes programmatically controlling the media player by sending instructions to the application program interface of the media player, wherein the instructions identify the network locations of the media resources that are to be played back by the media player.

32. The method of claim 31, wherein the instructions sent to the media player include portions of one or more uniform resource locators that correspond to the network locations of the media resources that are to be played back by the media player.

33. The method of claim 31, wherein programmatically controlling a media player on the network enabled device includes directly controlling the media player from a server module that is remote to the network enabled device.

34. A computer system for playing media from a network on a network enabled device, the method comprising:

a client module residing on the network enabled device, the client module being executable to (i) provide one or more interfaces, the one or more interfaces including a first interface to receive a search request; and (ii) control a media player on the network enabled device;

a network server module that communicates with the client module and with a memory medium, wherein the memory medium stores a plurality of media resource identifiers, and associates each media resource identifier in the plurality of media resource identifiers with a media resource that is provided at a corresponding network location on the network, and wherein the memory medium associates individual mix identifiers with one or more of the media resource identifiers;

wherein the at least one of the network server module and the client module is configured to:

identify from the search request at least one criteria that corresponds to a mix identifier for a designated set of media resources select a set of two or more media resource identifiers using the criteria identified from the search request and the memory medium;

programmatically control a media player on the network enabled device to sequentially play back two or more media resources identified by media resource identifiers in the set of two or more media resource identifiers, wherein in response to termination of a first playback of a first media resource having a first network location and identified by one of the media resource identifiers in the set of media resource identifiers, the media player is instructed to automatically initiate a second playback of a second media resource from a second network location that is different from the first network location, wherein the second media resource is identified by another one of the media resource identifiers in the set of media resource identifiers.

35. The computer system of claim 34, wherein the corresponding network location of each media resource identifier in the first set corresponds to a network address.

36. The computer system of claim 34, the corresponding network location of each media resource identifier in the first set corresponds to a uniform resource locator.

37. The computer system of claim 34, wherein the corresponding network location of one or more media resource identifiers in the first set corresponds to an internal network site of a common network domain.

38. The computer system of claim 34, wherein two or more of the media resource identifiers in the first set identify media resources having corresponding network locations at separate physical locations.

39. The computer system of claim 34, wherein the network server module programmatically controlling the media player through an application program interface of the media a player.

40. The computer system of claim 39, wherein the network server module programmatically controls the media player by sending instructions to the media player through the application program interface, wherein the instructions include at least portions of a first uniform resource locator corresponding to the first network location, and a second uniform resource locator corresponding to the second network location.

41. The computer system of claim 34, wherein the memory medium is part of the computer system.

42. The computer system of claim 34, wherein the client module and the network server module are part of a platform.

43. The computer system of claim 34, wherein the first media resource and the second media resource each provide a musical work.

44. A method for playing media from a network, the method comprising:

receiving a first search request from a network enabled device, the first search request specifying search criteria that includes one or more artists of musical works;

accessing a memory medium that comprises one or more memory components, wherein the memory medium stores data that associates an artist of a musical work with one or more mix identifiers, each mix identifier identifying one of a plurality of mixes, and each mix in the plurality of mixes corresponding to a designated set of fixed musical works, wherein the memory medium also stores data that (i) associates individual musical work identifiers in a plurality of musical work identifiers and individual musical work names in a plurality of musical work names with one another; (ii) associates each musical work identifier and at least one mix identifier with one another, the at least one mix identifier identifying the mix that includes the musical work identified by the musical work identifier that is associated with that mix identifier; (iii) associates each musical work identifier with one or more media resource identifiers, wherein each media resource identifier identifies a media resource at a corresponding network location that can be accessed to reproduce or at least partially perform by digital transmission the musical work; and (iv) associates each mix identifier with a mix name;

selecting a first set of one or more mix identifiers using the search criteria and the memory medium;

providing data for use in creating a list to the network enabled device, the list being displayable as part of a user-interface on the network enabled device, wherein the list comprises one or more items that correspond to the mix identifiers in the first set;

receiving a first selection input from the network enabled device, wherein the first selection input indicates one or more mix identifiers that correspond to the one or more items in the list;

identifying from the first selection input and from the memory medium a second set comprising (i) two or more musical work identifiers and (ii) two or more musical work names for each of the one or more musical work identifiers in the second set;

sending data representing the second set to the network enabled device, so that information corresponding to one or more musical work names in the second set is displayed on the network enabled device;

receiving a second selection input that specifies one or more musical work identifiers that correspond to the two or more musical work names in the second set;

identifying from the second selection and the memory medium a third set comprising a plurality of media resource identifiers; and controlling a media player on the network enabled device to sequentially and automatically perform by digital transmission at least a portion of (i) a first musical work provided by a first media resource and (ii) a second musical work provided by a second media resource, wherein the first media resource is identified by a first media resource identifier and has a first network location, and wherein the second media resource is identified by a second media resource identifier and has a second network location, and wherein the first media resource identifier and the second media resource identifier are from the third set.

45. The method of claim 44, wherein controlling the media player includes, in response to termination of performance by digital transmission of the first musical work provided by the first media resource having the first network location, controlling the media player to automatically initiate performance by digital transmission of the second musical work provided by the second media resource having the second network location.

46. The method of claim 44, wherein controlling a media player on the network enabled device includes programmatically controlling the media player.

47. The method of claim 46, wherein programmatically controlling the media player includes sending instructions to the media player through an application program interface of the media player.

48. The method of claim 47, wherein sending instructions to the media player includes sending instructions that identify at least in part a portion of a first uniform resource locator that corresponds to the first network location and a portion of a second uniform resource locator that corresponds to the second network location.

49. The method of claim 44, herein the first network location corresponds to a first network address, and the second network location corresponds to a second network address that is different than the first network address.

50. The method of claim 44, wherein the first network location corresponds to a first uniform resource locator, and the second network location corresponds to a second uniform resource locator that is different than the first uniform resource locator.

51. The method of claim 44, wherein the first network location and the second network location each correspond to an internal network site of a common network domain.

52. The method of claim 44, wherein the first network location has a first physical location and the second network location has a second physical location that is different than the first physical location.

53. The method of claim 44, wherein the step of identifying a second set comprising one or mare musical work identifiers and one or more musical work names include identifying album track identifiers and one or more album track names.

54. A computer system for playing media from a network on a network enabled device, the computer system comprising:

a client module residing on the network enabled device, the client module being executable to (i) provide one or more interfaces, the one or more interfaces including a first interface to receive a search request; and (ii) control a media player on the network enabled device;

a memory medium that comprises one or more memory components, wherein the memory medium stores data that associates an artist of a musical work with one or more mix identifiers, each mix identifier identifying one of a plurality of mixes, wherein each mix in the plurality of mixes corresponds to a designated set of fixed musical works, and wherein the memory medium also stores data that (i) associates individual musical work identifiers in a plurality of musical work identifiers and individual musical work names in a plurality of musical work names with one another; (ii) associates each musical work identifier and at least one mix identifier with one another, the at least one mix identifier identifying the mix that includes the musical work identified by the musical work identifier that is associated with that mix identifier; (iii) associates each musical work identifier with one or more media resource identifiers, wherein each media resource identifier identifies a media resource at a corresponding network location that can be used to reproduce or at least partially perform by digital transmission the musical work; and (iv) associates each mix identifier with a mix name;

a network server module that uses a search criteria identifiable from the search request and corresponding to one or more artists to select a first set of mixes, and wherein the network server modules provides the client module data for creating a list that forms at least part of one of the one or more interfaces provided by the client module, wherein the list identifies one or more mix identifiers;

wherein the network server module receives, through user-interaction with at least one of the one or more interfaces provided by the client module, a first selection input that indicates a selection of one or more mix identifiers from the list, and wherein the network server module identifies from the first selection input and from the memory medium a second set comprising one or more musical work identifiers and one or more musical work names for each of the one or more musical work identifiers in the second set, and wherein the network server module sends data representing the second set to the network enabled device;

wherein the client module displays on at least one of the plurality of interfaces information corresponding to one or more musical work names in the second set using the data the second set;

wherein the network server module identifies from a second selection input and the memory medium a third set comprising a plurality of media resource identifiers; and wherein at least one of the network server module and the client module are configured to control the media player to sequentially perform by digital transmission at least a portion of (i) a first musical work provided by a first media resource, wherein the first media resource is identified by a first media resource identifier and has a first network location; and (ii) a second musical work provided by a second media resource, wherein the second media resource is identified by a second media resource identifier and has a second network location; and wherein the first media resource identifier and the second media resource identifier are from the third set.

55. The computer system of claim 54, wherein at least one of the network server module and the client module are configured to control the media player in performing by digital transmission at least the portions of the first musical work and the second musical work so that in response to termination of performance by digital transmission of the first musical work provided by the first media resource, at least one of the network server module and the client module controls the media player to automatically initiate performance by digital transmission of the second musical work provided by the second media resource.

56. The computer system of claim 54, wherein the client module includes an application that communicates with the network server module in order to control the media player.

57. The computer system of claim 56, wherein the application communicates directly with the network server module.

58. The computer system of claim 54, wherein the client module and the network server module form a platform.

59. The computer system of claim 54, wherein the client module, at least a portion of the memory medium, and the network server module form a platform.

60. The computer system of claim 54, wherein the one or more musical work identifiers and the one or more musical work names include one or more album track identifiers and one or more album track names respectively.

61. The computer system of claim 54, wherein the first network location corresponds to a first network address, and wherein the second network location corresponds to a second network address.

62. The computer system of claim 54, wherein the first network location corresponds to a first uniform resource locator, and wherein the second network location corresponds to a second uniform resource locator.

63. The computer system of claim 54, wherein the first network location and the second network location each correspond to an internal network site of a common network domain.

64. The computer system of claim 54, wherein the first network location and the second network location each have separate physical locations.

65. The computer system of claim 54, wherein at least one of the network server module and the client module control the media player through an application program interface of the media player.

66. The computer system of claim 65, wherein at least one of the network server module and the client module control the media player by sending instructions that include portions of a uniform resource locator that corresponds to the first network location and to the second network location.

67. A method for playing media from a network, the method comprising:

receiving a first search request from a network enabled device, the first search request specifying search criteria that includes one or more musical work names;

accessing a memory medium that comprises one or more memory components, wherein the memory medium stores data that corresponds to a plurality of musical work identifiers, wherein each musical work identifier identifies a musical work in a mix that corresponds to a designated set of fixed musical works, and wherein the memory medium also stores data that associates substantially each musical work identifier with one or more of: (i) a musical work name that corresponds to the musical work identified by that musical work identifier; (ii) a mix identifier that identifies the mix that corresponds to the designated set of musical works that contain the musical work identified by that musical work identifier; and (iii) a media resource identifier that identifies a media resource at a corresponding network location that can be used to at least partially reproduce or perform by digital transmission the musical work identified by that musical work identifier;

identifying from the first selection input and from the memory medium at least a first set comprising one or more musical work identifiers and one or more musical work names;

communicating data representing the first set to the network enabled device, so that at least information corresponding to one or more musical work names in the first set is displayed on the network enabled device;

receiving a second selection input that specifies one or more musical work identifiers from the first set;

identifying from the second selection and the memory medium a second set comprising a plurality of media resource identifiers; and controlling a media player on the network enabled device to sequentially and automatically perform by digital transmission at least a portion of (i) a first musical work provided by a first media resource and (ii) a second musical work provided by a second media resource, wherein the first media resource is identified by a first media resource identifier and has a first network location, and wherein the second media resource is identified by a second media resource identifier and has a second network location, and wherein the first media resource identifier and the second media resource identifier are from the second set.

68. The method of claim 67, wherein controlling the media player includes, in response to termination of performance by digital transmission of the first musical work provided by the first media resource, automatically initiating performance by digital transmission of the second musical work provided by the second media resource having the second network location.

69. The method of claim 67, wherein the step of controlling a media player includes programmatically controlling the media player.

70. The method of claim 69, wherein the step of programmatically controlling the media player includes sending instructions to the media player through an application program interface of the media player.

71. The method of claim 70, wherein sending instructions to the media player includes sending instructions that identify at least in part a portion of a first uniform resource locator that corresponds to the first network location and a portion of a second uniform resource locator that corresponds to the second network location.

72. The method of claim 67, wherein the first network location corresponds to a first network address, and the second network location corresponds to a second network address that is different than the first network address.

73. The method of claim 67, wherein the first network location corresponds to a first uniform resource locator, and the second network location corresponds to a second uniform resource locator that is different than the first uniform resource locator.

74. The method of claim 67, wherein the first network location and the second network location each correspond to an internal network site of a common network domain.

75. The method of claim 67, wherein the first network location has a first physical location and the second network location has a second physical location that is different than the first physical location.

76. A computer system for playing media from a network on a network enabled device, the computer system comprising:

a client module residing on the network enabled device, the client module being executable to (i) provide one or more interfaces, the one or more interfaces including a first interface to receive a search request; and (ii) control a media player on the network enabled device;

a memory medium that comprises one or more memory components, wherein the memory medium stores data that corresponds to a plurality of musical work identifiers, wherein each musical work identifier identifies a musical work in a mix that corresponds to a designated set of fixed musical works, and wherein the memory medium also stores data that associates substantially each musical work identifier with one or more of: (i) a musical work name that corresponds to the musical work identified by that musical work identifier; (ii) a mix identifier that identifies the mix that corresponds to the designated set of musical works that contain the musical work identified by that musical work identifier; and (iii) a media resource identifier that identifies a media resource at a corresponding network location that can be used to at least partially perform by digital transmission the musical work identified by that musical work identifier;

a network server module that uses a search criteria identifiable from the search request and corresponding to one or more musical work names to identify at least a first set comprising one or more musical work identifiers and one or more musical work names;

wherein at least one of the network server module and the client module is configured to:
identify a criteria specified in the search request, the criteria corresponding to a musical work name;

wherein in response to the criteria being identified, the network server module is configured to:
communicate data representing the first set to the network enabled device, so that at least information corresponding to one or more musical work names in the first set is displayed on the network enabled device;
receive a second selection input that specifies one or more musical work identifiers from the first set;
identify from the second selection and the memory medium a second set comprising a plurality of media resource identifiers; and wherein at least one of the network server module and the client module are configured to control the media player to sequentially perform by digital transmission at least a portion of (i) a first musical work provided by a first media resource, wherein the first media resource is identified by a first media resource identifier and has a first network location, and (ii) a second musical work provided by a second media resource, wherein the second media resource is identified by a second media resource identifier and has a second network location; wherein the first media resource identifier and the second media resource identifier are from the second set.

77. The computer system of claim 76, wherein at least one of the network server module and the client module control the media player in performing by digital transmission at least the portions of the first musical work and the second musical work so that in response to termination of performance by digital transmission of the first musical work at least one of the network server module and the client module controls the media player to automatically initiate performance by digital transmission of the second musical work provided by the second media resource having the second network location.

78. The computer system of claim 76, wherein the client module includes an application that communicates with the network server module in order to control the media player.

79. The computer system of claim 78, wherein the application communicates directly with the network server module.

80. The computer system of claim 76, herein the client module and the network server module form a platform.

81. The computer system of claim 76, wherein the one or more musical work identifiers and the one or more musical work names include one or more album track identifiers and one or more album track names respectively.

82. The computer system of claim 76, wherein the first network location corresponds to a first network address, and the second network location corresponds to a second network address.

83. The computer system of claim 76, wherein the first network location corresponds to a first uniform resource locator, and the second network location corresponds to a second uniform resource locator.

84. The computer system of claim 76, wherein the first network location and the second network location each correspond to an internal network site of a common network domain.

85. The computer system of claim 76, the first network location and the second network location have separate physical locations.

86. The computer system of claim 76, wherein at least one of the network server module and the client module control the media player through an application program interface of the media player.

87. The computer system of claim 86, wherein at least one of the network server module and the client module control the media player by sending instructions that include portions of a uniform resource locator that corresponds to the first network location and to the second network location.

88. A method for playing media from a network on a network enabled device, the method comprising:

receiving a first search request from a network enabled device, the first search request specifying search criteria that includes one or more mix names, wherein each mix name is for a mix that corresponds to a designated set of fixed musical works;

accessing a memory medium that comprises one or more memory components, wherein the memory medium stores data that corresponds to a plurality of musical work identifiers, wherein each musical work identifier identifies a musical work, and wherein the memory medium also stores data that associates substantially each musical work identifier with one or more of: (i) a musical work name that corresponds to the musical work identified by that musical work identifier; (ii) a mix identifier that identifies a particular mix that contains the musical work identified by that musical work identifier; (iii) a media resource identifier that identifies the digital musical work identified by that musical work identifier;

identifying from the first selection input and from the memory medium a first set comprising one or more mix identifiers and one or more mix names;

communicating data representing the first set to the network enabled device, so that information corresponding to one or more musical work names in the first set is displayed on the network enabled device;

providing data for use in creating a displayed list to the network enabled device, wherein the list comprises one or more items that correspond to the mix identifiers that identify each mix in the first set;

receiving a first selection input from the network enabled device, wherein the first selection input indicates one or more mix identifiers from the list;

identifying from the first selection input and from the memory medium a second set comprising (i) one or more musical work identifiers and (ii) one or more musical work names for each of the one or more musical work identifiers in the second set;

communicating data representing the second set to the network enabled device, so that information corresponding to one or more musical work names in the second set is displayed on the network enabled device;

receiving a second selection input that specifies one or more musical work identifiers from the second set;

identifying from the second selection input and from the memory medium a third set comprising a plurality of media resource identifiers; and controlling a media player on the network enabled device to sequentially and automatically perform by digital transmission at least a portion of a first musical work provided by a first media resource and a second musical work provided by a second media resource, wherein the first media resource is identified by a first media resource identifier and has a first network location, and wherein the second media resource is identified by a second media resource identifier and has a second network location, and wherein the first media resource identifier and the second media resource identifier are from the third set.

89. The method of claim 88, wherein controlling the media player includes, in response to termination of performance by digital transmission of the first musical work, controlling the media player to automatically initiate performance by digital transmission of the second musical work provided by the second media resource having the second network location.

90. The method of claim 88, wherein controlling a media player on the network enabled device includes programmatically controlling the media player.

91. The method of claim 90, wherein programmatically controlling the media player includes sending instructions to the media player through an application program interface of the player.

92. The method of claim 91, wherein communicating instructions to the media player includes sending instructions that identify at least in part a portion of a first uniform resource locator that corresponds to the first network location and a portion of a second uniform resource locator that corresponds to the second network location.

93. The method of claim 88, wherein the first network location corresponds to a first network address, and the second network location corresponds to a second network address that is different than the first network address.

94. The method of claim 88, wherein the first network location corresponds to a first uniform resource locator, and the second network location corresponds to a second uniform resource locator that is different than the first uniform resource locator.

95. The method of claim 88, wherein the first network location and the second network location each correspond to an internal network site of a common network domain.

96. The method of claim 88, wherein the first network location has a first physical location and the second network location has a second physical location that is different than the first physical location.

97. A computer system for playing media from a network on a network enabled device, the computer system comprising:
   a client module residing on the network enabled device, the client module being executable to (i) provide one or more interfaces, the one or more interfaces including a first interface to receive a search request; and (ii) control a media player on the network enabled device;
   a memory medium that comprises one or more memory components, wherein the memory medium stores data that corresponds to a plurality of musical work identifiers, wherein each musical work identifier identifies a musical work, and wherein the memory medium also stores data that associates substantially each musical work identifier with one or more of: (i) a musical work name that corresponds to the musical work identified by that musical work identifier; (ii) a mix identifier that identifies a particular mix that contains the musical work identified by that musical work identifier, the particular mix corresponding to a designated set of fixed musical works; (iii) a media resource identifier that identifies the musical work identified by that musical work identifier;
   a network server module that is configured to:
      identify from the first selection input and from the memory medium a first set comprising one or more mix identifiers and one or more mix names;
      communicate data representing the first set to the network enabled device, so that information corresponding to one or more musical work names in the first set is displayed on the network enabled device;
      provide data for use in creating a displayed list to the network enabled device, wherein the list comprises one or more items that correspond to the mix identifiers that identify each mix in the first set;
      receive a first selection input from the network enabled device, wherein the first selection input indicates one or more mix identifiers from the list;
      identify from the first selection input and from the memory medium a second set comprising (i) one or more musical work identifiers and (ii) one or more musical work names for each of the one or more musical work identifiers in the second set;
      communicate data representing the second set to the network enabled device, so that information corresponding to one or more musical work names in the second set is displayed on the network enabled device;
      receive a second selection input that specifies one or more musical work identifiers from the second set;
      identify from the second selection input and from the memory medium a third set comprising a plurality of media resource identifiers; and
   wherein at least one of the network server module and the client module are configured to control the media player on the network enabled device to sequentially perform by digital transmission at least a portion of (i) a first musical work provided by a first media resource, wherein the first media resource is identified by a first media resource identifier and has a first network location, and (ii) a second musical work provided by a second media resource, wherein the second media resource is identified by a second media resource identifier and has a second network location, wherein the first media resource identifier and the second media resource identifier are from the third set.

98. The computer system of claim 97, wherein at least one of the network server module and the client module are configured to control the media player in performing by digital transmission at least the portions of the first musical work and the second musical work so that in response to termination of performing by digital transmission of the first musical work provided by the first media resource, at least one of the network server module and the client module controls the media player to automatically initiate performance by digital transmission of the second musical work provided by the second media resource.

99. The computer system of claim 97, wherein the client module includes an application that communicates with the network server module in order to control the media player.

100. The computer system of claim 99, wherein the application communicates directly with the network server module.

101. The computer system of claim 97, wherein the client module and the network server module form a platform.

102. The computer system of claim 97, wherein the client module, at least a portion of the memory medium, and the network server module form a platform.

103. The computer system of claim 97, wherein the first network location corresponds to a first network address, and wherein the second network location corresponds to a second network address.

104. The computer system of claim 97, wherein the first network location corresponds to a first uniform resource locator, and wherein the second network location corresponds to a second uniform resource locator.

105. The computer system of claim 97, wherein the first network location and the second network location each correspond to an internal network site of a common network domain.

106. The computer system of claim 97, wherein the first network location and the second network location each have separate physical locations.

107. The computer system of claim 97, wherein at least one of the network server module and the client module control the media player through an application program interface of the media player.

108. The computer system of claim 107, wherein at least one of the network server module and the client module control the media player by sending instructions that include portions of a uniform resource locator that corresponds to the first network location and to the second network location.

* * * * *